United States Patent [19]
Blake et al.

[11] Patent Number: 6,067,412
[45] Date of Patent: *May 23, 2000

[54] AUTOMATIC BOTTLENECK DETECTION BY MEANS OF WORKLOAD RECONSTRUCTION FROM PERFORMANCE MEASUREMENTS

[75] Inventors: Russell P. Blake, Issaquah; David O. Hovel, Redmond; Robert I. Davidson; David E. Heckerman, both of Bellevue; John S. Breese, Mercer Island, all of Wash.

[73] Assignee: Microsoft Corporation, Redmond, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/516,176

[22] Filed: Aug. 17, 1995

[51] Int. Cl.[7] ............................................. G06F 9/00
[52] U.S. Cl. ........................ 395/672; 395/671; 395/673
[58] Field of Search .................... 395/671, 672, 395/673, 674, 602; 364/230.3, 281, 281.8

[56] References Cited

U.S. PATENT DOCUMENTS 5,473,773  12/1995  Aman et al. ............................. 395/650
5,504,894   4/1996  Ferguson et al. ....................... 395/650

OTHER PUBLICATIONS

Bause, Falko et al., "QPN–Tool for Qualitative and Quantitative Analysis of Queueing Petri Nets", May 1994, pp. 321–334.

Becker, J.C. et al., "An Analysis of the Information Content of Address and Data Reference Streams", Jun. 1993, pp. 262–263.

Blake, Russ, "Gandalf Internal Structure", Feb. 20, 1995, pp. 1–13.

Buzen, Jeffrey P. et al., "A Unified Operational Treatment of RPS Reconnect Delays", May 1987, pp. 78–92.

Carmona, A. et al., "Performance Experiences of the Barcelona Olympic Games Computer System", May 1994, pp. 52–75.

Chen, Peter M. et al., "A New Approach to I/O Performance Evaluation–Self–Scaling I/O Benchmarks, Predicted I/O Performance", Jun. 1993, pp. 1–12.

Domanski, Bernard Dr., "A PROLOG–based Expert System for Tuning MVS/XA", Feb. 1989, pp. 30–47.

Dowdy, Lawrence W. et al., "On the Applicability of Multiprogramming Level Distributions", Aug. 1985, pp. 116–127.

Genesereth, Michael R. et al., "Logic Programming", Sep. 1985, vol. 28, pp. 933–941.

(List continued on next page.)

*Primary Examiner*—Majid A. Banankhah
*Attorney, Agent, or Firm*—Michaelson & Wallace; Peter L. Michaelson

[57] ABSTRACT

A system and method for determining a workload placed on a target computer system during execution of a specified computer program. The system receives a set of performance measurements representing the performance of the target computer system during execution of the specified computer program. The system then identifies a plurality of workloads and for each identified workload, uses a model of the target computer system to predict a set of performance measurements that would results when a computer program that places the identified workload on the target computer system is executed. The system selects the identified workload whose set of predicted performance measurements most closely matches the received set of performance measurements as the determined workload that was place on the target computer system during execution of the specified computer program. The system uses the selected workload to predict the performance of the specified computer program on the target computer system with various different configurations. The system also determines the resource that is a bottleneck for each of the different configurations.

48 Claims, 48 Drawing Sheets

OTHER PUBLICATIONS

Gray, Jim, "A View of Database System Performance Measures", May 1987, pp. 3–4.

Hayes–Roth, Frederick, "Ruled Based Systems", Sep. 1985, vol. 28, pp. 921–932.

Hellerstein, J.L., "An Introduction to Modeling Dynamic Behavior with Time Series Analysis", 1993, pp. 203–223.

Itoh, Kiyoshi et al., "An Integrated Method for Parameter Tuning on Synchronized Queueing Network Bottlenecks by Qualitative and Quantitative Reasoning", Sep. 1992, pp. 635–647.

Kouvatsos, D., "Maximum Entropy Analysis of Queueing Network Models", 1993, pp. 245–290.

Lee, T. Paul, "A Manufacturing Capacity Planning Experiment Through Functional Workload Decomposition", May 1988, pp. 141–150.

Martonosi, M. et al., "MemSpy: Analyzing Memory System Bottlenecks in Programs", Jun. 1992, pp. 1–12.

Melamed, Benjamin, "An Overview of TES Processes and Modeling Methodology", 1993, pp. 359–393.

Potter, Terry W. et al., "The Need for Workload Modeling", Nov. 1981, pp. 273–276.

Raghavan, S.V. et al., "On the Classification of Interactive Users Based on User Behaviour Indices", Aug. 1985, pp. 40–48.

Ramakrishnan, K.K. et al., "Analysis of File I/O Traces in Commercial Computing Environments", Jun. 1992, pp. 78–90.

Salsburg, Michael, "A Statistical Approach to Computer Performance Modeling", May 1987, pp. 155–162.

Schweitzer, P.J., et al., "A Survey of Bottleneck Analysis in Closed Networks of Queues", 1993, pp. 491–508.

Smith, C.U., "Integrating New and Used Modeling Tools for Performance Engineering", 1992, pp. 153–163.

Tang, Dong, "Measure+—A Measurement–Based Dependability Analysis Package", Jun. 1993, pp. 110–121.

Thurner, E.M., "Performance Measurement Using System Monitors", 1993, pp. 537–559.

Whalley, D.B., "Fast Instruction Cache Performance Evaluation Using Compile–Time Analysis", Jun. 1992, pp. 13–22.

Woodside, C.M., "Performance Engineering of Client–Server Systems", 1993, pp. 394–410.

Wybranietz, Dieter et al., "Monitoring and Performance Measuring Distributed Systems During Operation", May 1988, pp. 197–206.

Accetta, Mike et al., "Mach: A New Kernel Foundation for UNIX Development," 1986, pp. 93–112.

Becker, S. T. et al., "A Modeling Methodology for Sizing a Computer Based System in a Netted Environment," Performance Evaluation Review, 1984 ACM Sigmetrics Conference on Measurement and Modeling of Computer Systems, Special Issue, vol. 12, No. 3, Aug. 21–24, 1984, pp. 149–157.

Berry, Robert et al., "An Approach to Detecting Changes in the Factors Affecting the Performance of Computer Systems," Performance Evaluation Review, 1991 ACM Sigmetrics Conference on Measurement and Modeling of Computer Systems, Special Issue, vol. 19, No. 1, May 21–24, 1991, pp. 39–49.

Blake, James T. et al., "Sensitivity Analysis of Realiability and Performability Measures for Multiprocessor Systems," Performance Evaluation Review, 1988 ACM Sigmetrics Conference on Measurement and Modeling of Computer Systems, Special Issue, vol. 16, No. 1, May 24–27, 1988, pp. 177–186.

Blake, Russ, "Tailor: A Simple Model That Works," Proceedings of the Conference on Simulation, Measurement and Modeling of Computer Systems, Aug. 13–15, 1979, pp. 1–11.

Bleistein, Sandra et al., "Analytic Performance Model of The U.S. En Route Air Traffic Control Computer Systems," Performance Evaluation Review, 1985 ACM Sigmetrics Conference on Measurement and Modeling of Computer Systems, Special Issue, vol. 13, No. 2, Aug. 26–29, 1985, pp. 105–115.

Bodnarchuk, Robert R. et al., "A Synthetic Workload Model for a Distributed System File Server," Performance Evaluation Review, 1991 ACM Sigmetrics Conference on Measurement and Modeling of Computer Systems, Special Issue, vol. 19, No. 1, May 21–24, 1991, pp. 50–59.

Breese, John S., et al., "Automated Decision–Analytic Diagnosis of Thermal Performance in Gas Turbines," International Gas Turbine an Aeroengine Congress and Exposition, Jun. 1–4, 1992, pp. 1–9.

Buzen, J. P., "Fundamental Operational Laws of Computer System Performance," Informatica, vol. 7, Fasc. 2, Jun. 4, 1976.

Dowdy, Lawrence W., "Performance Prediction Modeling: A Tutorial," Performance Evaluation Review, 1989 ACM Sigmetrics and Performance International Conference on Measurement and Modeling of Computer Systems, Special Issue, vol. 17, No. 1, May 23–26, 1989, p. 214 and Tutorial Extended Abstracts.

Ferrari, Domenico, "On the Foundation of Artificial Workload Design", Performance Evaluation Review, 1984, ACM Sigmetrics Conference on Measurement and Modeling of Computer Systems, Special Issue, vol. 12, No. 3, Aug. 21–24, 1984, pp. 8–14.

Ferrari, Domenico, "Workload Characterization for Tightly–Coupled and Loosely–Coupled Systems," Performance Evaluation Review, 1989 ACM Sigmetrics and Performance '89 International Conference on Measurement and Modeling of Computer Systems, Special Issue, vol. 17, No. 1, May 23–26, 1989, p. 210 and Tutorial Extended Abstracts.

Graf, Ingrid M., "Transformation Between Different Levels of Workload Characterization for Capacity Planning," Performance Evaluation Review, 1987 ACM Sigmetrics Conference on Measurement and Modeling of Computer Systems, Special Issue, vol. 15, No. 1, May 11–14, 1987, pp. 195–204.

Heckerman, D.E., "Toward Normative Expert Systems: Part I the Pathfinder Project," Methods. of Information Medicine, vol. 31, No. 2, 1992, pp. 90–116.

Hellerstein, Joseph L., "A Comparison of Techniques for Diagnosing Performance Problems in Information Systems," Performance Evaluation Review, 1994 ACM Sigmetrics Conference on Measurement and Modeling of Computer Systems, Special Issue, vol. 22, No. 1, May 26–20, 1994, pp. 278–279.

Hellerstein, Joseph, "A Statistical Approach to Diagnosing Intermittent Performance–Problems Using Monotone Relationships," Performance Evaluation Review, 1989 ACM Sigmetrics and Performance International Conference on Measurement and Modeling of Computer Systems Proceedings, Special Issue, vol. 17, No. 1, May 23–26, 1989, pp. 20–28.

Irgon, Adam E. et al., "FAST: A Large Scale Expert System for Application and System Software Performance Tuning," Performance Evaluation Review, 1988 ACM Sigmetrics Conference on Measurement and Modeling of Computer Systems, Special Issue, vol. 16, No. 1, May 24–27, 1988, pp. 151–156.

Olesen, Kristian G., "Causal Probabilistic Networks with Both Discrete and Continuous Variables," IEEE Transactions on Pattern Analysis and Machine Intelligence, vol. 15, No. 3, Mar. 1993, pp. 275–279.

Raghavan, S.V. et al., "Generative Networkload Models for a Single Server Environment," Performance Evaluation Review, 1994 ACM Sigmetrics Conference on Measurement and Modeling of Computer Systems, Special Issue, vol. 22, No. 1, May 16–20, 1994, pp. 118–127.

Ritchie, Dennis M. et al., "The UNIX Time–Sharing System," Communications of the ACM, vol. 17, No. 7, Jul. 1974, pp. 365–375.

Wagner, T. D. and Carlson, B. M., "An Algorithm for Off–Line Detection of Phases in Execution Profiles," $7^{th}$ International Conference, Computer Performance Evaluation, Modelling Techniques and Tools, Vienna, Austria, May 3–6, 1994, pp. 253–265.

Yu, Philip S. et al., "Modelling of Centralized Concurrency Control in a Multi–System Environment," Performance Evaluation Review, 1985 ACM Sigmetrics Conference on Measurement and Modeling of Computer Systems, Special Issue, vol. 13, No. 2, Aug. 26–29, 1985, pp. 183–191.

FIG. 4A-1

| | A. | B. |
|---|---|---|
| 5. | System_Graphics_Processing | 0.0003 |
| 6. | | |
| 7. | Maximum_IO_Size | 65536 |
| 8. | | |
| 9. | System_Sequential_Read_Cache_Processing | =0.0001914 + 0.000000099653*app.xls'!APPLICATION_SEQUENTIAL_READ_SIZE |
| 10. | System_Sequential_Read_Disk_Processing | =HLOOKUP("Sequential",hardware.xls'!Base_Disk_Controller_Processing_Overhead,model.xls'!Disk_Controller_Index,FALSE) + HLOOKUP("Sequential",hardware.xls'!Incremental_Disk_Controller_Processing_Overhead,model.xls'!Disk_Controller_Index,FALSE)*model.xls'!System_Sequential_Read_Size |
| 11. | System_Sequential_Read_Net_Processing | =0.00252375 + 0.000000338525*Maximum_IO_Size/2 |
| 12. | | |
| 13. | System_Sequential_Write_Cache_Processing | =0.0001914 + 0.000000099653*app.xls'!APPLICATION_SEQUENTIAL_WRITE_SIZE |
| 14. | System_Sequential_Write_Disk_Processing | =HLOOKUP("Sequential",hardware.xls'!Base_Disk_Controller_Processing_Overhead.model.xls'!Disk_Controller_Index,FALSE) + HLOOKUP("Sequential",hardware.xls'!Incremental_Disk_Controller_Processing_Overhead,model.xls'!Disk_Controller_Index,FALSE)*model.xls'!System_Sequential_Write_Size |
| 15. | System_Sequential_Write_Net_Processing | =0.00252375 + 0.000000338525*(model.xls'!System_Sequential_Write_Size) |
| 16. | | |
| 17. | System_Random_Read_Cache_Processing | =0.00025 + 0.000000099*app.xls'!APPLICATION_RANDOM_READ_SIZE |
| 18. | System_Random_Read_Disk_Processing | =HLOOKUP("Random",hardware.xls'!Base_Disk_Controller_Processing_Overhead,model.xls'!Disk_Controller_Index,FALSE) + HLOOKUP("Random",hardware.xls'!Incremental_Disk_Controller_Processing_Overhead,model.xls'!Disk_Controller_Index,FALSE)*model.xls'!System_Random_Read_Size |
| 19. | System_Random_Read_Net_Processing | =0.0014 + 0.0000000275*model.xls'!System_Random_Read_Size |
| 20. | | |
| 21. | System_Random_Write_Cache_Processing | =0.00041 + 0.0000001161*app.xls'!APPLICATION_RANDOM_WRITE_SIZE |
| 22. | System_Random_Write_Disk_Processing | =HLOOKUP("Random",hardware.xls'!Base_Disk_Controller_Processing_Overhead,model.xls'!Disk_Controller_Index,FALSE) + HLOOKUP("Random",hardware.xls'!Incremental_Disk_Controller_Processing_Overhead,model.xls'!Disk_Controller_Index,FALSE)*model.xls'!System_Random_Write_Size |
| 23. | System_Random_Write_Net_Processing | =0.0014 + 0.0000000275*model.xls'!System_Random_Read_Size |

FIG. 4A-2

| 24. | System_Random_Read_For_Write_Disk_Processing | =HLOOKUP("Random",hardware.xls'!Base_Disk_Controller_Processing_Overhead,model.xls'!Disk_Controller_Index,FALSE) + HLOOKUP("Random",hardware.xls'!Incremental_Disk_Controller_Processing_Overhead,model.xls'!Disk_Controller_Index,FALSE)*model.xls'!Page_Size_Used |
|---|---|---|
| 25. | System_Random_Read_For_Write_Net_Processing | =HLOOKUP("Random",hardware.xls'!Base_Disk_Controller_Processing_Overhead,model.xls'!Disk_Controller_Index,FALSE) + HLOOKUP("Random",hardware.xls'!Incremental_Disk_Controller_Processing_Overhead,model.xls'!Disk_Controller_Index,FALSE)*model.xls'!PAGE_SIZE_USED |
| 26. | | |
| 27. | Pool_Non_Paged | 0.557056 |
| 28. | Kernel_Non_Paged | 0.3 |
| 29. | Protocol_Non_Paged | 0 |
| 30. | Drivers_Non_Paged | 0.65536 |
| 31. | | |
| 32. | Pool_Paged | 1.572808 |
| 33. | CSRSS_RAM_Demand | 1.536 |
| 34. | Spooler_RAM_Demand | 1.2 |
| 35. | System_Code_Paged | 0.127658 |
| 36. | System_RAM_Demand | =(Pool_Non-Paged + Kernel_Non_Paged + Protocol_Non_Paged + Drivers_Non_Paged + Pool_Paged + CSRSS_RAM_Demand + Spooler_RAM_Demand + System_Code_Paged)*model.xls'!(Relative_Memory_Usage |
| 37. | System_Nominal_Available_Bytes | =IF(scenario\install.xls'!Installed_RAM-(System_RAM_Demand + app.xls'!APPLICATION_RAM_DEMAND) > 4096*1024,4096*1024,IF(install.xls'!Installed_RAM-(System_RAM_Demand + app.xls'!APPLICATION_RAM_DEMAND) >384*1024,install.xls'!Installed_RAM-(System_RAM_Demand + app.xls'!APPLICATION_RAM_DEMAND) /2, 384*1024))*model.xls'!Relative_Memory_Usage/(1024*1024) |
| 38. | | 1.473195 |
| 39. | System_Page_Processing | 0.003685 |
| 40. | System_Hard_Fault_Processing | 0.001075 |
| 41. | System_Soft_Fault_Processing | 0.000188 |
| 42. | | |
| 43. | System_Idle_System_Call_Rate | 450 |
| 44. | System_Background_Output_Page_Rate | 5 |

FIG. 4B

| | |
|---|---|
| CSRSS_RAM_Demand | = $B$33 |
| Drivers_Non_Paged | = $B$30 |
| Kernel_Non_Paged | = $B$28 |
| Maximum_IO_Size | = $B$7 |
| Pool_Non_Paged | = $B$27 |
| Pool_Paged | = $B$32 |
| Protocol_Non_Paged | = $B$29 |
| Spooler_RAM_Demand | = $B$34 |
| System_Background_Output_Page_Rate | = $B$44 |
| System_Code_Paged | = $B$35 |
| System_Graphics_Processing | = $B$5 |
| System_Hard_Fault_Processing | = $B$40 |
| System_Idle_System_Call_Rate | = $B$43 |
| System_Nominal_Available_Bytes | = $B$37 |
| System_Page_Processing | = $B$39 |
| System_Paging_Fraction | = $B$39 |
| System_RAM_Demand | = $B$36 |
| System_Random_Read_Cache_Processing | = $B$17 |
| System_Random_Read_Disk_Processing | = $B$18 |
| System_Random_Read_For_Write_Disk_Processing | = $B$24 |
| System_Random_Read_For_Write_Net_Processing | = $B$25 |
| System_Random_Read_Net_Processing | = $B$19 |
| System_Random_Write_Cache_Processing | = $B$21 |
| System_Random_Write_Disk_Processing | = $B$22 |
| System_Random_Write_Net_Processing | = $B$23 |
| System_Sequential_Read_Cache_Processing | = $B$9 |
| System_Sequential_Read_Disk_Processing | = $B$10 |
| System_Sequential_Read_Net_Processing | = $B$11 |
| System_Sequential_Write_Cache_Processing | = $B$13 |
| System_Sequential_Write_Disk_Processing | = $B$14 |
| System_Sequential_Write_Net_Processing | = $B$15 |
| System_Soft_Fault_Processing | = $B$41 |

FIG. 5A

|  | A. | B. | C. | D. |
|---|---|---|---|---|
| 6. | Num_Processors | 1 | | |
| 7. | | | | |
| 8. | Processor_Architecture | 0 | 80486 D0 | |
| 9. | | | | |
| 10. | Processor_Speed | 50/2 | | |
| 11. | | | | |
| 12. | Secondary_Cache | 64x1 | | |
| 13. | | | | |
| 14. | Installed_RAM | 16 | | |
| 15. | | | | |
| 16. | Num_Disk_Controllers | 1 | | |
| 17. | | | | |
| 18. | Disk_Controller_Types | 0 | Ultra24f | 3 |
| 19. | | | | |
| 20. | Disk_Drive_Types | | 0 | |
| 21. | | 0 | MAXTOR LXT-535S | 8.57 |
| 22. | | 1 | SEAGATE ST12550N 0005 | |
| 23. | | 2 | MAXTOR P0-12S | JB21 |
| 24. | | 3 | FUJITSU M2624F-512 0405 | |
| 25. | | | | |
| 26. | Num_Network_Controllers | 1 | | |
| 27. | | | | |
| 28. | Network_Controller_Types | 0 | Intel Ether Express 16 LAN Adapter | |
| 29. | | | | |
| 30. | | | | |
| 31. | Network_Type | 0 | EtherNet | |
| 32. | | | | |
| 33. | Paging_Disks | 0 | 0 | |
| 34. | Paging_Net_Controllers | 0 | | |
| 35. | | | | |
| 36. | Graphics_Controller | ET4000 | | |
| 37. | | | | |
| 38. | Graphics_Resolution | 1024x768 | | |
| 39. | | | | |
| 40. | Graphics_Color | 16 | | |
| 41. | | | | |
| 42. | Protocol | NetBEUI | | |
| 43. | | | | |

FIG. 5B

| Disk_Controller | = $B$18 |
|---|---|
| Installed_Disk_Controller_Type | = $C$18 |
| Installed_Disk_Logical_Units | = $B$21:$B$23 |
| Installed_Disk_Types | = $C$20:$C$23 |
| Installed_Graphics_Color | = $B$40 |
| Installed_Graphics_Controller | = $B$36 |
| Installed_Graphics_Resolution | = $B$38 |
| Installed_Net_Protocol | = $B$42 |
| Installed_Network_Controller_Types | = $B$28:$C$28 |
| Installed_Number_Of_Disk_Controllers | = $B$16 |
| Installed_Number_Of_Disks | = $D$18 |
| Installed_Number_Of_Processors | = $B$6 |
| Installed_Paging_Disk_Controllers | = $B$33 |
| Installed_Paging_Disks | = $C$33 |
| Installed_Paging_Net_Controllers | = $B$34 |
| Installed_Processor_Speed | = $B$10 |
| Installed_Processor_Type | = $C$8 |
| Installed_RAM | = $B$14 |
| Installed_Secondary_Cache | = $B$12 |
| Network_Type | = $C$31 |
| Processor | = $B$8 |
| Processor_Type | = $C$8 |
| Processors | = $B$6 |

FIG. 6A

|     | A. Processor Architecture | B. Page Size | C. Relative Memory Size |
|-----|---------------------------|--------------|-------------------------|
| 5.  |                           |              |                         |
| 6.  | 80486 D0                  | 4096         | 1                       |
| 7.  | Alpha                     | 8192         | 1.744251                |
| 8.  | PowerPC                   | 4096         | 1.3                     |
| 9.  | R4000                     | 4096         | 1.3                     |
| 10. | R4400                     | 4096         | 1.3                     |
| 11. | R4600                     | 4096         | 1.3                     |
| 12. | x86 Family 5 Model 2 Stepping 1 | 4096   | 1                       |

FIG. 6B

| | A. | B. | C. | D. | E. | F. | G. | H. | I. | J. | K. | L. | M. |
|---|---|---|---|---|---|---|---|---|---|---|---|---|---|
| 18. | Relative Computation Speed | Processor Speed | 25 | 33 | 66 | 50 | 50/2 | 60 | 66/2 | 90 | 99/3 | 100 | 150 |
| 19. | 80486 D0 | | 80486 D0-25 | 80486 D0-33 | 80486 D0-66 | 80486 D0-50 | 80486 D0-50/2 | 80486 D0-60 | 80486 D0-66/2 | 80486 D0-90 | 80486 D0-99/3 | 80486 D0-100 | 80486 D0-150 |
| 20. | Alpha | | Alpha-25 | Alpha-33 | Alpha-66 | Alpha-50 | Alpha-50/2 | Alpha-60 | Alpha-66/2 | Alpha-90 | Alpha-99/3 | Alpha-100 | Alpha-150 |
| 21. | PowerPC | | PowerP C-25 | PowerP C-33 | PowerP C-66 | PowerP C-50 | PowerP C-50/2 | PowerP C-60 | PowerP C-66/2 | PowerP C-90 | PowerP C-99/3 | PowerP C-100 | PowerP C-150 |
| 22. | R4000 | | R4000-25 | R4000-33 | R4000-66 | R4000-50 | R4000-50/2 | R4000-60 | R4000-66/2 | R4000-90 | R4000-99/3 | R4000-100 | R4000-150 |
| 23. | R4400 | | R4400-25 | R4400-33 | R4400-66 | R4400-50 | R4400-50/2 | R4400-60 | R4400-66/2 | R4400-90 | R4400-99/3 | R4400-100 | R4400-150 |
| 24. | R4600 | | R4600-25 | R4600-33 | R4600-66 | R4600-50 | R4600-50/2 | R4600-60 | R4600-66/2 | R4600-90 | R4600-99/3 | R4600-100 | R4600-150 |
| 25. | x86 Family 5 Model 2 Stepping 1 | | x86 Family 5 Model 2 Stepping 1-25 | x86 Family 5 Model 2 Stepping 1-33 | x86 Family 5 Model 2 Stepping 1-66 | x86 Family 5 Model 2 Stepping 1-50 | x86 Family 5 Model 2 Stepping 1-50/2 | x86 Family 5 Model 2 Stepping 1-60 | x86 Family 5 Model 2 Stepping 1-66/2 | x86 Family 5 Model 2 Stepping 1-90 | x86 Family 5 Model 2 Stepping 1-99/3 | x86 Family 5 Model 2 Stepping 1-100 | x86 Family 5 Model 2 Stepping 1-150 |

FIG. 6C-1

| | A. | B. | C. | D. | E. | F. | G. | H. | I. | J. | K. |
|---|---|---|---|---|---|---|---|---|---|---|---|
| 27. | Relative Computation Speed | Secondary Cache Size & Type | 64x1 | 64x2 | 128x1 | 128x2 | 256x1 | 256x2 | 512x1 | 1024x1 | 2048x1 |
| 28. | 80486 D0-25 | | 0.72 | 0.79 | 0.93 | 1.00 | 1.07 | 1.11 | 1.14 | 1.18 | 1.22 |
| 29. | 80486-D0-33 | | 0.80 | 0.88 | 1.04 | 1.12 | 1.20 | 1.24 | 1.28 | 1.32 | 1.36 |
| 30. | 80486 D0-66 | | 1.09 | 1.20 | 1.42 | 1.53 | 1.64 | 1.69 | 1.75 | 1.80 | 1.47 |
| 31. | 80486 D0-50 | | 0.97 | 1.07 | 1.26 | 1.36 | 1.46 | 1.51 | 1.55 | 1.60 | 1.55 |
| 32. | 80486 D0-100 | | 1.24 | 1.37 | 1.61 | 1.74 | 1.86 | 1.92 | 1.99 | 2.05 | 1.74 |
| 33. | 80486 D0-50/2 | | 1.00 | 1.07 | 1.26 | 1.36 | 1.46 | 1.51 | 1.55 | 1.60 | 1.65 |
| 34. | 80486 D0-66/2 | | 0.99 | 1.09 | 1.29 | 1.39 | 1.49 | 1.54 | 1.59 | 1.64 | 1.34 |
| 35. | 80486 D0-99/3 | | 1.13 | 1.24 | 1.47 | 1.58 | 1.69 | 1.75 | 1.81 | 1.86 | 2.09 |
| 36. | 80486 D0-150 | | 1.43 | 1.57 | 1.86 | 2.00 | 2.14 | 2.21 | 2.28 | 2.36 | 2.00 |
| 37. | x86 Family 5 Model 2 Stepping 1-60 | | 0.99 | 1.02 | 1.75 | 1.84 | 2.02 | 2.23 | 2.45 | 2.69 | 2.96 |
| 38. | x86 Family 5 Model 2 Stepping 1-90 | | 1.14 | 1.16 | 2.00 | 2.10 | 2.09 | 2.54 | 2.80 | 3.08 | 3.39 |
| 39. | Alpha-25 | | 1.43 | 1.57 | 1.86 | 2.00 | 2.15 | 2.22 | 2.29 | 2.36 | 2.43 |
| 40. | Alpha-33 | | 1.60 | 1.76 | 2.08 | 2.24 | 2.40 | 2.48 | 2.56 | 2.64 | 2.72 |
| 41. | Alpha-66 | | 1.94 | 2.40 | 2.84 | 3.06 | 3.28 | 3.39 | 3.50 | 3.61 | 2.95 |
| 42. | Alpha-50 | | 1.94 | 2.14 | 2.53 | 2.72 | 2.91 | 3.01 | 3.11 | 3.21 | 3.10 |
| 43. | Alpha-100 | | 2.21 | 2.73 | 3.23 | 3.48 | 3.73 | 3.85 | 3.97 | 4.10 | 3.48 |
| 44. | Alpha-50/2 | | 1.72 | 2.14 | 2.53 | 2.72 | 2.91 | 3.01 | 3.11 | 3.21 | 3.30 |
| 45. | Alpha-66/2 | | 1.77 | 2.19 | 2.58 | 2.78 | 2.98 | 3.08 | 3.18 | 3.28 | 2.68 |
| 46. | Alpha-99/3 | | 2.01 | 2.48 | 2.94 | 3.16 | 3.39 | 3.50 | 3.61 | 3.73 | 4.18 |
| 47. | Alpha-150 | | 2.32 | 2.87 | 3.39 | 3.65 | 3.91 | 4.04 | 4.17 | 2.63 | 4.35 |
| 48. | PowerPC-25 | | 1.43 | 1.57 | 1.86 | 2.00 | 2.15 | 2.22 | 2.29 | 2.36 | 2.43 |
| 49. | PowerPC-33 | | 1.60 | 1.76 | 2.08 | 2.24 | 2.40 | 2.48 | 2.56 | 2.64 | 2.72 |
| 50. | PowerPC-66 | | 2.19 | 2.40 | 2.84 | 3.06 | 3.28 | 3.39 | 3.50 | 3.61 | 2.95 |
| 51. | PowerPC-50 | | 1.94 | 2.14 | 2.53 | 2.72 | 2.91 | 3.01 | 3.11 | 3.21 | 3.10 |
| 52. | PowerPC-100 | | 2.48 | 2.73 | 3.23 | 3.48 | 3.73 | 3.85 | 3.97 | 4.10 | 3.48 |
| 53. | PowerPC-50/2 | | 2.00 | 2.14 | 2.53 | 2.72 | 2.91 | 3.01 | 3.11 | 3.21 | 3.30 |
| 54. | PowerPC-66/2 | | 1.99 | 2.19 | 2.58 | 2.78 | 2.98 | 3.08 | 3.18 | 3.28 | 2.68 |
| 55. | PowerPC 99/3 | | 2.26 | 2.48 | 2.94 | 3.16 | 3.39 | 3.50 | 3.61 | 3.73 | 4.18 |
| 56. | PowerPC-150 | | 3.35 | 3.69 | 4.36 | 4.69 | 5.03 | 5.20 | 5.36 | 5.53 | 4.35 |

FIG. 6C-2

| | A. | B. | C. | D. | E. | F. | G. | H. | I. | J. | K. |
|---|---|---|---|---|---|---|---|---|---|---|---|
| 57. | R4000-25 | | 1.07 | 1.18 | 1.40 | 1.50 | 1.61 | 1.66 | 1.72 | 1.77 | 1.82 |
| 58. | R4000-33 | | 1.20 | 1.32 | 1.56 | 1.68 | 1.80 | 1.86 | 1.92 | 1.98 | 2.04 |
| 59. | R4000-66 | | 1.64 | 1.80 | 2.13 | 2.29 | 2.46 | 2.54 | 2.62 | 2.70 | 2.21 |
| 60. | R4000-50 | | 1.46 | 1.60 | 1.89 | 2.04 | 2.19 | 2.26 | 2.33 | 2.40 | 2.32 |
| 61. | R4000-100 | | 1.86 | 2.05 | 2.42 | 2.61 | 2.79 | 2.89 | 2.98 | 3.07 | 2.61 |
| 62. | R4000-50/2 | | 1.50 | 1.60 | 1.89 | 2.04 | 2.19 | 2.26 | 2.33 | 2.40 | 2.48 |
| 63. | R4000-66/2 | | 1.49 | 1.64 | 1.94 | 2.09 | 2.24 | 2.31 | 2.38 | 2.46 | 2.01 |
| 64. | R4000-99/3 | | 1.69 | 1.86 | 2.20 | 2.37 | 2.54 | 2.62 | 2.71 | 2.79 | 3.13 |
| 65. | R4000-150 | | 2.51 | 2.77 | 3.27 | 3.52 | 3.77 | 3.90 | 4.02 | 4.15 | 3.27 |
| 66. | R4400-25 | | 1.25 | 1.38 | 1.63 | 1.75 | 1.88 | 1.94 | 2.00 | 2.07 | 2.13 |
| 67. | R4400-33 | | 1.40 | 1.54 | 1.82 | 1.96 | 2.10 | 2.17 | 2.24 | 2.31 | 2.38 |
| 68. | R4400-66 | | 1.91 | 2.10 | 2.49 | 2.68 | 2.87 | 2.96 | 3.06 | 3.16 | 2.58 |
| 69. | R4400-50 | | 1.70 | 1.87 | 2.21 | 2.38 | 2.55 | 2.63 | 2.72 | 2.80 | 2.71 |
| 70. | R4400-100 | | 2.17 | 2.39 | 2.83 | 3.04 | 3.26 | 3.37 | 3.48 | 3.59 | 3.05 |
| 71. | R4400-50/2 | | 1.75 | 1.87 | 2.21 | 2.38 | 2.55 | 2.63 | 2.72 | 2.80 | 2.89 |
| 72. | R4400-66/2 | | 1.74 | 1.91 | 2.26 | 2.43 | 2.61 | 2.69 | 2.78 | 2.87 | 2.35 |
| 73. | R4400-99/3 | | 1.98 | 2.17 | 2.57 | 2.77 | 2.96 | 3.06 | 3.16 | 3.26 | 3.66 |
| 74. | R4400-150 | | 2.93 | 3.23 | 3.81 | 4.11 | 4.40 | 4.55 | 4.69 | 4.84 | 3.81 |
| 75. | R4600-25 | | 1.40 | 1.53 | 1.81 | 1.95 | 2.09 | 2.16 | 2.23 | 2.30 | 2.37 |
| 76. | R4600-33 | | 1.56 | 1.72 | 2.03 | 2.19 | 2.34 | 2.42 | 2.50 | 2.58 | 2.66 |
| 77. | R4600-66 | | 2.13 | 2.34 | 2.77 | 2.98 | 3.20 | 3.30 | 3.41 | 3.52 | 2.88 |
| 78. | R4600-50 | | 1.89 | 2.08 | 2.46 | 2.65 | 2.84 | 2.94 | 3.03 | 3.13 | 3.02 |
| 79. | R4600-100 | | 2.42 | 2.66 | 3.15 | 3.39 | 3.63 | 3.75 | 3.87 | 4.00 | 3.40 |
| 80. | R4600-50/2 | | 1.95 | 2.08 | 2.46 | 2.65 | 2.84 | 2.94 | 3.03 | 3.13 | 3.22 |
| 81. | R4600-66/2 | | 1.94 | 2.13 | 2.52 | 2.71 | 2.91 | 3.00 | 3.10 | 3.20 | 2.61 |
| 82. | R4600-99/3 | | 2.20 | 2.42 | 2.86 | 3.08 | 3.30 | 3.41 | 3.52 | 3.63 | 4.08 |
| 83. | R4600-150 | | 3.27 | 3.60 | 4.25 | 4.58 | 4.90 | 5.07 | 5.23 | 5.39 | 4.58 |

|  | A. | B. | C. | D. |
|---|---|---|---|---|
| 86. | Disk Controller Architecture | | | |
| 87. | Ultra24f | | | 1500000 |
| 88. | DptScsi | | | 1500000 |
| 89. | Aha174x | | | 1500000 |
| 90. | AtDisk | | | 1500000 |

FIG. 6D

|  | A. | B. | C. | D. | E. |
|---|---|---|---|---|---|
| 92. | Base Disk Controller Processing Overhead | | | Sequential | Random |
| 93. | Ultra24f | | | 4.26E-05 | 0.0014 |
| 94. | DptScsi | | | | |
| 95. | Aha174x | | | 0.0039956 | 0.001446 |
| 96. | AtDisk | | | 0.0002889 | 0.001463 |

FIG. 6E

|  | A. | B. | C. | D. | E. |
|---|---|---|---|---|---|
| 98. | Incremental Disk Controller Processing Overhead | | | Sequential | Random |
| 99. | Ultra24f | | | 1.26E-07 | 2.75E-08 |
| 100. | DptScsi | | | | |
| 101. | Aha174x | | | 1.277E-07 | 1.77E-08 |
| 102. | AtDisk | | | 5.67E-07 | 4.18E-07 |

FIG. 6F

|  | A. | B. | C. | D. |
|---|---|---|---|---|
| 121 | Network Type | | | |
| 122 | EtherNet | | | 1000000 |
| 123 | TokenRing | | | 16000000 |
| 124 | FDDI | | | 10000000 |

FIG. 6I

|  | A. | B. | C. |
|---|---|---|---|
| 136. | Graphics Controller Speed | | 1024x768 |
| 137. | | ET4000 | 0.000001 |
| 138. | | VRAMII | 0.000004 |

| | A. | B. | C. | D. | E. | F. | G. | H. | J. | K. |
|---|---|---|---|---|---|---|---|---|---|---|
| 104 | Random Disk Throughput | | | 4096 | 8192 | 12288 | 16384 | 20480 | 28672 | 32768 |
| 105 | FUJITSU M2624F-512 0405 | | | 190000 | 310000 | 400000 | 500000 | 600000 | 725000 | 800000 |
| 106 | MAXTOR MXT-540SL I1.2 | | | 250837.4 | 449180 | 606760 | 745694.4 | 854140 | 1020558 | 1100517 |
| 107 | MAXTOR P0-12S JB21 | | | 190000 | 310000 | 400000 | 500000 | 600000 | 725000 | 800000 |
| 108 | MAXTOR LXT-535S 8.57 | | | 156791.2 | 266169.4 | 340749 | 430319.2 | 470450.7 | 561098.4 | 623190.3 |
| 109 | DEC RZ25L (c) DEC0006 | | | 182352 | 333489 | 464316 | 573593 | 669983 | 821976 | 889987 |
| 110 | QUANTUM LPS540A | | | 182510.5 | 335100.3 | 464911.2 | 595826.7 | 673594.3 | 810446.6 | 938110.3 |

| | A. | B. | C. | L. | M. | N. | O. | P. | Q. | R. | S. |
|---|---|---|---|---|---|---|---|---|---|---|---|
| 104 | Random Disk Throughput | | | 36864 | 40960 | 45056 | 49152 | 53248 | 57344 | 61440 | 65536 |
| 105 | FUJITSU M2624F-512 0405 | | | 850000 | 900000 | 975000 | 990000 | 1025000 | 1050000 | 1100000 | 900000 |
| 106 | MAXTOR MXT-540SL I1.2 | | | 1175857 | 1220529 | 1270466 | 1322151 | 1356633 | 1384130 | 1419326 | 1476100 |
| 107 | MAXTOR P0-12S JB21 | | | 850000 | 900000 | 975000 | 990000 | 1025000 | 1050000 | 1100000 | 900000 |
| 108 | MAXTOR LXT-535S 8.57 | | | 635192 | 668908.6 | 679310 | 727827.9 | 721232.2 | 750099.1 | 760261.6 | 732809.7 |
| 109 | DEC RZ25L (c) DEC0006 | | | 938178 | 998906 | 1.04E+06 | 1.10E+06 | 1.14E+06 | 1.17E+06 | 1.20E+06 | 1.24E+06 |
| 110 | QUANTUM LPS540A | | | 986116.2 | 1066736 | 1064589 | 1202222 | 1230442 | 1283285 | 1307738 | 1370565 |

FIG. 6H

| | A. | B. | C. | D. | E. | F. | G. | H. | I. | J. | K. |
|---|---|---|---|---|---|---|---|---|---|---|---|
| 112 | Random Disk Throughput | | | 4096 | 8192 | 12288 | 16384 | 20480 | 24576 | 28672 | 32768 |
| 113 | FUJITSU M2624F-512  0405 | | | 785859.8 | 811451.1 | 765762.4 | 759284.9 | 769294.9 | 774688.1 | 787332.5 | 728583.8 |
| 114 | MAXTOR MXT-540SL  I1.2 | | | 1420860 | 1369696 | 1347697 | 1313413 | 1343593 | 1325142 | 1303918 | 1246691 |
| 115 | MAXTOR P0-12S    JB21 | | | 785859.8 | 811451.1 | 765762.4 | 759284.9 | 769294.9 | 774688.1 | 787332.5 | 728583.8 |
| 116 | MAXTOR LXT-535S   8.57 | | | 785859.8 | 811451.1 | 765762.4 | 759284.9 | 769294.9 | 774688.1 | 787332.5 | 728583.8 |
| 117 | DEC  RZ25L  (c) DEC0006 | | | 1.65E+06 | 1.62E+06 | 1.59E+06 | 1.59E+06 | 1.63E+06 | 1.52E+06 | 1.62E+06 | 1.61E+06 |
| 118 | QUANTUM LPS540A | | | 1161500 | 1158551 | 1283801 | 1246553 | 1176066 | 1269343 | 1192602 | 1147508 |

| | A. | B. | C. | L. | M. | N. | O. | P. | Q. | R. | S. |
|---|---|---|---|---|---|---|---|---|---|---|---|
| 112 | Random Disk Throughput | | | 36864 | 40960 | 45056 | 49152 | 53248 | 57344 | 61440 | 65536 |
| 113 | FUJITSU M2624F-512  0405 | | | 744628.6 | 700331.7 | 771068.8 | 790507.2 | 764817.8 | 834634.1 | 770141.8 | 751097.6 |
| 114 | MAXTOR MXT-540SL  I1.2 | | | 1366146 | 1288483 | 1308560 | 1333628 | 1313875 | 1304445 | 1322449 | 1320041 |
| 115 | MAXTOR P0-12S    JB21 | | | 744628.6 | 700331.7 | 771068.8 | 790507.2 | 764817.8 | 834634.1 | 770141.8 | 751097.6 |
| 116 | MAXTOR LXT-535S   8.57 | | | 744628.6 | 700331.7 | 771068.8 | 790507.2 | 764817.8 | 834634.1 | 770141.8 | 751097.6 |
| 117 | DEC  RZ25L  (c) DEC0006 | | | 1.59E+06 | 1.58E+06 | 1.64E+06 | 1.61E+06 | 1.62E+06 | 1.59E+06 | 1.58E+06 | 1.65E+06 |
| 118 | QUANTUM LPS540A | | | 1178418 | 1187425 | 1269954 | 1184087 | 1336891 | 1221887 | 1240426 | 1271752 |

FIG. 6J

| A. | B. | C. | D. | E. | F. | G. | H. | I. | J. | K. | L. | M. |
|---|---|---|---|---|---|---|---|---|---|---|---|---|
| 127. Net Adapter | | | | | | | | | | | | |
| 128. | | | 512 | 1024 | 2048 | 4096 | 8192 | 12288 | 16384 | 20480 | 24576 | 28672 |
| 129. | | Ungermann-Bass EOTP-pc | 175000 | 225000 | 325000 | 500000 | 500000 | 740000 | 720000 | 760000 | 800000 | 810000 |
| 130. | | DEC EtherWORKS Turbo EISA Adapter | 175000 | 225000 | 325000 | 500000 | 500000 | 740000 | 720000 | 760000 | 800000 | 810000 |
| 131. | | Novell NE3200 | 175000 | 225000 | 325000 | 500000 | 500000 | 740000 | 720000 | 760000 | 800000 | 810000 |
| 132. | | Intel Ether Express 16 LAN Adapter | 175000 | 225000 | 325000 | 500000 | 500000 | 740000 | 720000 | 760000 | 800000 | 810000 |

| A. | B. | C. | N. | O. | P. | Q. | R. | S. | T. | U. | V. |
|---|---|---|---|---|---|---|---|---|---|---|---|
| 127. Net Adapter | | | | | | | | | | | | |
| 128. | | | 32768 | 36864 | 40960 | 45056 | 49152 | 53248 | 57344 | 61440 | 65536 |
| 129. | | Ungermann-Bass EOTP-pc | 800000 | 810000 | 820000 | 820000 | 820000 | 830000 | 830000 | 810000 | 800000 |
| 130. | | DEC EtherWORKS Turbo EISA Adapter | 800000 | 810000 | 820000 | 820000 | 820000 | 830000 | 830000 | 810000 | 800000 |
| 131. | | Novell NE3200 | 800000 | 810000 | 820000 | 820000 | 820000 | 830000 | 830000 | 810000 | 800000 |
| 132. | | Intel Ether Express 16 LAN Adapter | 800000 | 810000 | 820000 | 820000 | 820000 | 830000 | 830000 | 810000 | 800000 |

FIG. 7-1

```
*****************************************************************
********
//Processor speed characterization Installed_Processor_Index:          ["processor model"]
            Match(Installed_Processor_Type,
                Processor_Types,
                0) + 1
Processor_Speed_Name:          ["processor model & speed"]
            HLookup(Installed_Processor_Speed,
                Processor_Speeds,
                Installed_Processor_Index,
                FALSE)

Processor_Speed_Name_Index:     ["processor model & speed
index"]
            Match(Processor_Speed_Name,
                Processor_Speed_Names,
                0) + 1

Relative_Processor_Speed:       ["relative processor speed"]
            HLOOKUP(Installed_Secondary_Cache,
                Relative_Processor_Speeds,
                Processor_Speed_Name_Index,
                FALSE)
//
*****************************************************************
********
// RAM Requirements and Consequent Paging // CD-ROM devices and any other devices are ignored.

// The following are in megabytes; should include other subsystems

System_Paged:              ["megabytes"]
            CSRSS_RAM_Demand +
            Spooler_RAM_Demand +
            Pool_Paged +
            System_Code_Paged +
            System_Nominal_Available_Bytes System_Non_Paged:          ["megabytes"]
            Pool_Non_Paged +
            Kernel_Non_Paged +
            Protocol_Non_Paged +
            Drivers_Non_Paged Relative_Memory_Usage:     ["ratio"]
            Index(Relative_Memory_Size,
                Installed_Processor_Index - 1 )

RAM_Demand:                ["megabytes"]
            (
              Relative_Memory_Usage *
              (
                System_Non_Paged +
```

```
                System_Paged
              )
            ) +
            APPLICATION_RAM_DEMAND // We need to calculate how fast we can page. This should be an
average
// of the speeds of the devices used for paging. For now let's
// assume one paging device.

Non_Idle_Time:             ["time fraction"]
            1 - APPLICATION_IDLE

// Indexes returned by the Match function are incremented by one
// so they can be used directly to index arrays with labels in the
// first row or column.

Disk_Controller_Index:     ["disk controller index"]
            Match(Installed_Disk_Controller_Type,
                Disk_Controller_Types,
                0) + 1

Paging_Unit:               ["logical unit"]
            Match(Installed_Paging_Disks,
                Installed_Disk_Logical_Units,
                0) + 1

Paging_Disk_Type:          ["disk model"]
            HLookup(Installed_Paging_Disk_Controllers,
                Installed_Disk_Types,
                Paging_Unit,
                FALSE)

Paging_Disk_Index:         ["disk model index"]
            Match(Paging_Disk_Type,
                Disk_Types,
                0) + 1

Page_Size_Used:            ["bytes"]
            Index(Page_Size,
                Installed_Processor_Index -1)

// The following formula approximates the S-curve which
// characterizes paging. The power term accentuates the curve
// while preserving the sign of the difference.

Paging_Intensity:          ["fraction from 0 to 1"]
            Non_Idle_Time/
            (
              (
                1 +
                exp
                (
```

FIG. 7-2

```
            min
            (
              500,
              (
                Installed_RAM-RAM_Demand
              )^
              3
            )
          )
        )
      )
    )

// Paging reads under disk pressure generally result in reads of
about two
// to three pages each. We could fit this better if we used a linear
// fit for throughput instead of a table lookup. Instead, one parameter
// (Cluster) is used for the page-rounded lookup, and rthe other (Size)
// is used for the rest of the calculations. We could interpolate, TBD,
// if we don't do a curve fit on calibration.

System_Page_Input_Size:            ["bytes"]
    max
    (
      Page_Size_Used,
      2.5 * Page_Size_Used * Paging_Intensity
    )

System_Page_Input_Cluster:         ["bytes"]
    Page_Size_Used *
    (
      int
      (
        (
          System_Page_Input_Size +
          Page_Size_Used
        )/
        Page_Size_Used
      )
    )

// The following is empirical: see for example paging\ctrsum.xls

System_Page_Output_Size:           ["bytes"]
    Maximum_IO_Size -
    (
      3 * Page_Size_Used
    )

Input_Paging_Disk_Thruput:         ["bytes/second"]
    HLookup(System_Page_Input_Cluster,
            Random_Disk_Throughput,
            Paging_Disk_Index,
            FALSE)

Output_Paging_Disk_Thruput:        ["bytes/second"]
    HLookup(System_Page_Output_Size,
            Random_Disk_Throughput,
            Paging_Disk_Index,
            FALSE)

Disk_Paging_Demand:                ["fraction from 0 to 1"]
    LOCAL_PAGING_AFFINITY *
    Paging_Intensity Disk_Paging_Read_Rate:             ["operations/second"]
    Disk_Paging_Demand *
    (
      Input_Paging_Disk_Thruput /
      System_Page_Input_Size
    )

Disk_Paging_Write_Rate:            ["operations/second"]
    Disk_Paging_Demand *
    (
      Output_Paging_Disk_Thruput /
      System_Page_Output_Size
    ) *
    (
      1 -
      (
        System_Page_Output_Size /
        (
          System_Page_Input_Size +
          System_Page_Output_Size
        )
      )
    )

Disk_Paging_Read_Byte_Rate:        ["bytes/second"]
    Disk_Paging_Read_Rate *
    System_Page_Input_Size Disk_Paging_Write_Byte_Rate:       ["bytes/second"]
    Disk_Paging_Write_Rate *
    System_Page_Output_Size Disk_Page_Input_Rate:              ["pages/sec"]
    Disk_Paging_Read_Rate *
    System_Page_Input_Size
    Page_Size_Used // Assume only one paging net controller for now Paging_Net_Controller:             ["controller model"]
    VLookup(Installed_Paging_Net_Controllers,
            Installed_Network_Controller_Types,
            2,
            FALSE)

Paging_Net_Controller_Index:       ["controller model index"]
    Match(Paging_Net_Controller,
          Net_Adapter_Types,
```

FIG. 7-3

```
                    0) + 1                                        Net_Paging_Read_Rate *
                                                                  System_Page_Input_Size
Input_Paging_Net_Thruput:          ["bytes/second"]               Page_Size_Used
        HLookup(System_Page_Input_Cluster,
                Network_Adapter_Thruput,          Input_Page_Rate:                   ["pages/sec"]
                Paging_Net_Controller_Index,             Disk_Page_Input_Rate +
                FALSE)                                   Net_Page_Input_Rate Output_Paging_Net_Thruput:         ["bytes/second"]   // Assumption: page faults happen one at a time and are not
        HLookup(System_Page_Output_Size,              concurrent.
                Network_Adapter_Thruput,              // This means net and disk page faults are serialized.
                Paging_Net_Controller_Index,          // This is not a good assumption in a highly concurrent environment.
                FALSE)                                // Still, we are limited by the speed of the devices.

Paging_Demand:                 ["time fraction"]
// Following is in units of fraction of a second used for paging      Paging_Intensity
// from the network
                                                      Device_Paging_Read_Rate:       ["paging reads/sec"]
                                                             Disk_Paging_Read_Rate -
Net_Paging_Demand:                 ["fraction from 0 to 1"]  Net_Paging_Read_Rate
        ( 1 - LOCAL_PAGING_AFFINITY ) *
        Paging_Intensity                              // When we get around to net controllers, we'll probably have to
                                                      // add similar formulas to account for the overhead of dealing
Net_Paging_Read_Rate:              ["operations/second"]  // with various net controllers.
        Net_Paging_Demand *
        (                                             System_Hard_Fault_Read_Disk_Processing:  ["relative seconds"]
          Input_Paging_Net_Thruput /                          HLookup
          System_Page_Input_Size                              (
        )                                                       "'Random'", Net_Paging_Write_Rate:             ["operations/second"]  hardware.xls!Base_Disk_Controller_Processing_Overhead,
        Net_Paging_Demand *                                     Disk_Controller_Index,
        (                                                       FALSE
          Output_Paging_Net_Thruput /                     ) +
          System_Page_Output_Size                         HLookup
        ) *                                                     (
        (                                                         "'Random'",
          1 -
          (                                             hardware.xls!Incremental_Disk_Controller_Processing_Overhead,
            System_Page_Output_Size /                           Disk_Controller_Index,
            (                                                   FALSE
              System_Page_Input_Size +                    ) *
              System_Page_Output_Size                    Disk_Paging_Read_Byte_Rate
            )
          )                                             System_Hard_Fault_Write_Disk_Processing: ["relative seconds"]
        )                                                       HLookup
                                                                (
Net_Paging_Read_Byte_Rate:         ["bytes/second"]               "'Random'",
        Net_Paging_Read_Rate *
        System_Page_Input_Size                        hardware.xls!Base_Disk_Controller_Processing_Overhead,
                                                              Disk_Controller_Index,
Net_Paging_Write_Byte_Rate:        ["bytes/second"]           FALSE
        Net_Paging_Write_Rate *                         ) +
        System_Page_Output_Size                         HLookup
                                                              (
Net_Page_Input_Rate:               ["pages/sec"]                "'Random'",
```

FIG. 7-4

```
hardware.xls!Incremental_Disk_Controller_Processing_Overhead,
        Disk_Controller_Index,
        FALSE
    )*
    Disk_Paging_Write_Byte_Rate System_Hard_Fault_Disk_Processing:
        LOCAL_PAGING_AFFINITY *
        (
            System_Hard_Fault_Read_Disk_Processing +
            System_Hard_Fault_Write_Disk_Processing
        )

Non_Paging_Time:           ["time fraction"]
        Non_Idle_Time_Paging_Demand //
//****************************************************************
//********
// File, Graphics, and Computation requirements // CD-ROM devices, tape devices, and any other devices are ignored.

// Assume symmetric processors

// The following assumes application processor times are given
// in terms of the base machine (Gateway 486 DX2/50)

Relative_Graphics_Processing:      ["processor seconds"]
        APPLICATION_GRAPHICS_PROCESSING /
        Relative_Processor_Speed Relative_Sequential_Read_Processing:  ["processor seconds"]

APPLICATION_SEQUENTIAL_READ_PROCESSING /
        Relative_Processor_Speed

Relative_Sequential_Write_Processing:  ["processor seconds"]

APPLICATION_SEQUENTIAL_WRITE_PROCESSING /
        Relative_Processor_Speed

Relative_Random_Read_Processing:   ["processor seconds"]
        APPLICATION_RANDOM_READ_PROCESSING /
        Relative_Processor_Speed Relative_Random_Write_Processing:  ["processor seconds"]
        APPLICATION_RANDOM_WRITE_PROCESSING /
        Relative_Processor_Speed Graphics_Controller_Index:   ["graphics controller index"]
        Match(Installed_Graphics_Controller,
            Graphics_Controller_Types,
            0) + 1

Graphics_Device_Speed:          ["seconds/pixel"]
        HLookup(Installed_Graphics_Resolution,
            Graphics_Controller_Thruput,
            Graphics_Controller_Index,
            FALSE)

Graphics_Cycle_Time:            ["seconds"]
        (
            Relative_Graphics_Processing +
            (
                System_Graphics_Processing
            ) /
            Relative_Processor_Speed
        ) +
        (
            Graphics_Device_Speed *
            APPLICATION_GRAPHICS_SIZE
        )

// Determine the amount of time spent doing Sequential_Read
// Multiple of times we use a device when doing sequential reads System_Sequential_Read_Size:    ["bytes"]
        (
            Maximum_IO_Size / 2
        )

Device_Sequential_Read_Period:  ["app reads per device read"]
        max
        (
            1,
            System_Sequential_read_Size /
            APPLICATION_SEQUENTIAL_READ_SIZE
        )

Application_Sequential_Read_Frequency: ["app reads per graphics
op"]
            Relative_Sequential_Read_Processing /
            Relative_Graphics_Processing Sequential_Read_Cache_Cycle:    ["seconds"]
            Applications_Sequential_Read_Frequency *
            Graphics_Cycle_Time +
            System_Sequential_Read_Cache_Processing /
            Relative_Processor_Speed // The following is supposed to compute the average disk read
// time over all installed devices: use each element in the
// array of installed devices as an index into the
Sequential_Disk_Throughout
// array row, with System_Sequential_Read_Size specifying the
column.
```

FIG. 7-5

```
//Device_Sequential_Read_Time:        ["seconds"]
//          Average(Installed_Disk_Types,
//              Disk_Types,
//              Sequential_Disk_Throughput,
//              System_Sequential_Read_Size)

// Until we figure out the above, we'll use the paging devices
// for file IO.

Disk_Sequential_Read_Unit:            ["logical unit"]
          Match(Installed_Paging_Disks,
              Installed_Disk_Logical_Units,
              0) + 1

Disk_Sequential_Read_Type:            ["disk model"]
          HLookup(Installed_Paging_Disk_Controllers,
              Installed_Disk_Types,
              Disk_Sequential_Read_Unit,
              FALSE)

Disk_Sequential_Read_Index:           ["disk model index"]
          Match(Disk_Sequential_Read_Type,
              Disk_Types,
              0) + 1

Disk_Sequential_Read_Thruput:         ["bytes/second"]
          HLookup(System_Sequential_Read_Size,
              Sequential_Disk_Throughput,
              Disk_Sequential_Read_Index,
              FALSE)

Disk_Sequential_Read_Time:  ["seconds"]
          (
              System_Sequential_Read_Size
          ) /
          Disk_Sequential_Read_Thruput // Assume only one sequential read net controller for now Net_Sequential_Read_Controller:       ["controller model"]
          VLookup(Installed_Paging_Net_Controllers,
              Installed_Network_Controller_Types,
              2,
              FALSE)

Net_Sequential_Read_Controller_Index: ["controller model index"]
          Match(Net_Sequential_Read_Controller,
              Net_Adapter_Types,
              0) + 1

Net_Sequential_Read_Thruput:          ["bytes/second"]
          HLookup(System_Sequential_Read_Size,
              Network_Adapter_Thruput,
              Net_Sequential_Net_Controller_Index,
              FALSE)
```

```
Net_Sequential_Read_Time:             ["seconds"]
          (
              System_Sequential_Read_Size
          ) /
          Net_Sequential_Read_Thruput Device_Sequential_Read_Time:          ["seconds"]
          LOCAL_SEQUENTIAL_READ_AFFINITY *
          Disk_Sequential_Read_Time +
          ( 1 - LOCAL_SEQUENTIAL_READ_AFFINITY) *
          Net_Sequential_Read_Time Sequential_Read_Physical_Logical_Ratio: ["ratio"]
          APPLICATION_SEQUENTIAL_READ_SIZE /
          System_Sequential_Read_Size System_Sequential_Read_Device_Time: ["seconds"]
          max
          (
              1,
              Sequential_Read_Physical_Logical_Ratio
          ) *
          (
              LOCAL_SEQUENTIAL_READ_AFFINITY *
              System_Sequential_Read_Disk_Processing +
              ( 1 - LOCAL_SEQUENTIAL_READ_AFFINITY)
              *
              System_Sequential_Read_Net_Processing
          ) /
          Relative_Processor_Speed Sequential_Read_Cycle:                ["seconds"]
          max
          (
              Device_Sequential_Read_Period *
              Sequential_Read_Cache_Cycle +
              System_Sequential_Read_Device_Time,
              Device_Sequential_Read_Time *
              max
              (
                  1,
                  Sequential_Read_Physical_Logical_Ratio
              )
          )

// Determine the amount of time spent doing Sequential_Write

// The following is supposed to compute the average disk write
// time over all installed devices: use each element in the
// array of installed devices as an index in the
Sequential_Disk_Throughput
// array row, with System_Sequential_Write_Size specifying the
column.
```

FIG. 7-6

```
//Device_Sequential_Write_Time:
//         Average(Installed_Disk_Types,
//                 Disk_Types,
//                 Sequential_Disk_Throughput,
//                 System_Sequential_Write_Size)

// Until we figure out the above, we'll use the paging devices
// for file IO.

System_Sequential_Write_Size:        ["bytes"]
        int
        (
          if
          (
            APPLICATION_SEQUENTIAL_WRITE_SIZE
<=100,
            8973.635 +
            (
              469.9826 *
              APPLICATION_SEQUENTIAL_WRITE_SIZE
            ),
            46713.5 +
            (
              -0.13689 *
              APPLICATION_SEQUENTIAL_WRITE_SIZE
            )
          ) +
          Page_Size_Used - 1
        ) /
        Page_Size_Used
        ) *
        Page_Size_Used Disk_Sequential_Write_Unit:          ["logical unit"]
        Match(Installed_Paging_Disks,
              Installed_Disk_Logical_Units,
              0) + 1

Disk_Sequential_Write_Type:   ["disk model"]
        HLookup(Installed_Paging_Disk_Controllers,
                Installed_Disk_Types,
                Disk_Sequential_Write_Unit,
                FALSE)

Disk_Sequential_Write_Index:  ["disk model index"]
        Match(Disk_Sequential_Write_Type,
              Disk_Types,
              0) + 1

Disk_Sequential_Write_Thruput:       ["bytes/second"]
        HLookup(System_Sequential_Write_Size,
                Sequential_Disk_Throughput,
                Disk_Sequential_Write_Index,
                FALSE)
```

```
// Multiple of times we use a device when doing sequential writes

Device_Sequential_Read_For_Write_Required:   ["0 or 1"]
        int
        (
          (
            mod
            (
              APPLICATION_SEQUENTIAL_WRITE_SIZE,
              Page_Size_Used
            ) /
            Page_Size_Used
          ) +
          (
            Page_Size_Used - 1
          ) /
          Page_Size_Used
        )
//
//      Device_Sequential_Write_Period System_Sequential_Read_For_Write_Device_Processing:
["seconds"]
        Device_Sequential_Read_For_Write_Required *
        (
          LOCAL_RANDOM_WRITE_AFFINITY *
          System_Random_Read_For_Write_Disk_Processing +
          ( 1 - LOCAL_RANDOM_WRITE_AFFINITY) *
          System_Random_Read_For_Write_Net_Processing
        )

Device_Sequential_Read_For_Write_Frequency:   ["dev reads /
app logical dev write"]
        if
        (
          APPLICATION_SEQUENTIAL_WRITE_SIZE<
          Page_Size_Used,
          System_Sequential_Write_Size /
          Page_Size_Used,
          max
          (
            1,
            System_Sequential_Write_Size /
            APPLICATION_SEQUENTIAL_WRITE_SIZE
          )
        )

System_Sequential_Read_For_Write_Device_Time: ["seconds"]
        System_Sequential_Read_For_Write_Device_Processing /
                Relative_Processor_Speed // The following is supposed to compute the average disk read
```

FIG. 7-7

```
// time over all installed devices: use each element in the
// array of installed devices as an index into the
Sequential_Disk_Throughput
// array row, with Page_Size_Used specifying the column.

//Device_Sequential_Read_For_Write_Time:
//        Average(Installed_Disk_Types,
//                Disk_Types,
//                Sequential_Disk_Throughput,
//                Page_Size_Used)

// Until we figure out the above, we'll use the paging devices
// for file IO.

Disk_Sequential_Read_For_Write_Thruput:     ["bytes/second"]
        HLookup(Page_Size_Used,
                Sequential_Disk_Throughput,
                Disk_Sequential_Write_Index,
                FALSE)

// This can't go as fast as just reading. Cut speed to allow
// for concurrent writing.

Device_Sequential_Read_For_Write_Interference:   ["factor"]
        max
        (
                1 - Device_Sequential_Read_For_Write_Required,
                .9 *
                Device_Sequential_Read_For_Write_Required
        )

Disk_Sequential_Read_For_Write_Time:   ["seconds"]
        (
                Page_Size_Used /
                Disk_Sequential_Read_For_Write_Thruput
        ) /
        Device_Sequential_Read_For_Write_Interference // Assume only one Sequential write net controller for now Net_Sequential_Read_For_Write_Thruput:     ["bytes/seconds"]
        HLookup(Page_Size_Used,
                Network_Adapter_Thruput,
                Net_Sequential_Write_Controller_Index,
                FALSE)

// Need a better way to specify size of Sequential net IO

Net_Sequential_Read_For_Write_Time:   ["seconds"]
        (
                Page_Size_Used /
                Net_Sequential_Read_For_Write_Thruput
        ) /
        Device_Sequential_Read_For_Write_Interference
```

```
Sequential_Write_Physical_Logical_Ratio: ["physical writes per app
write"]
                APPLICATION_SEQUENTIAL_WRITE_SIZE /
                System_Sequential_Write_Size Device_Sequential_Read_For_Write_Time:       ["seconds"]
                LOCAL_SEQUENTIAL_WRITE_AFFINITY *
                Disk_Sequential_Read_For_Write_Time +
                ( 1 - LOCAL_SEQUENTIAL_WRITE_AFFINITY) *
                Net_Sequential_Read_For_Time Device_Sequential_Write_Period:   ["app writes per device write"]
                System_Sequential_Write_Size /
                APPLICATION_SEQUENTIAL_WRITE_SIZE Application_Sequential_Write_Frequency: ["app write processing
per read"]
                Relative_Sequential_Write_Processing /
                (
                        Device_Sequential_Read_Period *
                        Relative_Sequential_Read_Processing
                )

// Figure total Read_For_Writes per logical device access, then
// partition Read_For_Writes among the application writes Sequential_Read_For_Write_Cache_Cycle:       ["seconds"]
                Device_Sequential_Read_For_Write_Frequency *
                (
                        System_Sequential_Read_For_Write_Device_Time +
                        Device_Sequential_Read_For_Write_Time
                ) /
                Device_Sequential_Write_Period Sequential_Write_Cache_Cycle:        ["seconds"]
                (
                        Application_Sequential_Write_Frequency *
                        Sequential_Read_Cycle
                ) +
                (
                        System_Sequential_Write_Cache_Processing /
                        Relative_Processor_Speed
                ) +
                Sequential_Read_For_Write_Cache_Cycle // TBD:
// The next formula reduces the write throughput by some of the
// amount of activity caused by the necessary Read_For_Write's, if
any,
// use as the factor.

Disk_Sequential_Write_Time:  ["seconds"]
                (
                        System_Sequential_Write_Size /
                        Disk_Sequential_Write_Thruput
```

FIG. 7-8

```
        )*
        max
        (
            1,
            Sequential_Write_Physical_Logical_Ratio
        )/
        Device_Sequential_Read_For_Write_Interference // Assume only one sequential write net controller for now Net_Sequential_Write_Controller:        ["controller model"]
        VLookup(Installed_Paging_Net_Controllers,
            Installed_Network_Controller_Types,
            2,
            FALSE)

Net_Sequential_Write_Controller_Index: ["controller model index"]
        Match(Net_Sequential_Write_Controller,
            Net_Adapter_Types,
            0) + 1

Net_Sequential_Write_Thruput:        ["bytes/second"]
        HLookup(System_Sequential_Write_Size,
            Network_Adapter_Thruput,
            Net_Sequential_Write_Controller_Index,
            FALSE)

// Assume only one Sequential write net controller for now

Net_Sequential_Write_Controller:        ["controller model"]
        VLookup(Installed_Paging_Net_Controllers,
            Installed_Network_Controller_Types,
            2,
            FALSE)

Net_Sequential_Write_Controller_Index: ["controller model index"]
        Match(Net_Sequential_Write_Controller,
            Net_Adapter_Types,
            0) + 1

Net_Sequential_Write_Thruput:        ["bytes/second"]
        HLookup(System_Sequential_Write_Size,
            Network_Adapter_Thruput,
            Net_Sequential_Write_Controller_Index,
            FALSE)

// Need a better way to specify size of Sequential net IO

Net_Sequential_Write_Time:        ["seconds"]
        (
            System_Sequential_Write_Size
            Net_Sequential_Write_Thruput
        )*
        max
        (
            1,
```

```
            Sequential_Write_Physical_Logical_Ratio
        )/
        Device_Sequential_Read_For_Write_Interference Device_Sequential_Write_Time:        ["seconds"]
        LOCAL_SEQUENTIAL_WRITE_AFFINITY *
        Disk_Sequential_Write_Time +
        (1 - LOCAL_SEQUENTIAL_WRITE_AFFINITY) *
        Net_Sequential_Write_Time System_Sequential_Write_Device_Processing: ["seconds"]
        max
        (
            1,
            Sequential_Write_Physical_Logical_Ratio
        )*
        (
            LOCAL_SEQUENTIAL_WRITE_AFFINITY *
            System_Sequential_Write_Disk_Processing +
            (1 - LOCAL_SEQUENTIAL_WRITE_AFFINITY
        )*
            System_Sequential_Write_Net_Processing
        )

System_Sequential_Write_Device_Time:        ["seconds"]
        System_Sequential_Write_Device_Processing /
        Relative_Processor_Speed Sequential_Write_Synchronous_Cycle:        ["seconds"]
        (
            Device_Sequential_Write_Period *
            Sequential_Write_Cache_Cycle
        ) +
        System_Sequential_Write_Device_Time Sequential_Write_Asynchronous_Cycle: ["seconds"]
        Device_Sequential_Write_Time //There is little overlap between the async and sync portions
// of sequential write: the next read is quickly blocked on the
// last write. Assume they are sequential for now.

Sequential_Write_Cycle:        ["seconds"]
        Sequential_Write_Synchronous_Cycle +
        Sequential_Write_Asynchronous_Cycle // Determine the amount of time spent doing Random_Read
// Multiple of times we use a device when doing random reads // See RanRdOu2.xls for coefficients
System_Random_Read_Size:        ["bytes"]
        min
        (
            Maximum_IO_Size,
            Page_Size_Used +
            int
```

FIG. 7-9

```
(
  (
    0.4095 *
    APPLICATION_RANDOM_READ_SIZE +
    6590
  ) /
  Page_Size_Used
) *
Page_Size_Used
)
```

// Constants in the next line come from a linear regression
// against random write unbuffered Response Probe

```
System_Random_Write_Size:        ["bytes"]
    int
    (
      (
        (
          0.4797 *
          APPLICATION_RANDOM_WRITE_SIZE +
          7452
        ) +
        Page_Size_Used - 1
      ) /
      Page_Size_Used
    ) *
    Page_Size_Used
```

// Need to adjust this if ..._EXTENT's not frequently accessed,
// since then will not really need the memory so much.

```
Total_RAM_Demand:                ["megabytes"]
    RAM_Demand +
    RANDOM_READ_EXTENT +
    RANDOM_WRITE_EXTENT
```

// Here we use the remaining memory as the system cache, and
// assume uniform access to random space.

```
Device_Random_Read_Period:   ["app reads per device read"]
    1 /
    (
      1 -
      min
      (
        0.999999,
        (
          max
          (
            0,
            Installed_RAM -
            RAM_Demand
          )
        ) /
        (
          RANDOM_READ_EXTENT +
          RANDOM_WRITE_EXTENT
        )
      )
    )

Application_Random_Read_Frequncy:   ["random reads per
sequential write"]
        Relative_Random_Read_Processing /
        (
          Device_Sequential_Write_Period *
          Relative_Sequential_Write_Processing
        )

Random_Read_Cache_Cycle:            ["seconds"]
        Applications_Random_Read_Frequency *
        Sequential_Write_Cycle +
        System_Random_Read_Cache_Processing /
        Relative_Processor_Speed Random_Read_Physical_Logical_Ratio:    ["ratio"]
        max
        ( 1,
          APPLICATION_RANDOM_READ_SIZE /
          System_Random_Read_Size
        )

System_Random_Read_Device_Processing:   ["seconds"]
        Random_Read_Physical_Logical_Ratio *
        (
          LOCAL_RANDOM_WRITE_AFFINITY *
          System_Random_Read_Disk_Processing +
          (1 - LOCAL_RANDOM_WRITE_AFFINITY) *
          System_Random_Read_Net_Processing
        )

System_Random_Read_Device_Time:         ["seconds"]
        System_Random_Read_Device_Processing /
        Relative_Processor_Speed
```

// The following is supposed to compute the average disk read
// time over all installed devices: use each element in the
// array of installed devices as an index into the
Random_Disk_Throughput
// array row, with Page_Size_Used specifying the column.

```
//Device_Random_Read_Time:
//      Average(Installed_Disk_Types,
//              Disk_Types,
//              Random_Disk_Throughput,
//              Page_Size_Used)
```

// Until we figure out the above, we'll use the paging devices
// for file IO.

FIG. 7-10

```
Disk_Random_Read_Unit:              ["logical unit"]
        Match(Installed_Paging_Disks,
                Installed_Disk_Logical_Units,
                0) + 1

Disk_Random_Read_Type:              ["disk model"]
        HLookup(Installed_Paging_Disk_Controllers,
                Installed_Disk_Types,
                Disk_Sequential_Read_Unit,
                FALSE)

Disk_Random_Read_Index:             ["disk model index"]
        Match(Disk_Random_Read_Type,
                Disk_Types,
                0) + 1

Disk_Random_Read_Thruput:           ["bytes/second"]
        HLookup(System_Random_Read_Size,
                Random_Disk_Throughput,
                Disk_Random_Read_Index,
                FALSE)

Disk_Random_Read_Time:              ["seconds"]
        (
                System_Random_Read_Size /
                Disk_Random_Read_Thruput
        ) *
        Random_Read_Physical_Logical_Ratio // Assume only one random read net controller for now Net_Random_Read_Controller:         ["controller model"]
        VLookup(Installed_Paging_Net_Controllers,
                Installed_Network_Controller_Types,
                2,
                FALSE)

Net_Random_Read_Controller_Index:   ["controller model index"]
        Match(Net_Random_Read_Controller,
                Net_Adapter_Types,
                0) + 1

Net_Random_Read_Thruput:            ["bytes/second"]
        HLookup(System_Random_Read_Size,
                Network_Adapter_Thruput,
                Net_Random_Read_Controller_Index,
                FALSE)

// Need a better way to specify size of random net IO

Net_Random_Read_Time:               ["seconds"]
        (
                System_Random_Read_Size /
                Net_Random_Read_Thruput
        ) *
        Random_Read_Physical_Logical_Ratio Device_Random_Read_Time:            ["seconds"]
        LOCAL_RANDOM_READ_AFFINITY *
        Disk_Random_Read_Time +
        ( 1 - LOCAL_RANDOM_READ_AFFINITY ) *
        Net_Random_Read_Time // System_Random_Read_Device_Time is not included in the next formula
// because it's incremental portion mostly overlapped with
// Device_Random_Read_Time (but is this true only on PIO controllers?)

Random_Read_Cycle:                  ["seconds"]
        Device_Random_Read_Period *
        Random_Read_Cache_Cycle +
        Device_Random_Read_Time // Determine the amount of time spent doing Random_Write // Multiple of times we use a device when doing random writes // Determine the amount of time spent doing Reads for Random_Write // Multiple of times we use a device when doing random writes // The following will be 0 if writing a multiple of Page_Size_Used,
// else it will be a fraction one, and we must read a page for each
// miss of the cache (the final division handles the cache miss)

Device_Random_Read_For_Write_Required:  ["0, or a fraction of 1"]
        int
        (
                (
                        mod
                        (
                                APPLICATION_RANDOM_WRITE_SIZE,
                                Page_Size_Used
                        ) /
                        Page_Size_Used
                ) +
                (
                        Page_Size_Used - 1
                ) /
                Page_Size_Used
        ) /
        Device_Random_Read_Period
```

FIG. 7-11

```
Device_Random_Write Period:        ["app writes per device write"]
    1 /
    (
        1 -
            min
            ( 0.999999,
                (
                    max
                    (
                        0,
                        Installed_RAM - RAM_Demand
                    )
                ) /
                (
                    RANDOM_READ_EXTENT +
                    RANDOM_WRITE_EXTENT
                )
            )
    )

Application_Random_Write_Frequency: ["app writes per app read"]
    Relative_Random_Write_Processing /
    (
        Device_Random_Read_Period *
        Relative_Random_Read_Processing
    )

System_Random_Read_For_Write_Device_Processing:
["seconds"]
    Device_Random_Read_For_Write_Required *
    (
        LOCAL_RANDOM_WRITE_AFFINITY *
        System_Random_Read_For_Write_Disk_Processing +
        ( 1 - LOCAL_RANDOM_WRITE_AFFINITY) *
        System_Random_Read_For_Write_Net_Processing
    )

Random_Write_Cache_Cycle:          ["seconds"]
    Application_Random_Write_Frequency *
    Random_Read_Cycle +
    (
        System_Random_Write_Cache_Processing /
        Relative_Processor_Speed
    )

Random_Write_Physical_Logical_Ratio: ["ratio"]
    max
    ( 1,
        APPLICATION_RANDOM_WRITE_SIZE /
        System_Random_Write_Size
    )

// The following is supposed to compute the average disk write
// time over all installed devices: use each element in the
// array of installed devices as an index into the
Random_Disk_Throughput
// array row, with Maximum_IO_Size specifying the column.
```

```
//Disk_Random_Write_Time:
//          Average(Installed_Disk_Types,
//                  Disk_Types,
//                  Random_Disk_Throughput,
//                  Maximum_IO_Size)

// Until we figure out the above, we'll use the paging devices
// for file IO.

Disk_Random_Write_Unit:             ["logical unit"]
    Match(Installed_Paging_Disks,
          Installed_Disk_Logical_Units,
          0) + 1

Disk_Random_Write_Type:             ["disk model"]
    HLookup(Installed_Paging_Disk_Controllers,
            Installed_Disk_Types,
            Disk_Random_Write_Unit,
            FALSE)

Disk_Random_Write_Index:            ["disk model index"]
    Match(Disk_Random_Write_Type,
          Disk_Types,
          0) + 1

Disk_Random_Write_Thruput: ["bytes/second"]
    HLookup(System_Random_Write_Size,
            Random_Disk_Throughput,
            Disk_Random_Write_Index,
            FALSE)

// The following is supposed to compute the average disk read
// time over all installed devices: use each element in the
// array of installed devices as an index into the
Random_Disk_Throughput
// array row, with Page_Size_Used specifying the column.

//Disk_Random_Read_For_Write_Time:
//          Average(Installed_Disk_Types,
//                  Disk_Types,
//                  Random_Disk_Throughput,
//                  Page_Size_Used)

// Until we figure out the above, we'll use the paging devices
// for file IO.

Disk_Random_Read_For_Write_Thruput:    ["bytes/second"]
    HLookup(Page_Size_Used,
            Random_Disk_Throughput,
            Disk_Random_Write_Index,
            FALSE)

Disk_Random_Read_For_Write_Time:       ["seconds"]
    Device_Random_Read_For_Write_Required *
    Page_Size_Used /
    Disk_Random_Read_For_Write_Thruput
```

FIG. 7-12

```
// TBD:
// The next formula should reduce the write throughput by some of
// the amount of activity caused by the necessary Read_For_Write's Disk_Random_Write_Time:              ["seconds"]
       (
            System_Random_Write_Size /
            Disk_Random_Write_Thruput
       ) *
            Random_Write_Physical_Logical_Ratio // Assume only one random write net controller for now Net_Random_Write_Controller:          ["controller model"]
            VLookup(Installed_Paging_Net_Controllers,
                Installed_Network_Controller_Types,
                2,
                FALSE)

Net_Random_Write_Controller_Index: ["controller model index"]
            Match(Net_Random_Write_Controller,
                Net_Adapter_Types,
                0) + 1

Net_Random_Write_Thruput:            ["bytes/second"]
            HLookup(System_Random_Write_Size,
                Network_Adapter_Thruput,
                Net_Random_Write_Controller_Index,
                FALSE)

// Assume only one random write net controller for now

Net_Random_Read_For_Write_Thruput:   ["bytes/second"]
            HLookup(Page_Size_Used,
                Network_Adapter_Thruput,
                Net_Random_Write_Controller_Index,
                FALSE)

// Need a better way to specify size of random net IO

Net_Random_Read_For_Write_Time:       ["seconds"]
            Device_Random_Read_For_Write_Required *
            Page_Size_Used /
            Net_Random_Read_For_Write_Thruput // Need a better way to specify size of random net IO Net_Random_Write_Time:                ["seconds"]
       (
            System_Random_Write_Size /
            Net_Random_Write_Thruput
       ) *
            Random_Write_Physical_Logical_Ratio Device_Random_Read_For_Write_Time:    ["seconds"]
            LOCAL_RANDOM_WRITE_AFFINITY *
            Disk_Random_Read_For_Write_Time +
            ( 1 - LOCAL_RANDOM_WRITE_AFFINITY) *
            Net_Random_Read_For_Write_Time Device_Random_Write_Time:             ["seconds"]
            LOCAL_RANDOM_WRITE_AFFINITY *
            Disk_Random_Write_Time +
            ( 1 - LOCAL_RANDOM_WRITE_AFFINITY) *
            Net_Random_Write_Time System_Random_Write_Device_Processing:   ["seconds"]
            LOCAL_RANDOM_WRITE_AFFINITY *
            System_Random_Write_Disk_Processing +
            ( 1 - LOCAL_RANDOM_WRITE_AFFINITY) *
            System_Random_Write_Net_Processing System_Random_Write_Device_Time:      ["seconds"]
       (
            System_Random_Read_For_Write_Device_Processing +
                System_Random_Write_Device_Processing
       ) /
            Relative_Processor_Speed // Writing to the device is overlapped via write-behind, but
// reading the partial page (if any) is sequential with writing Random_Write_Cycle:                   ["seconds"]
            max
            (
                Device_Random_Write_Period *
                Random_Write_Cache_Cycle +
                System_Random_Write_Device_Time +
                Device_Random_Read_For_Write_Time,
                Device_Random_Write_Time
            )

//*****************************************************
*******

// Now we can calculate the demand for each type of device

// First calculate some ratios we need to partition time

// Note: need to do something about time overlap between devices

Random_Write_Ratio:                   ["ratio"]
            Device_Random_Write_Period *
            Application_Random_Write_Frequency Random_Read_Ratio:                    ["ratio"]
            Random_Write_Ratio *
            Device_Random_Read_Period *
            Application_Random_Read_Frequency Sequential_Write_Ratio:               ["ratio"]
            Random_Read_Ratio *
            Device_Sequential_Write_Period *
```

FIG. 7-13

Application_Sequential_Write_Frequency

Sequential_Read_Ratio:     ["ratio"]
    Sequential_Write_Ratio *
    Device_Sequential_Read_Period *
    Application_Sequential_Read_Frequency Disk_Random_Write_Demand:     ["time fraction"]
    Non_Paging_Time *
    LOCAL_RANDOM_WRITE_AFFINITY *
    (
      Disk_Random_Write_Time
    ) /
    Random_Write_Cycle Net_Random_Write_Demand:     ["time fraction"]
    Non_Paging_Time *
    ( 1 - LOCAL_RANDOM_WRITE_AFFINITY) *
    (
      Net_Random_Write_Time
    ) /
    Random_Write_Cycle Disk_Random_Read_For_Write_Demand:     ["time fraction"]
    Non_Paging_Time *
    LOCAL_RANDOM_WRITE_AFFINITY *
    (
      Disk_Random_Read_For_Write_Time
    ) /
    Random_Write_Cycle Net_Random_Read_For_Write_Demand:     ["time fraction"]
    Non_Paging_Time *
    ( 1 - LOCAL_RANDOM_WRITE_AFFINITY) *
    (
      Net_Random_Read_For_Write_Time
    ) /
    Random_Write_Cycle Disk_Random_Read_Demand:     ["time fraction"]
    Disk_Random_Read_For_Write_Demand +
    (
      Non_Paging_Time *
      Random_Write_Ratio *
      LOCAL_RANDOM_READ_AFFINITY *
      (
        Disk_Random_Read_Time
      ) /
      Random_Write_Cycle
    )

Net_Random_Read_Demand:     ["time fraction"]
    Net_Random_Read_For_Write_Demand +
    (
      Non_Paging_Time *
      Random_Write_Ratio *
      ( 1 - LOCAL_RANDOM_READ_AFFINITY) *

(
        Net_Random_Read_Time
      ) /
      Random_Write_Cycle
    )

Disk_Sequential_Read_For_Write_Demand:     ["time fraction"]
    Non_Paging_Time *
    Random_Read_Ratio *
    LOCAL_SEQUENTIAL_WRITE_AFFINITY *
    Disk_Sequential_Read_For_Write_Time *
    Device_Sequential_Read_For_Write_Frequency /
    Random_Write_Cycle Net_Sequential_Read_For_Write_Demand:     ["time fraction"]
    Non_Paging_Time *
    Random_Read_Ratio *
    ( 1 - LOCAL_SEQUENTIAL_WRITE_AFFINITY) *
    Net_Sequential_Read_For_Write_Time *
    Device_Sequential_Read_For_Write_Frequency /
    Random_Write_Cycle Disk_Sequential_Write_Demand:     ["time fraction"]
    Non_Paging_Time *
    Random_Read_Ratio *
    LOCAL_SEQUENTIAL_WRITE_AFFINITY *
    Disk_Sequential_Write_Time /
    Random_Write_Cycle Net_Sequential_Write_Demand:     ["time fraction"]
    Non_Paging_Time *
    Random_Read_Ratio *
    ( 1 - LOCAL_SEQUENTIAL_WRITE_AFFINITY) *
    Net_Sequential_Write_Time /
    Random_Write_Cycle Disk_Sequential_Read_Demand:     ["time fraction"]
    Disk_Sequential_Read_For_Write_Demand +
    (
      Non_Paging_Time *
      Sequential_Write_Ratio *
      LOCAL_SEQUENTIAL_READ_AFFINITY *
      Disk_Sequential_Read_Time
      Random_Write_Cycle
    )

Net_Sequential_Read_Demand:     ["time fraction"]
    Net_Sequential_Read_For_Write_Demand +
    (
      Non_Paging_Time *
      Sequential_Write_Ratio *
      ( 1 - LOCAL_SEQUENTIAL_READ_AFFINITY)
    *
      Net_Sequential_Read_Time /
      Random_Write_Cycle
    )

FIG. 7-14

```
Graphics_Device_demand:            ["time fraction"]
        Non_Paging_Time *
        Sequential_Read_Ratio *
        Graphics_Device_Speed *
        APPLICATION_GRAPHICS_SIZE /
        Random_Write_Cycle System_Random_Write_Demand:        ["time fraction"]
        Non_Paging_Time *
        (
          (
            Device_Random_Write_Period *
            System_Random_Write_Cache_Processing /
            Relative_Processor_Speed
          ) +
          System_Random_Write_Device_Time
        ) /
        Random_Write_Cycle System_Random_Read_Demand:         ["time fraction"]
        Non_Paging_Time *
        Random_Write_Ratio *
        (
          (
            Device_Random_Read_Period *
            System_Random_Read_Cache_Processing /
            Relative_Processor_Speed
          ) +
          System_Random_Write_Device_Time
        ) /
        Random_Write_Cycle System_Sequential_Write_Demand:    ["time fraction"]
        Non_Paging_Time *
        (
          Random_Read_Ratio *
          (
            Device_Sequential_Write_Period *
            (
              System_Sequential_Write_Cache_Processing /
              Relative_Processor_Speed
            ) +
            System_Sequential_Read_For_Write_Device_Time +
            System_Sequential_Write_Device_Time
          ) /
          Random_Write_Cycle
        )

System_Sequential_Read_Demand:     ["time fraction"]
        Non_Paging_Time *
        (
          Sequential_Write_Ratio *
          (
            Device_Sequential_Read_Period *
            (
              System_Sequential_Read_Cache_Processing /
              Relative_Processor_Speed
            ) +
            System_Sequential_Read_Device_Time
          ) /
          Random_Write_Cycle
        )

System_Graphics_Demand:            ["time fraction"]
        Non_Paging_Time *
        (
          Sequential_Read_Ratio *
          System_Graphics_Processing /
          Relative_Processor_Speed /
          Random_Write_Cycle
        )

Application_Random_Write_Demand:   ["time fraction"]
        Non_Paging_Time *
        Device_Random_Write_Period *
        Relative_Random_Write_Processing /
        Random_Write_Cycle Application_Random_Read_Demand:    ["time fraction"]
        Non_Paging_Time *
        Random_Write_Ratio *
        Device_Random_Read_Period *
        Relative_Random_Read_Processing /
        Random_Write_Cycle Application_Sequential_Write_Demand:  ["time fraction"]
        Non_Paging_Time *
        Random_Read_Ratio *
        Device_Sequential_Write_Period *
        Relative_Sequential_Write_Processing /
        Random_Write_Cycle Application_Sequential_Read_Demand:   ["time fraction"]
        Non_Paging_Time *
        Sequential_Write_Ratio *
        Device_Sequential_Read_Period *
        Relative_Sequential_Read_Processing /
        Random_Write_Cycle Application_Graphics_Demand:       ["time fraction"]
        Non_Paging_Time *
        Sequential_Read_Ratio *
        Relative_Graphics_Processing /
        Random_Write_Cycle Disk_Sequential_Demand:            ["time fraction"]
        Disk_Sequential_Write_Demand +
        Disk_Sequential_Read_Demand Disk_Random_Demand:                ["time fraction"]
        Disk_Random_Write_Demand +
        Disk_Random_Read_Demand
```

FIG. 7-15

```
Disk_File_Demand:                    ["time fraction"]
    Disk_Sequential_Demand +
    Disk_Random_Demand Disk_Demand:                         ["time fraction"]
    Disk_File_Demand +
    Disk_Paging_Demand Disk.Pct_Disk_Time:                  ["time percent"]
    Disk_Demand Net_Sequential_Demand:               ["time fraction"]
    Net_Sequential_Write_Demand +
    Net_Sequential_Read_Demand Net_Random_Demand:                   ["time fraction"]
    Net_Random_Write_Demand +
    Net_Random_Read_Demand Net_File_Demand:                     ["time fraction"]
    Net_Sequential_Demand +
    Net_Random_Demand Net_Demand:                          ["time fraction"]
    Net_File_Demand +
    Net_Paging_Demand Lan_Statistics.Pct_Net_Time:         ["time percent"]
    Net_Demand System_Random_File_Demand:           ["time fraction"]
    System_Random_Write_Demand +
    System_Random_Read_Demand System_Sequential_File_Demand:       ["time fraction"]
    System_Sequential_Write_Demand +
    System_Sequential_Read_Demand System_File_Demand:                  ["time fraction"]
    System_Random_File_Demand +
    System_Sequential_File_Demand Application_Demand:                  ["time fraction"]
    Application_Graphics_Demand Non_Paging_Demand:                   ["time fraction"]
    Application_Demand +
    Graphics_Device_Demand +
    Disk_File_Demand +
    Net_File_Demand +
    System_File_Demand +
    System_Graphics_Demand Processor_Demand:                    ["time fraction"]
    Application_Demand +
```

```
    System_Demand

Disk_Sequential_Read_Rate:           ["operations/second"]
    Non_Paging_Time *
    Sequential_Write_Ratio *
    LOCAL_SEQUENTIAL_READ_AFFINITY *
    max
    (
        1,
        Sequential_Read_Physical_Logical_Ratio
    ) /
    Random_Write_Cycle Disk_Sequential_Read_Byte_Rate:      ["bytes/second"]
    Disk_Sequential_Read_Rate *
    System_Sequential_Read_Size Net_Sequential_Read_Rate:            ["operations/second"]
    Non_Paging_Time *
    Sequential_Write_Ratio *
    ( 1 - LOCAL_SEQUENTIAL_READ_AFFINITY ) *
    max
    (
        1,
        Sequential_Read_Physical_Logical_Ratio
    ) /
    Random_Write_Cycle Net_Sequential_Read_Byte_Rate:       ["bytes/second"]
    Net_Sequential_Read_Rate *
    System_Sequential_Read_Size Disk_Sequential_Read_For_Write_Rate: ["operations/second"]
    Non_Paging_Time *
    Random_Read_Ratio *
    Device_Sequential_Read_For_Write_Frequency *
    LOCAL_SEQUENTIAL_WRITE_AFFINITY /
    Random_Write_Cycle Net_Sequential_Read_For_Write_Rate:  ["operations/second"]
    Non_Paging_Time *
    Random_Read_Ratio *
    Device_Sequential_Read_For_Write_Frequency *
    ( 1 - LOCAL_SEQUENTIAL_WRITE_AFFINITY ) /
    Random_Write_Cycle Disk_Sequential_Read_For_Write_Byte_Rate: ["bytes/second"]
    Disk_Sequential_Read_For_Write_Rate *
    Page_Size_Used Net_Sequential_Read_For_Write_Byte_Rate:  ["bytes/second"]
    Net_Sequential_Read_For_Write_Rate *
    Page_Size_Used Disk_Sequential_Write_Rate:          ["operations/second"]
    Non_Paging_Time *
    Random_Read_Ratio *
```

FIG. 7-16

```
LOCAL_SEQUENTIAL_WRITE_AFFINITY *
    max
    (
        1,
        APPLICATION_SEQUENTIAL_WRITE_SIZE /
        System_Sequential_Write_Size
    ) /
    Random_Write_Cycle Disk_Sequential_Write_Byte_Rate:   ["bytes/second"]
    Disk_Sequential_Write_Rate *
    System_Sequential_Write_Size Net_Sequential_Write_Rate:         ["operations/second"]
    Non_Paging_Time *
    Random_Read_Ratio *
    ( 1 - LOCAL_SEQUENTIAL_WRITE_AFFINITY ) *
    max
    (
        1,
        APPLICATION_SEQUENTIAL_WRITE_SIZE /
        System_Sequential_Write_Size
    ) /
    Random_Write_Cycle Net_Sequential_Write_Byte_Rate:    ["bytes/second"]
    Net_Sequential_Write_Rate *
    System_Sequential_Write_Size Disk_Random_Read_For_Write_Rate:   ["operations/second"]
    Non_Paging_Time *
    Device_Random_Read_For_Write_Frequency *
    LOCAL_RANDOM_WRITE_AFFINITY /
    Random_Write_Cycle Disk_Random_Read_For_Write_Byte_Rate: ["bytes/second"]
    Disk_Random_Read_For_Write_Rate *
    Page_Size_Used Disk_Random_Read_Rate:             ["operations/second"]
    Non_Paging_Time *
    Random_Write_Ratio *
    LOCAL_RANDOM_READ_AFFINITY *
    Random_Read_Physical_Logical_Ratio /
    Random_Write_Cycle Disk_Random_Read_Byte_Rate:        ["bytes/second"]
    Disk_Random_Read_Rate *
    System_Random_Read_Size Net_Random_Read_For_Write_Rate:    ["operations/second"]
    Non_Paging_Time *
    Device_Random_Read_For_Write_Required *
    ( 1 - LOCAL_RANDOM_WRITE_AFFINITY ) /
    Random_Write_Cycle
```

```
Net_Random_Read_For_Write_Byte_Rate: ["bytes/second"]
    Net_Random_Read_For_Write_Rate *
    Page_Size_Used Net_Random_Read_Rate:              ["operations/second"]
    Non_Paging_Time *
    Random_Write_Ratio *
    ( 1 - LOCAL_RANDOM_READ_AFFINITY ) *
    Random_Read_Physical_Logical_Ratio /
    Random_Write_Cycle Net_Random_Read_Byte_Rate:         ["bytes/second"]
    Net_Random_Read_Rate *
    System_Random_Read_Size Disk_Random_Write_Rate:            ["operations/second"]
    Non_Paging_Time *
    LOCAL_RANDOM_WRITE_AFFINITY *
    Random_Write_Physical_Logical_Ratio /
    Random_Write_Cycle Disk_Random_Write_Byte_Rate:       ["bytes/second"]
    Disk_Random_Write_Rate *
    System_Random_Write_Size Net_Random_Write_Rate:             ["operations/second"]
    Non_Paging_Time *
    ( 1 - LOCAL_RANDOM_WRITE_AFFINITY ) *
    Random_Write_Cycle Net_Random_Write_Byte_Rate:        ["bytes/second"]
    Net_Random_Write_Rate *
    System_Random_Write_Size Cache_Sequential_Read_Hit_Rate:    ["hits/second"]
    Non_Paging_Time *
    (
        1 +
        (
            APPLICATION_SEQUENTIAL_READ_SIZE /
            Page_Size_Used
        )
    ) *
    (
        Device_Sequential_Read_Period /
        Sequential_Read_Cycle
    )

Cache_Sequential_Write_Hit_Rate:   ["hits/second"]
    Non_Paging_Time *
    (
        1 +
        (
            APPLICATION_SEQUENTIAL_WRITE_SIZE /
            Page_Size_Used
        )
    ) *
```

FIG. 7-17

```
        (
          ( Device_Sequential_Write_Period - 1 ) /
          Sequential_Write_Cycle
        )

// If App Read size < Page Size, then cache is diluted by
// fluff in page not accessed by reads; same as writes Cache_Random_Read_Hit_Rate:        ["hits/second"]
        Non_Paging_Time *
        (
          (
            1 +
            (
              APPLICATION_RANDOM_READ_SIZE /
              Page_Size_Used
            )
          ) *
          (
            ( Device_Random_Read_Period - 1 ) /
            Random_Read_Cycle
          )
        ) *
        sqrt
        (
          min
          (
            1,
            APPLICATION_RANDOM_READ_SIZE /
            Page_Size_Used
          )
        )

Cache_Random_Write_Hit_Rate:       ["hits/second"]
        Non_Paging_Time *
        (
          ( Device_Random_Read_Period - 1 ) /
          Random_Write_Cycle
        ) *
        sqrt
        (
          min
          (
            1,
            APPLICATION_RANDOM_WRITE_SIZE /
            Page_Size_Used
          )
        )

Cache_Sequential_Read_Access_Rate: ["accesses/second"]
        Non_Paging_Time *
        (
          1 +
          (
            APPLICATION_SEQUENTIAL_READ_SIZE /
            Page_Size_Used
          )
        )
```

```
        ) *
        (
          Device_Sequential_Read_Period
          Sequential_Read_Cycle
        )

Cache_Sequential_Write_Access_Rate: ["accesses/second"]
        Non_Paging_Time *
        (
          1 +
          (
            APPLICATION_SEQUENTIAL_WRITE_SIZE /
            Page_Size_Used
          )
        ) *
        (
          Device_Sequential_Write_Period
          Sequential_Write_Cycle
        )

Cache_Random_Read_Access_Rate:     ["accesses/second"]
        Non_Paging_Time *
        (
          1 +
          (
            APPLICATION_RANDOM_READ_SIZE /
            Page_Size_Used
          )
        ) *
        Device_Random_Read_Period
        Random_Read_Cycle Cache_Random_Write_Access_Rate:    ["accesses/second"]
        Non_Paging_Time *
        (
          Device_Random_Write_Period
          Random_Write_Cycle
        )

Cache_Hit_Rate:                    ["hits/second"]
        (
          Cache_Sequential_Read_Hit_Rate +
          Cache_Random_Read_Hit_Rate
        )

Cache_Access_Rate:                 ["accesses/second"]
        (
          Cache_Sequential_Read_Access_Rate +
          Cache_Random_Read_Access_Rate
        )

Cache.Copy_Reads_Per_Sec:          ["hits/second"]
        (
          Cache_Sequential_Read_Access_Rate +
          Cache_Random_Read_Access_Rate
        )
```

FIG. 7-18

```
Cache.Copy_Read_Hits_Pct:          ["percent"]
        if
        (
            Cache_Access_Rate > 0,
            Cache_Hit_Rate /
            Cache_Access_Rate,
            0
        )

Cache.Data_Map_Pins_Per_Sec:       ["hits/second"]
        Cache_Sequential_Write_Hit_Rate +
        Cache_Random_Write_Hit_Rate Cache.Data_Map_Pins_Hits_Pct:      ["percent"]
        Non_Paging_Time *
        (
            Device_Sequential_Write_Period +
            Device_Random_Write_Period - 2
        ) /
        (
            Device_Sequential_Write_Period +
            Device_Random_Write_Period
        )

Disk.Disk_Reads_Per_Sec:           ["operations/second"]
        Disk_Paging_Read_Rate +
        Disk_Sequential_Read_Rate +
        Disk_Sequential_Read_For_Write_Rate +
        Disk_Random_Read_Rate +
        Disk_Random_Read_For_Write_Rate Disk.Disk_Reads_Bytes_Per_Sec:     ["bytes/second"]
        Disk_Paging_Read_Byte_Rate +
        Disk_Sequential_Read_Byte_Rate +
        Disk_Sequential_Read_For_Write_Byte_Rate +
        Disk_Random_Read_Byte_Rate +
        Disk_Random_Read_For_Write_Byte_Rate Disk.Disk_Writes_Per_Sec:          ["operations/second"]
        Disk_Paging_Write_Rate +
        Disk_Sequential_Write_Rate +
        Disk_Random_Write_Rate Disk.Disk_Writes_Bytes_Per_Sec:    ["bytes/second"]
        Disk_Paging_Write_Byte_Rate +
        Disk_Sequential_Write_Byte_Rate +
        Disk_Random_Write_Byte_Rate Net.Reads_Per_Sec:                 ["operations/second"]
        Net_Paging_Read_Rate +
        Net_Sequential_Read_Rate +
        Net_Sequential_Read_For_Write_Rate +
        Net_Random_Read_Rate +
        Net_Random_Read_For_Write_Rate Net.Reads_Bytes_Per_Sec:           ["bytes/second"]
        Net_Paging_Read_Byte_Rate +
        Net_Sequential_Read_Byte_Rate +
        Net_Sequential_Read_For_Write_Byte_Rate +
        Net_Random_Read_Byte_Rate +
        Net_Random_Read_For_Write_Byte_Rate Net.Writes_Per_Sec:                ["operations/second"]
        Net_Paging_Write_Rate +
        Net_Sequential_Write_Rate +
        Net_Random_Write_Rate Net.Writes_Bytes_Per_Sec:          ["bytes/second"]
        Net_Paging_Write_Byte_Rate +
        Net_Sequential_Write_Byte_Rate +
        Net_Random_Write_Byte_Rate Device_Sequential_Paging_Rate:     ["pages/second"]
        (
            Disk_Sequential_Read_Byte_Rate +
            Disk_Sequential_Write_Byte_Rate +
            Net_Sequential_Read_Byte_Rate +
            Net_Sequential_Write_Byte_Rate +
        ) /
        Page_Size_Used Device_Random_Read_Paging_Rate:    ["pages/second"]
        (
            Disk_Sequential_Read_For_Write_Byte_Rate +
            Disk_Random_Read_Byte_Rate +
            Disk_Random_Read_For_Write_Rate +
            Net_Sequential_Read_For_Write_Byte_Rate +
            Net_Random_Read_Byte_Rate +
            Net_Random_Read_For_Write_Rate
        ) /
        Page_Size_Used Device_Random_Write_Paging_Rate:   ["pages/second"]
        (
            Disk_Random_Write_Byte_Rate +
            Net_Random_Write_Byte_Rate
        ) /
        Page_Size_Used Device_Random_Paging_Rate:         ["pages/second"]
        Device_Random_Read_Paging_Rate +
        Device_Random_Write_Paging_Rate Cache.Lazy_Write_Pages_Per_Sec:    ["pages/second"]
        (
            Disk_Sequential_Write_Byte_Rate +
            Disk_Random_Write_Byte_Rate +
            Net_Sequential_Write_Byte_Rate +
            Net_Random_Write_Byte_Rate
        ) /
        Page_Size_Used
```

FIG. 7-19

```
// The following is empirical, see paging\ctrsum.xls. It estimates
// the soft fault rate from the input page rate. I'd rather see a
// "< 0.5" here, but it doesn't quite verify.
// The Sqrt(Relative_Processor_Speed) is a cheap way to scale
// paging throughput. Works empirically, so far, but...

Soft_Fault_Rate:                        ["page faults/sec"]
      max
      (
          0,
          if
          (
              Paging_Intensity < 0.6,
              7.355 +
              (
                  7.013 *
                  Input_Page_Rate
              ),
              (
                  514.8 *
                  sqrt
                  (
                      Relative_Processor_Speed
                  )
              ) -
              (
                  4.857 *
                  Input_Page_Rate
              )
          )
          +
          Device_Sequential_Paging_Rate +
          Device_Random_Paging_Rate // The following formula is empirical: see seqrdbuf.xls & ranrdbuf.xls Memory.Cache_Faults_Per_Sec:            ["faults/sec"]
      0.75 *
      (
          Device_Sequential_Paging_Rate +
          Device_Random_Paging_Rate
      )

Disk_Read_File_Byte_Rate:               ["bytes/second"]
          Disk_Sequential_Read_Byte_Rate +
          Disk_Sequential_Read_For_Write_Byte_Rate +
          Disk_Random_Read_Byte_Rate +
          Disk_Random_Read_For_Write_Byte_Rate Net_Read_File_Byte_Rate:                ["bytes/second"]
          Net_Sequential_Read_Byte_Rate +
          Net_Random_Read_Byte_Rate +
          Net_Sequential_Read_For_Write_Byte_Rate +
          Net_Random_Read_For_Write_Byte_Rate Memory.Pages_Input_Per_Sec:             ["pages/second"]
          Input_Page_Rate +
          (
              (
                  Disk_Read_File_Byte_Rate +
                  Net_Read_File_Byte_Rate
              ) /
              Page_Size_Used
          )

// There seems to be some residual output paging whenever there
// is input paging.
Memory_Background_Output_Page_Rate:     ["pages/second"]
          if
          (
              Memory.Pages_Input_Per_Sec > 0,
              System_Background_Output_Page_Rate,
              0
          )

Memory.Pages_Output_Per_Sec:            ["pages/second"]
          Memory_Background_Output_Page_Rate +
          (
              Disk_Paging_Write_Rate *
              System_Page_Output_Size /
              Page_Size_Used
          ) +
          (
              Net_Paging_Write_Rate *
              System_Page_Output_Size /
              Page_Size_Used
          )

Memory.Pages_Per_Sec:                   ["pages/second"]
          Memory.Pages_Input_Per_Sec +
          Memory.Pages_Output_Per_Sec System_Paging_Demand:                   ["time fraction"]
      min
      (
          1,
          (
              (
                  System_Page_Processing *
                  Paging_Intensity
              ) +
              (
                  System_Hard_Fault_Processing *
                  Device_Paging_Read_Rate
              ) +
              System_Hard_Fault_Disk_Processing +
              (
                  System_Soft_Fault_Processing *
                  Soft_Fault_Rate
              )
          ) /
          Relative_Processor_Speed
      )
```

FIG. 7-20

```
System_Demand:                      ["time fraction"]
        System_File_Demand +
        System_Graphics_Demand +
        System_Paging_Demand System.Pct_Privileged_Time:         ["time percent"]
        System_Demand System.Pct_Processor_Time:          ["time percent"]
        Processor_Demand System.Pct_User_Time:               ["time percent"]
        Application_Demand Sequential_Read_Relative_Rate:      ["ratio"]
        min
        (
            1,
            .001 /
            Relative_Sequential_Read_Processing
        )

Sequential_Write_Relative_Rate:     ["ratio"]
        min
        (
            1,
            .001 /
            Relative_Sequential_Write_Processing
        )

Random_Read_Relative_Rate:          ["ratio"]
        min
        (
            1,
            .001 /
            Relative_Random_Read_Processing
        )

Random_Write_Relative_Rate:         ["ratio"]
        min
        (
            1,
            .001 /
            Relative_Random_Write_Processing
        )

System_Sequential_Call_Rate:        ["calls/second"]
        (
            441 *
            Sequential_Read_Relative_Rate
        ) +
        (
            2 * Application_Sequential_Read_Demand /
            Relative_Sequential_Read_Processing
        ) +
        (
            900 *
            Sequential_Write_Relative_Rate
        ) +
        (
            2 * Application_Sequential_Write_Demand /
            Relative_Sequential_Write_Processing
        )

System_Random_Call_Rate:            ["calls/second"]
        (
            850 *
            Random_Read_Relative_Rate
        ) +
        (
            4 * Application_Random_Read_Demand /
            Relative_Sequential_Read_Processing
        ) +
        (
            900 *
            Random_Write_Relative_Rate
        ) +
        (
            3 * Application_Random_Write_Demand /
            Relative_Random_Write_Processing
        )

// Eventually we need to determine how much of the following is
// caused by Perfmon
System_Idle_System_Calls_Per_Sec:   ["calls/second"]
        System_Idle_System_Call_Rate *
        APPLICATION_IDLE // The following formula needs to include application calls to
// system routines outside the file system. TBD.

System.System_Calls_Per_Sec:        ["calls/second"]
        System_Idle_System_Calls_Per_Sec +
        System_Sequential_Call_Rate +
        System_Random_Call_Rate +
        (
            System_Idle_System_Call_Rate *
            Paging_Intensity
        ) +
// The following constant is just a guess; not yet calibrated
        (
            10 * Application_Graphics_Demand /
            Relative_Graphics_Processing
        )

Demand:                             ["time fraction"]
        Paging_Demand +
        Non_Paging_Demand Time:                               ["time fraction"]
        APPLICATION_IDLE +
        Processor_Demand +
        Graphics_Device_Demand +
```

FIG. 7-21

Disk_Demand +
    Net_Demand

Graphics_Throughput:  ["transactions/sec"]
    Non_Paging_Time /
    Graphics_Cycle_Time Sequential_Read_Throughput:  ["transactions/sec"]
    Non_Paging_Time *
    Device_Sequential_Read_Period /
    Sequential_Read_Cycle Sequential_Write_Throughput:  ["transactions/sec"]
    Non_Paging_Time *
    Device_Sequential_Write_Period /
    Sequential_Write_Cycle Random_Read_Throughput:  ["transactions/sec"]
    Non_Paging_Time *
    Device_Random_Read_Period /
    Random_Read_Cycle Random_Write_Throughput:  ["transactions/sec"]
    Non_Paging_Time *
    Device_Random_Write_Period /
    Random_Write_Cycle Throughput:  ["transactions/sec"]
    max
    (
     Graphics_Throughput,
     Sequential_Read_Throughput,
     Sequential_Write_Throughput,
     Random_Read_Throughput,
     Random_Write_Throughput,
    )

| | |
|---|---|
| APP_SEQ_READ_SIZE | =app.xls'!APP_SEQ_READ_SIZE |
| APPLICATION_CODE_RAM_DEMAND | =app.xls'!APPLICATION_CODE_RAM_DEMAND |
| APPLICATION_DATA_RAM_DEMAND | =app.xls'!APPLICATION_DATA_RAM_DEMAND |
| APPLICATION_GRAPHICS_PROCESSING | =app.xls'!APPLICATION_GRAPHICS_PROCESSING |
| APPLICATION_GRAPHICS_SIZE | =app.xls'!APPLICATION_GRAPHICS_SIZE |
| APPLICATION_IDLE | =app.xls'!APPLICATION_IDLE |
| APPLICATION_RAM_DEMAND | =app.xls'!APPLICATION_RAM_DEMAND |
| APPLICATION_RANDOM_READ_PROCESSING | =app.xls'!APPLICATION_RANDOM_READ_PROCESSING |
| APPLICATION_RANDOM_READ_SIZE | =app.xls'!APPLICATION_RANDOM_READ_SIZE |
| APPLICATION_RANDOM_WRITE_PROCESSING | =app.xls'!APPLICATION_RANDOM_WRITE_PROCESSING |
| APPLICATION_RANDOM_WRITE_SIZE | =app.xls'!APPLICATION_RANDOM_WRITE_SIZE |
| APPLICATION_SEQUENTIAL_READ_PROCESSING | =app.xls'!APPLICATION_SEQUENTIAL_READ_PROCESSING |
| APPLICATION_SEQUENTIAL_READ_SIZE | =app.xls'!APPLICATION_SEQUENTIAL_READ_SIZE |
| APPLICATION_SEQUENTIAL_WRITE_PROCESSING | =app.xls'!APPLICATION_SEQUENTIAL_WRITE_PROCESSING |
| APPLICATION_SEQUENTIAL_WRITE_SIZE | =app.xls'!APPLICATION_SEQUENTIAL_WRITE_SIZE |
| LOCAL_PAGING_AFFINITY | =app.xls'!LOCAL_PAGING_AFFINITY |
| LOCAL_RANDOM_READ_AFFINITY | =app.xls'!LOCAL_RANDOM_READ_AFFINITY |
| LOCAL_RANDOM_WRITE_AFFINITY | =app.xls'!LOCAL_RANDOM_WRITE_AFFINITY |
| LOCAL_SEQUENTIAL_READ_AFFINITY | =app.xls'!LOCAL_SEQUENTIAL_READ_AFFINITY |
| LOCAL_SEQUENTIAL_WRITE_AFFINITY | =app.xls'!LOCAL_SEQUENTIAL_WRITE_AFFINITY |
| RANDOM_READ_EXTENT | =app.xls'!RANDOM_READ_EXTENT |
| RANDOM_WRITE_EXTENT | =app.xls'!RANDOM_WRITE_EXTENT |
| Disk_Controller_Thruput | =hardware.xls'!Disk_Controller_Thruput |
| Disk_Controller_Types | =hardware.xls'!Disk_Controller_Types |
| Disk_Thruput | =hardware.xls'!Disk_Thruput |

FIG. 8-1

| | |
|---|---|
| Disk_Types | =hardware.xls'!Disk_Types |
| Graphics_Controller_Thruput | =hardware.xls'!Graphics_Controller_Thruput |
| Graphics_Controller_Types | =hardware.xls'!Graphics_Controller_Types |
| Max_Disk_Controller_Thruput | =hardware.xls'!Max_Disk_Controller_Thruput |
| Max_Net_Adapter_Thruput | =hardware.xls'!Max_Net_Adapter_Thruput |
| Max_Network_Type_Thruput | =hardware.xls'!Max_Network_Type_Thruput |
| Net_Adapter_Types | =hardware.xls'!Net_Adapter_Types |
| Network_Adapter_Thruput | =hardware.xls'!Network_Adapter_Thruput |
| Network_Types | =hardware.xls'!Network_Types |
| Page_Size | =hardware.xls'!Page_Size |
| Processor_Speed_Names | =hardware.xls'!Processor_Speed_Names |
| Processor_Speeds | =hardware.xls'!Processor_Speeds |
| Processor_Types | =hardware.xls'!Processor_Types |
| Random_Disk_Throughput | =hardware.xls'!Random_Disk_Throughput |
| Relative_Memory_Size | =hardware.xls'!Relative_Memory_Size |
| Relative_Processor_Speeds | =hardware.xls'!Relative_Processor_Speeds |
| Sequential_Disk_Throughput | =hardware.xls'!Sequential_Disk_Throughput |
| Disk_Controller | =install.xls'!Disk_Controller |
| Disk_Controller_Type | =install.xls'!Disk_Controller_Type |
| Installed_Disk_Controller_Type | =install.xls'!Installed_Disk_Controller_Type |
| Installed_Disk_Logical_Units | =install.xls'!Installed_Disk_Logical_Units |
| Installed_Disk_Types | =install.xls'!Installed_Disk_Types |
| Installed_Graphics_Color | =install.xls'!Installed_Graphics_Color |
| Installed_Graphics_Controller | =install.xls'!Installed_Graphics_Controller |
| Installed_Graphics_Resolution | =install.xls'!Installed_Graphics_Resolution |
| Installed_Net_Protocol | =install.xls'!Installed_Net_Protocol |
| Installed_Network_Controller_Types | =install.xls'!Installed_Network_Controller_Types |
| Installed_Number_Of_Disk_Controllers | =install.xls'!Installed_Number_Of_Disk_Controllers |
| Installed_Number_Of_Disks | =install.xls'!Installed_Number_Of_Disks |
| Installed_Number_Of_Processors | =install.xls'!Installed_Number_Of_Processors |

FIG. 8-2

| | |
|---|---|
| Installed_Paging_Disk_Controllers | =install.xls'!Installed_Paging_Disk_Controllers |
| Installed_Paging_Disks | =install.xls'!Installed_Paging_Disks |
| Installed_Paging_Net_Controllers | =install.xls'!Installed_Paging_Net_Controllers |
| Installed_Processor_Speed | =install.xls'!Installed_Processor_Speed |
| Installed_Processor_Type | =install.xls'!Installed_Processor_Type |
| Installed_RAM | =install.xls'!Installed_RAM |
| Installed_Secondary_Cache | =install.xls'!Installed_Secondary_Cache |
| Network_Type | =install.xls'!Netwrok_Type |
| Processor | =install.xls'!Processor |
| Processor_Type | =install.xls'!Processor_Type |
| Processors | =install.xls'!Processors |
| CSRSS_RAM_Demand | =software.xls'!CSRSS_RAM_Demand |
| Drivers_Non_Paged | =software.xls'!Drivers_Non_Paged |
| Kernel_Non_Paged | =software.xls'!Kernel_Non_Paged |
| Maximum_IO_Size | =software.xls'!Maximum_IO_Size |
| Pool_Non_Paged | =software.xls'!Pool_Non_Paged |
| Pool_Paged | =software.xls'!Pool_Paged |
| Protocol_Non_Paged | =software.xls'!Protocol_Non_Paged |
| Spooler_RAM_Demand | =software.xls'!Spooler_RAM_Demand |
| System_Background_Output_Page_Rate | =software.xls'!System_Background_Output_Page_Rate |
| System_Code_Paged | =software.xls'!System_Code_Paged |
| System_Graphics_Processing | =software.xls'!System_Graphics_Processing |
| System_Hard_Fault_Processing | =software.xls'!System_Hard_Fault_Processing |
| System_Idle_System_Call_Rate | =software.xls'!System_Idle_System_Call_Rate |
| System_Nominal_Available_Bytes | =software.xls'!System_Nominal_Available_Bytes |
| System_Page_Processing | =software.xls'!System_Page_Processing |
| System_Random_Read_Cache_Processing | =software.xls'!System_Random_Read_Cache_Processing |
| System_Random_Read_Disk_Processing | =software.xls'!System_Random_Read_Disk_Proces |

| | |
|---|---|
| | sing |
| System_Random_Read_For_Write_Disk_Processing | =software.xls'!System_Random_Read_For_Write_Disk_Processing |
| System_Random_Read_For_Write_Net_Processing | =software.xls'!System_Random_Read_For_Write_Net_Processing |
| System_Random_Read_Net_Processing | =software.xls'!System_Random_Read_Net_Processing |
| System_Random_Write_Cache_Processing | =software.xls'!System_Random_Write_Cache_Processing |
| System_Random_Write_Disk_Processing | =software.xls'!System_Random_Write_Disk_Processing |
| System_Random_Write_Net_Processing | =software.xls'!System_Random_Write_Net_Processing |
| System_Sequential_Read_Cache_Processing | =software.xls'!System_Sequential_Read_Cache_Processing |
| System_Sequential_Read_Disk_Processing | =software.xls'!System_Sequential_Read_Disk_Processing |
| System_Sequential_Read_Net_Processing | =software.xls'!System_Sequential_Read_Net_Processing |
| System_Sequential_Write_Cache_Processing | =software.xls'!System_Sequential_Write_Cache_Processing |
| System_Sequential_Write_Disk_Processing | =software.xls'!System_Sequential_Write_Disk_Processing |
| System_Sequential_Write_Net_Processing | =software.xls'!System_Sequential_Write_Net_Processing |
| System_Soft_Fault_Processing | =software.xls'!System_Soft_Fault_Processing |

(RECOMMENDATION)

AUTOMATIC BOTTLENECK DETECTION BY MEANS OF WORKLOAD RECONSTRUCTION FROM PERFORMANCE MEASUREMENTS

TECHNICAL FIELD

The invention relates generally to the field of computer system performance and, more specifically, to identifying changes to computer system resources to improve performance.

BACKGROUND OF THE INVENTION

Computer system performance has been studied extensively in the field of computer science. One goal in studying computer system performance is to determine a cost-effective configuration of the computer system that can handle the expected workload. The workload placed on a computer system is the amount of work to be performed by a computer program and is typically specified in terms of resources needed to complete one transaction. For example, the workload may specify that the computer program uses five seconds of central processor time and performs 10 sequential disk reads with an average size of 4096 bytes per transaction. The workload may further specify the amount of RAM needed by the application program. To predict performance of a computer system when executing a computer program with an expected workload, prior techniques have created models of a computer system and then apply the expected workload to the model to predict performance measurements that would occur when the expected workload is placed on the computer system. A performance measurement typically corresponds to performance characteristics of a system resource (e.g., processor utilization).

In current computer processing environments, two factors make determining a cost-effective configuration using such techniques especially difficult. The first factor is the complexity of the interaction between the operating system and the hardware. Because of this complexity, it is difficult to predict the overall performance of the computer system, and thus very difficult to generate an accurate model. For example, although a disk drive may be capable of accessing its disk twenty-five times a second, the processing performed by the file system may place a further limit on the access rate. Moreover, the variety of possible computer system configurations, especially with personal computers, makes it virtually impossible to generate an accurate model that is appropriate for all possible configurations. The second factor is the difficulty in determining what is the expected workload. Traditionally, single application programs typically executed on dedicated hardware, for example, an airline reservation system. With such single application systems, it was relatively straightforward to determine the workload placed on the computer system. Current computing environments are typically client/server-based, and multiple applications may be executing on a single computer system. The execution and interaction of the multiple applications make it difficult to determine the overall workload. Furthermore, it may be difficult to estimate or measure typical patterns of usages of the various application programs.

If, however, an appropriate model could be developed and an accurate workload could be specified, then it may be possible to identify the system resources that are a "bottleneck." A bottleneck is the computer system resource that has the highest utilization during execution of a workload. (Although it is possible to have multiple bottlenecks, that is, resources with the same highest utilization, such occurrences are rare.) For example, if a workload requires 0.25 seconds of CPU time per transaction and 0.5 seconds of disk time per transaction, then the disk is a bottleneck because its 50% utilization is greater than the processor's 25% utilization. In other words, the disk can handle 2 transactions per second and the CPU can handle 4 transactions per second. Thus, if the current CPU was replaced by a CPU that was twice as fast, the computer system still could only handle 2 transactions per second. Conversely, if the current disk drive, the bottleneck, is replaced by a disk drive that is twice as fast, then the computer system could handle 4 transactions per second. Once a particular resource is identified as a bottleneck, a number of remedies exist. These include distributing the load on the resource across additional instances of that resource, installing a faster resource, or redesigning the workload to use another resource. These remedies will resolve the bottleneck by reducing the time spent using the bottleneck resource. Bottlenecks cannot be eliminated, however, only moved. There is always some resource which can be faster to the benefit of the workload's completion time. Thus, the decision to remove a bottleneck is frequently an issue of cost versus benefit.

SUMMARY OF THE INVENTION

The present invention provides system and method for determining a workload placed on a target computer system during execution of a specified computer program. The system receives a set of performance measurements representing the performance of the target computer system during execution of the specified computer program. The system then identifies a plurality of workloads and for each identified workload, predicts a set of performance measurements that would results when a computer program that places the identified workload on the target computer system is executed. The system selects the identified workload whose set of predicted performance measurements most closely matches the received set of performance measurements as the determined workload that was place on the target computer system during execution of the specified computer program.

In one aspect of the present invention, the system generates an analysis of modifications to a system resource of a target computer system that would result in improved performance during execution of computer programs on the target computer system. The system first collects performance characteristics of system resources of the target computer system and collects a set of actual performance measurements of the target computer system during execution of the computer programs on the target computer system. For each of the plurality of the test workloads, the system generates a set of predicted performance measurements that would result when the test workload is placed on the target computer system based on the collected performance characteristics of the target computer system. The system then determines the set of predicted performance measurements that most closely matches the set of actual performance measurements, such that the test workload when placed on the target computer system would result in the determined set of predicted performance measurements is the workload that most probably represents the actual workload. The system then identifies a system resource that is a bottleneck during execution of the computer programs based on the set of predicted performance measurements that most closely matches the set of actual performance measurements and selects a system resource that can be modified to reduce utilization of the bottleneck system resource. Finally, the system generates a set of predicted performance measurements that would result when the test workload that most probably represents the actual workload placed on the target computer system based on the collected performance characteristics of the target computer system with the selected system resource modified to reduce utilization of the bottleneck system resource.

These and other aspects of the present invention are more fully described below.

BRIEF DESCRIPTION OF THE DRAWINGS

FIGS. 4A(1,2)–4B represent the Operation System Performance Table

FIGS. 5A–5B represent the Hardware/Software Installed Table.

FIGS. 6A–6C(1,2)–6K represent the Hardware Performance Table.

FIGS. 7-1 through 7-21 list the equations of the preferred model.

FIGS. 8-1 to 8-4 contains a mapping from the names used in the equations of the model to the cells in the tables from which the data is retrieved.

FIG. 9 is a flow diagram of a preferred implementation of the system.

FIG. 10 is a flow diagram of the process of adapting of the model.

FIG. 11 is a flow diagram of the process of determining the performance characteristics of the system resources.

FIG. 12 is a flow diagram of the process of determining the error in the adapted model.

FIG. 13 is a flow diagram of the process for determining the most probable workload.

FIG. 14 is a flow diagram of the process for generates a recommendation to alleviate the bottleneck.

DETAILED DESCRIPTION OF THE INVENTION

Figure 1:
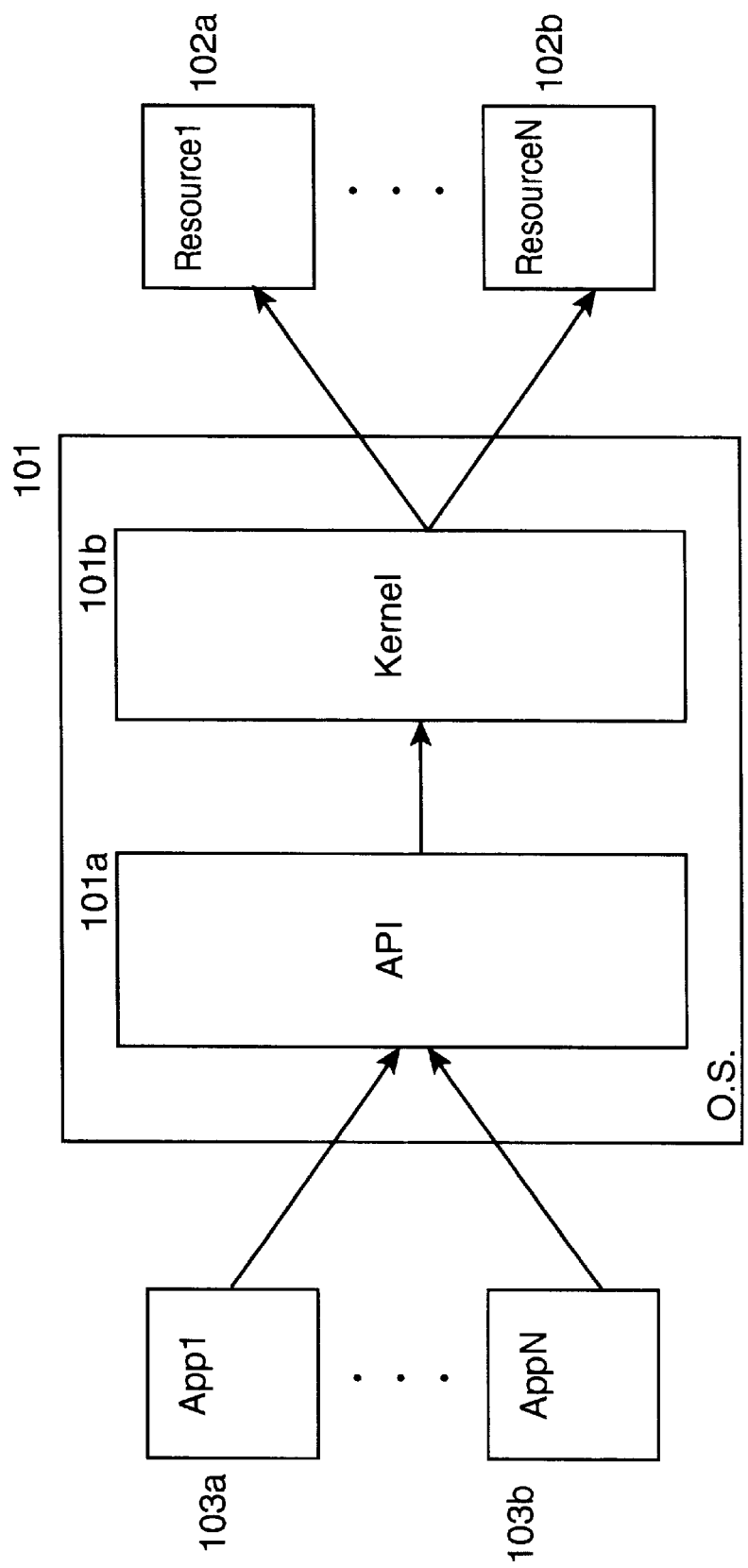
FIG. 1 is a block diagram illustrating the target computer system.

The present invention provides a method and a system for determining a cost-effective configuration for a target computer system that executes a set of target computer programs. To determine the configuration, the system collects actual performance measurements from the target computer system as it executes the target computer programs. The system uses these actual performance measurements along with a model of the target computer system to determine the most likely (or most probable) workload placed on the target computer system by the target computer program. In this way, an estimate of the actual workload can be generated. The system then uses the most probable workload to determine which system resource is the bottleneck resource. In a preferred embodiment the system provides an analysis of possible changes to the target computer system's configuration that will result in improved performance.

To determine a most probable workload, the system uses a model of a computer system and the actual performance measurements that were collected during execution of the target computer program. In the preferred embodiment, the model is a set of equations that predict what various performance measurements would be if a specified workload were placed on the computer system. To generate the predicted performance measurements, the set of equations interrelates the performance characteristics of the target computer system with the most probable workload. Although the preferred embodiment uses a model known as an "atomic model," the present invention can be used in conjunction with various other modeling techniques, such as, queuing theory and simulation techniques.

Before determining the most probable workload, the system determines the performance characteristics of individual resources of the target computer system. These performance characteristics are input to the model to effectively adapt the model to the target computer system. The system determines the performance characteristics (e.g., disk drive maximum transfer rate) of the various resources by placing various workloads, designed to determine the maximum performance of the resource, on the target computer system. For example, a workload that simply writes a 1K block to the disk per transaction is used to determine the maximum transfer rate to disk when the block size is 1K. This workload is placed on the target computer system for a certain period of time (e.g., 10 seconds) when no other workload is placed on the target computer system, and the number of bytes transferred is divided by the time period to arrive at the maximum transfer rate.

After the performance characteristics are determined, the system performs an error analysis of the adapted model. To generate the error analysis, the system applies a series of workloads to the adapted model to generate predicted performance measurements and executes a computer program that places the same series of workloads on the target computer system to generate actual performance measurements. The system uses the differences in the predicted performance measurements (from the model) and the actual performance measurements as a representation of the error in the adapted model.

After the performance characteristics have been determined and the error analysis completed, the model is ready for use in determining the most probable workload for a set of actual performance measurements. The adapted model is used to search for the workload that when placed on the target computer system is most likely based on the actual performance measurements collected during execution of the target computer program. Starting with an initial workload, the system applies the workload to the model to predict a set of performance measurements for the initial workload and then generates a probability that the workload generated the actual performance measurements. The system then generates a second workload by changing one or more workload parameters. The system then applies the second workload to the model to predict a second set of performance measurements and generates a second probability. As the system iterates, it seeks workloads that result in ever higher probability. In general, the system uses numerical search techniques to seek the workload which minimizes the probabilistic difference between the predicted performance measurements and the actual performance measurements in light of the error analysis. The resulting workload is called the most probable workload.

Once the most probable workload is determined, the adapted model is used to predict the resulting performance of various changes to the configuration of the target computer system. A user inputs to the system a range of possible configuration changes, including their performance characteristics and their costs. Using the model, the most probable workload, and the new performance characteristics, the system then predicts the new performance measurements. The system then displays the resulting price/performance choices to the user.

Target Computer System

FIG. 1 is a block diagram illustrating the target computer system. The target computer system comprises an operating system 101, and computer system hardware resources 102a–102b. The operating system further includes an application programming interface (API) 101a and a kernel 101b. In operation, the application programs 103a–103b place a workload on the target computer system by invoking functions of the API. The functions invoke the services of the kernel to access the various hardware resources of the computer system.

The System

Figure 2:
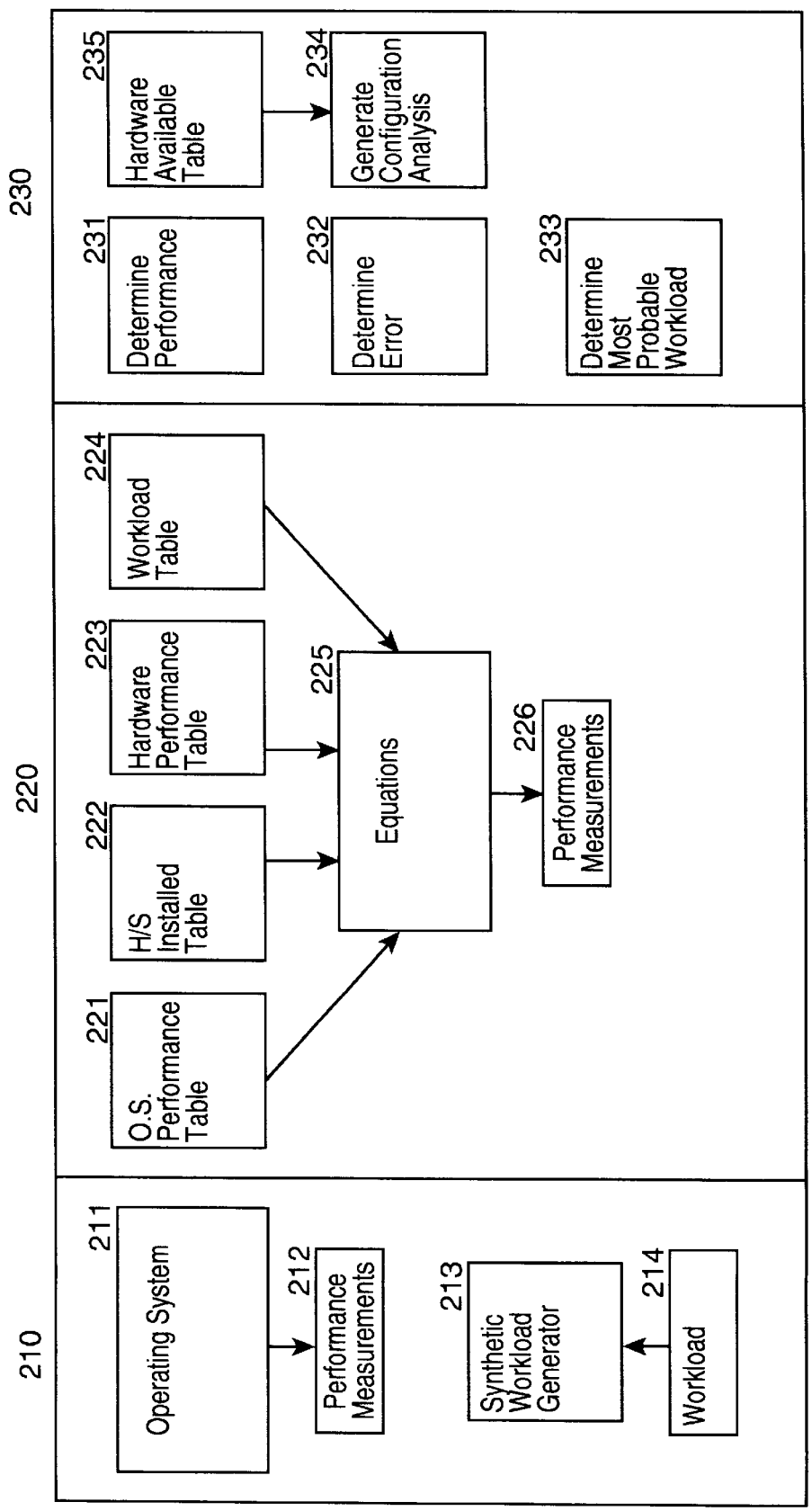
FIG. 2 is a block diagram illustrating components of the system in a preferred embodiment.

FIG. 2 is a block diagram illustrating components of the system in a preferred embodiment. The system comprises the model 220 and the system routines 230 and uses the pre-existing components 210. The pre-existing components include the operating system 211, which outputs actual performance measurements 212 during execution of workload, and the synthetic workload generator 213, which effects the placing of the workload 214 on the target computer system. The model 220 comprises the Operating System (O.S.) Performance Table 221, the Hardware/Software (H/S) Installed Table 222, the Hardware Performance Table 223, a Workload Table 224, equations 225, and predicted performance measurements 226. The system routines 230 include the determine performance routine 231, the determine error routine 232, the determine most probable workload routine 233, the generate configuration analysis routine 234, and the Hardware Available Table 235.

In operation, the determine performance routine is initially executed to determine the performance characteristics of the system resources and to store the performance characteristics in the Hardware Performance Table. The determine performance routine specifies various workloads and uses the synthetic workload generator to place the specified workloads on the target computer system. The determine error routine specifies various error analysis workloads and uses the synthetic workload generator to generate the actual performance measurements for the error analysis workloads. The determine error routine also applies those workloads to the model to generate predicted performance measurements.

The determine most probable workload routine repeatedly specifies test workloads and applies the test workloads to the model to generate predicted performance measurements. The predicted performance measurements are compared to the actual performance measurements in light of the error analysis. The test workload that resulted in the predicted performance measurements that are closest to the actual performance measurements is selected as the most probable workload. The generate configuration analysis routine adjusts the Hardware Performance Table based on the Hardware Available Table and then applies the most probable workload to the model to determine the effect of changes in the configuration of the target computer system.

The Model

Figure 3:
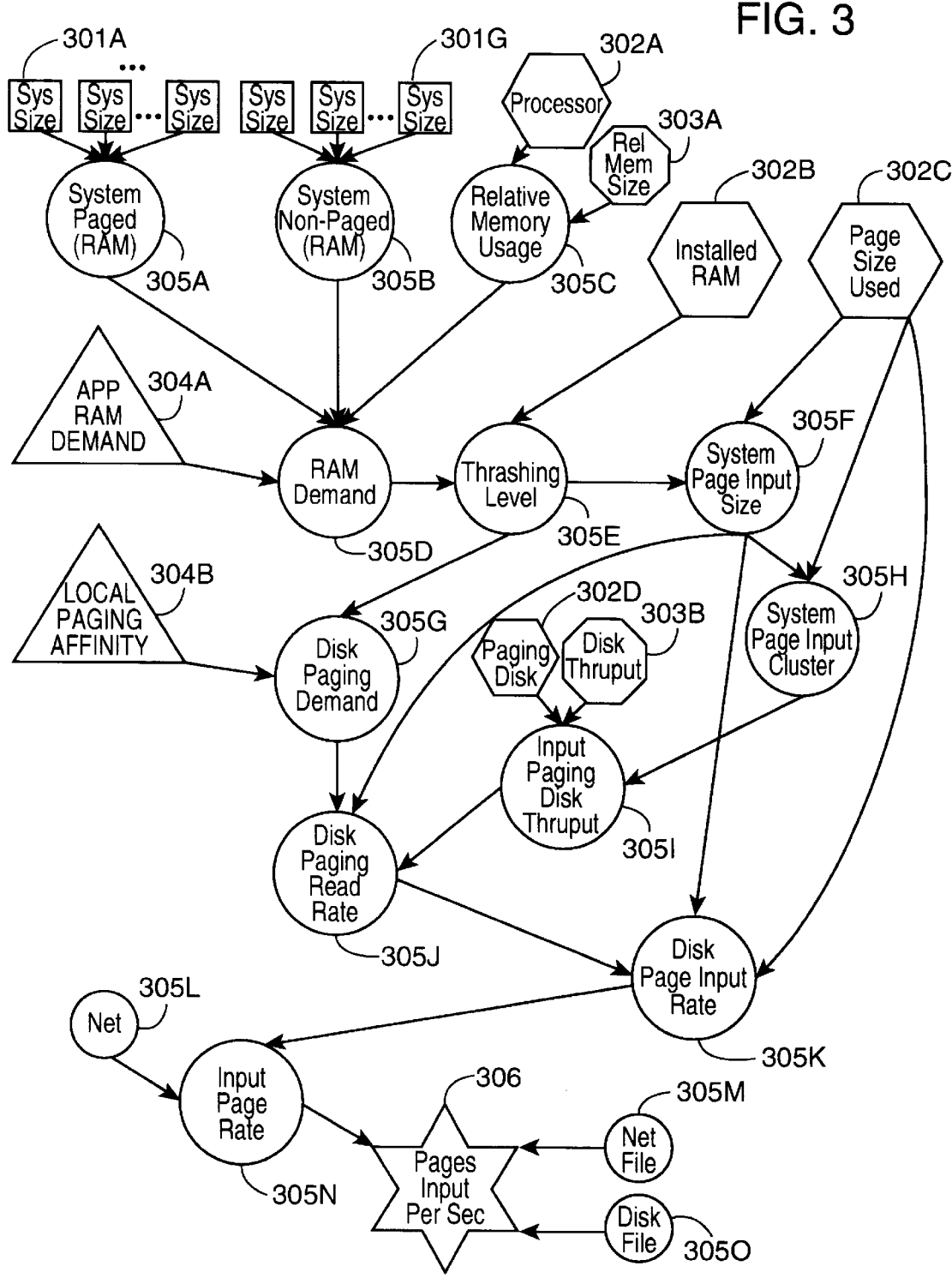
FIG. 3 is a diagram illustrating a portion of a preferred model of a computer system.

FIG. 3 is a diagram illustrating a portion of a preferred model of a computer system. The model inputs an Operating System (O.S.) Performance Table, a Hardware/Software (H/S) Installed Table, a Hardware Performance Table, and a workload, and outputs the predicted performance measurements that would result from applying the input to the model. The model uses various equations to combine the input to generate predicted performance measurements. Squares 301a–301g represent operating system performance characteristics from the O.S. Performance Table. Hexagons 302a–302d represent installed hardware and software characteristics from the H/S Installed Table Octagons 303a–303b represent hardware performance characteristics from the Hardware Performance Table. Triangles 304a–304b represent parameters of the workload. Circles 305a–305o and star 306 represent the equations of the model. Star 306 also represents a performance measurement that is predicted by the model. For example, the equation for "thrashing level" as represented by circle 305e is $$\text{Thrashing\_Level} = \frac{1}{1 + e^{\min(500,(\text{Installed\_RAM}-\text{RAM\_Demand})^3)}}$$

That is, the thrashing level is a function of the amount of installed RAM represented by hexagon 302b and the combined RAM demand of the workload and the operating system represented by circle 305d. Table 1 contains a listing of the equations corresponding to the portion of the model shown in FIG. 3. The model described is based on the Microsoft Windows NT Operating System executing on an Intel 80486-based computer system.

TABLE 1

```
// The following are NT characteristics or can be measured directly.
    System_Paged:              ["megabytes"]
                        CSRSS_RAM_Demand +
                        Spooler_RAM_Demand +
                        Pool_Paged +
                        System_Code_Paged +
                        System_Nominal_Available_Bytes
    System_Non_Paged:          ["megabytes"]
                        Pool_Non_Paged +
                        Kernel_Non_Paged +
                        Protocol_Non_Paged +
                        Drivers_Non_Paged +
// Relative_Memory_Size is a property of installed processor type.
    Relative_Memory_Usage:         ["ratio"]
                        Index(Relative_Memory_Size,
                            Installed_Processor_Index - 1)
    RAM_Demand:            ["megabytes"]
                        (
```

TABLE 1-continued

```
                            Relative_Memory_Usage *
                            (
                              System_Non_Paged + System_Paged
                            )
                          ) +
                          APPLICATION_RAM_DEMAND
// This is the key formula for mapping system RAM requirements.
Thrashing_Level:             ["fraction from 0 to 1"]
                          1/
                          (
                            (
                              1 +
                              exp
                              (
                                min
                                (
                                    500,
                                    (Installed_RAM - RAM_Demand) ^ 3
                                )
                              )
                            )
                          )
// These formulae determine input page cluster size.
System_Page_Input_Size:      ["bytes"]
                          max
                          (
                            Page_Size_Used,
                            2.5 * Page_Size_Used * Thrashing_Level
                          )
System_Page_Input_Cluster:   ["bytes"]
                          Page_Size_Used *
                          (
                            int
                            (
                              (   System_Page_Input_Size +
                                  Page_Size_Input) / Page_Size_Used
                            )
                          )
// This formula determines maximum paging rate.
Input_Paging_Disk_Throughput: ["bytes/second"]
                          Hlookup(System_Page_Input_Cluster,
                            Random_Disk_Throughput,
                            Paging_Disk_Index,
                            FALSE)
// These formulae determine actual input page rate.
Disk_Paging_Demand:          ["Fraction from 0 to 1"]
                          LOCAL_PAGING_AFFINITY *
                          Thrashing_Level
Disk_Paging_Read_Rate:       ["operations/second"]
                          Disk_Paging_Demand *
                          (
                            Input_Paging_Disk_Throughput / System_Page_Input_Size
                          )
Disk_Page_Input_Rate:        ["pages/sec"]
                          Disk_Paging_Read_Rate *
                          System_Page_Input_Size /
                          Page_Size_Used
Input_Page_Rate:             ["pages/sec"]
                          Disk_Page_Input_Rate +
                          Net_Page_Input_Rate
Memory Pages_Input_Per_Sec:  ["pages/second"]
                          Input_Page_Rate +
                          (
                            (
                              Disk_Read_Rile_Byte_Rate +
                              Net_Read_File_Byte_Rate
                            ) /
                            Page_Size_Used
                          )
```

FIGS. 4, 5, and 6 illustrate the tables that are input to the equations of model. Each of these tables are represented in a spreadsheet format. The row of the tables are identified by numbers and the columns are identified by letters. Each cell in the table contains either a formula or a value. The formulae use standard spreadsheet conventions. FIG. 4A represents the O.S. Performance Table. The O.S. Performance Table is stored in the spreadsheet named "software.xls" and contains entries for various operating system characteristics. Each entry contains the name of the operating system characteristic and a value or formula for calculating a value. For example, one entry row 34 contains the name "Spooler_RAM_Demand," and a value of "1.2." This entry represents the amount of RAM (in mega bytes)

that is required by the spooler of the operating system. Another entry row 13 contains the name "System_Sequential_Write_Cache_Processing" and the formula =0.0001914+0.000000099653*app.xls'!APPLICATION.SEQUENTIAL_WRITE_SIZE This formula indicates that the amount of CPU time the operating system spends processing each sequential write using the file system cache is the constant "0.0001914" seconds plus "0.000000099653" seconds per byte times the sequential write size. As shown, the sequential write size is dependent on the workload being applied to the model. The term "app.xls'!APPLICATION.SEQUENTIAL_WRITE_SIZE" refers to the workload parameter stored in the cell identified as "APPLICATION_SEQUENTIAL_WRITE_SIZE" in the "app.xls" spreadsheet.

This information about the performance of the operating system is preferably generated during the construction of the model by using the synthetic workload generator to apply known workloads to a baseline computer system and using the actual performance measurements as an indication of the operating system performance. FIG. 4B contains the names of the cells in the O.S. Performance Table. For example, the cell B33 is named "CSRSS_RAM_Demand." These cell names are used by the equations of the model to specify the source of the parameters of the equations.

FIG. 5A represents the H/S Installed Table. The H/S Installed Table is stored in the spreadsheet named "hardware.xls" and contains entries indicating the installed configuration of the target computer system. For example, entry row 14 contains the name "Installed_RAM" and the value "16." This entry represents the amount of RAM installed on the target computer system in mega bytes. Information in this table is obtained from the Operating System; in the case of Windows NT this information is retrieved from a database called the Configuration Registry which Windows NT constructs when it is installed on the target computer system. FIG. 5B contains the names the cells of the H/S Installed Table.

FIGS. 6A–6K represent the Hardware Performance Table. The Hardware Performance Table is stored in the spreadsheet named "hardware.xls" and contains entries indicating various performance characteristics of the target computer system. This information is preferably generated when the system is initially loaded on the target computer system. In addition, the information is regenerated whenever the hardware resource is changed (e.g., a faster disk drive installed). Table 2 contains a listing of the performance characteristics.

TABLE 2

| PERFORMANCE CHARACTERISTICS | DEFINITIONS |
|---|---|
| Processor Page Size | The page size in bytes used by the processor. |
| Relative Memory Usage | The amount of memory used by a computer program relative to the amount of a baseline processor (e.g, Intel 80486). |
| Relative Processor Speed | The speed of the processor relative to a baseline processor. |
| Disk Controller Speed | The transfer speed in bytes of the disk controller. |
| Base Disk Controller Processing Overhead Sequential | The base CPU time in seconds used by the operating system to process a sequential disk transfer. |
| Base Disk Controller Processing Overhead Random | The base CPU time in seconds used by the operating system to process a random disk transfer. |
| Incremental Disk Controller Processing Overhead Sequential | The incremental CPU time in seconds used by the operating system to process each byte in a sequential disk transfer. |
| Incremental Disk Controller Processing Overhead Random | The incremental CPU time in seconds used by the operating system to process each byte in a random disk transfer. |
| Random Disk Throughput [ ] | The maximum transfer rate for a random access transfer to disk for various block sizes. |
| Sequential Disk Throughput [ ] | The maximum transfer rate for a sequential access transfer to disk for various block sizes. |
| Network Speed | The transfer speed of the network in bytes per second. |
| Network Adapter Speed [ ] | The transfer speed of the network adapter in bytes per second for various block sizes. |

The performance characteristics followed by brackets correspond to an array of characteristics collected using various block sizes (e.g., 1K and 4K). In one embodiment, the performance characteristics for various configurations are collected and stored in a database. That is, rather than determining the performance characteristics dynamically on the target computer system, they are collected once and stored in a database. FIGS. 6A–6K represent such a database. The Hardware Performance Table contains the following sub-tables. The dynamic determination of the performance characteristic is preferable to such a database.

1. Processor Architecture (FIG. 6A)
2. Processor Family (FIG. 6B)
3. Processor Speed (FIG. 6C)
4. Disk Controller Architecture (FIG. 6D)
5. Base Disk Controller Processing Overhead (FIG. 6E)
6. Incremental Disk Controller Processing Overhead (FIG. 6F)
7. Random Disk Throughput (FIG. 6G)
8. Sequential Disk Throughput (FIG. 6H)
9. Network Type (FIG. 6I)
10. Network Adapter (FIG. 6J)
11. Graphics Controller Speed (FIG. 6K)

FIG. 6A represents the Processor Architecture Table. This table contains page size and relative memory size. The page size is the size in bytes used by the paging system (e.g, 4096 bytes for the Intel 80486 architecture). The relative memory size is the amount of memory that a computer program occupies relative to the Intel 80486 architecture. For example, since the Intel 80486 uses a complex instruction set architecture and the DEC Alpha processor uses a reduced instruction set architecture, computer programs for the DEC Alpha processor are approximately 1.744251 times as large as the corresponding computer program for the Intel 80486 processor. This performance characteristic is determined when the model is constructed by comparing the amount of memory occupied by the Windows NT operating system on each architecture.

FIG. 6B represents the Processor Family Table. This table is used to retrieve an index into the Processor Speed Table based on the processor architecture and speed. FIG. 6C represents the Processor Speed Table. The Processor Speed Table contains an entry for each processor and secondary cache size. The speeds in the table are relative to the speed of the Intel 80486D0-50/2 processor. The processor speed can be determined dynamically by timing various known workloads.

FIG. 6D represents the Disk Controller Architecture Table. This table contains the transfer rate of various disk controllers in bytes per second. FIG. 6E represents the Base Disk Controller Processing Overhead Table. This table contains the overhead in seconds of the operating system per access of the disk. FIG. 6F represents the Incremental Disk Controller Processing Overhead Table. This table contains the incremental overhead in seconds of the operating system that each byte adds to a disk access. FIG. 6G represents the Random Disk Throughput Table. This table contains the maximum number of bytes per second that can be transferred for various block sizes via random access transfer. FIG. 6H represents the Sequential Disk Throughput Table. This table contains the maximum number of bytes per second that can be transferred for various block sizes via sequential access transfer. FIG. 6I represents the Network Table. This table contains the maximum network transfer rate in bytes per second. FIG. 6J represents the Network Adapter Table. This table contains the maximum number of bytes that can be transferred by the network adapter per second with various block sizes. FIG. 6K represents the Graphics Controller Speed. This table represents the time to transfer one pixel to the graphics controller.

Synthetic Workload Generator

The synthetic workload generator is a computer program that receives a description of a workload (a set of workload parameters) and places a workload that corresponds to the parameters on the target computer system. A preferred synthetic workload generator is described in Blake, R. "Optimizing Windows NT," Vol. 4, Appendix C, Microsoft Press, 1993, or described in "Tuning an Operating System for General Purpose Use," Computer Performance Evaluation, The Chameleon Press Ltd., London, Sep. 1976, pp. 303–322. A synthetic workload generator receives a certain workload description, and effects the execution of that workload on the target computer system. A workload description is a set of parameters that specify a load on the computer system. For example, the parameters may specify the maximum amount of RAM required by the workload, average processor time needed between sequential reads of the disk, and the average size of each read. Table 3 contains a list of the preferred workload parameters.

TABLE 3

| WORKLOAD PARAMETER | DEFINITION |
| --- | --- |
| Code RAM Demand | The average amount of RAM used by the workload code. |
| Data RAM Demand | The average amount of RAM used by the workload data. |
| Local Paging Affinity | The fraction of paging on local disks, as opposed to on the network. |
| Sequential Read Processing | The amount of application processor time on the baseline system between sequential reads of disk or network. |
| Sequential Write Processing | The amount of application processor time on the baseline system between sequential writes to disk or network. |
| Random Read Processing | The amount of application processor time on the baseline system between random access reads from disk or network. |
| Random Write Processing | The amount of application processor time on the baseline system between random access writes to disk or network. |
| Sequential Read Size | The size of each sequential read from disk. |
| Sequential Write Size | The size of each sequential write to disk. |
| Random Read Size | The size of each random access read from disk. |
| Random Write Size | The size of each random access write to disk. |
| Local Sequential Read Affinity | The fraction of sequential reads to local disk, as opposed to the network. |
| Local Sequential Write Affinity | The fraction of sequential writes to local disk, as opposed to the network. |
| Local Random Read Affinity | The fraction of random reads to local disk, as opposed to the network. |
| Local Random Write Affinity | The fraction of random writes to local disk, as opposed to the network. |
| Random Read Extent | The size of the portion of the disk being randomly read. |
| Random Write Extent | The size of the portion of the disk being randomly written. |

Performance Measurements

Operating systems typically record various actual performance measurements during execution of application programs. The performance measurements may include average number of pages of virtual memory transferred to and from main memory per second and average number of bytes per second transferred to and from the disk. The system uses the model to predict various performance measurements. Table 4 contains a list of performance measurements that are generated by the target computer system and that are predicted by applying a workload to the model. These performance measurements are described in detail in Blake, R., "Optimizing Windows NT," Vol. 4, Appendix A, Microsoft Press, 1993.

TABLE 4

| PERFORMANCE MEASUREMENT | DEFINITION |
| --- | --- |
| System.PctPriv | Percent of time the processor is in privileged mode. |
| System.PctUser | Percent of time the processor is in user mode. |
| System.SystemCallRate | Average number of calls per second to the system service routines that perform basic scheduling and synchronization of activities of the computer and that provide access to non-graphical devices, memory management, and name space management. |
| Disk.DiskReadByteRate | Average number of bytes per second that are transferred from the disk during a read operation. |
| Disk.DiskReadRate | Average number of disk read operations per second. |
| Disk.DiskWriteByteRate | Average number of bytes per second that are transferred from the disk during a write operation. |
| Disk.DiskWriteRate | Average number of disk write operations per second. |
| Cache.CopyReadHitsPct | Percentage of file read operations that are satisfied by a memory copy from cache. |
| Cache.CopyReadsPerSec | The number of file read operations per second that are satisfied by a memory copy from the cache. |
| Cache.LazyWritePagesPerSec | The number of writes per second to update the disk to reflect changes stored in the cache. |
| Memory.PageFaultsPerSec | Average number of page faults per second. A page fault occurs when a process refers to a virtual memory page that is not in main memory. |
| Memory.CacheFaultsPerSec | Average number of cache faults per second. A cache fault occurs when the page of a file is not found in the cache. |
| Memory.PagesInputPerSec | Average number of pages read from disk per second to resolve memory references to pages not in memory at the time of the reference. |
| Memory.PagesOutputPerSec | Average number of pages written to disk per second because the page in memory was modified. |

Equations

FIGS. 7-1 through 7-17 list the equations of the preferred model. The equations input the spreadsheets "software.xls," "install.xls," "hardware.xls," and "app.xls," which correspond to the O.S. Performance Table, the H/S Install Table, and the Hardware Performance Table, and the Workload Table, respectively. The equations generate the predicted performance measurements. FIG. 8 contains a mapping from the names used in the equations of the model to the cells in the tables from which the data is retrieved.

Detailed Description of the System

Figure 9:
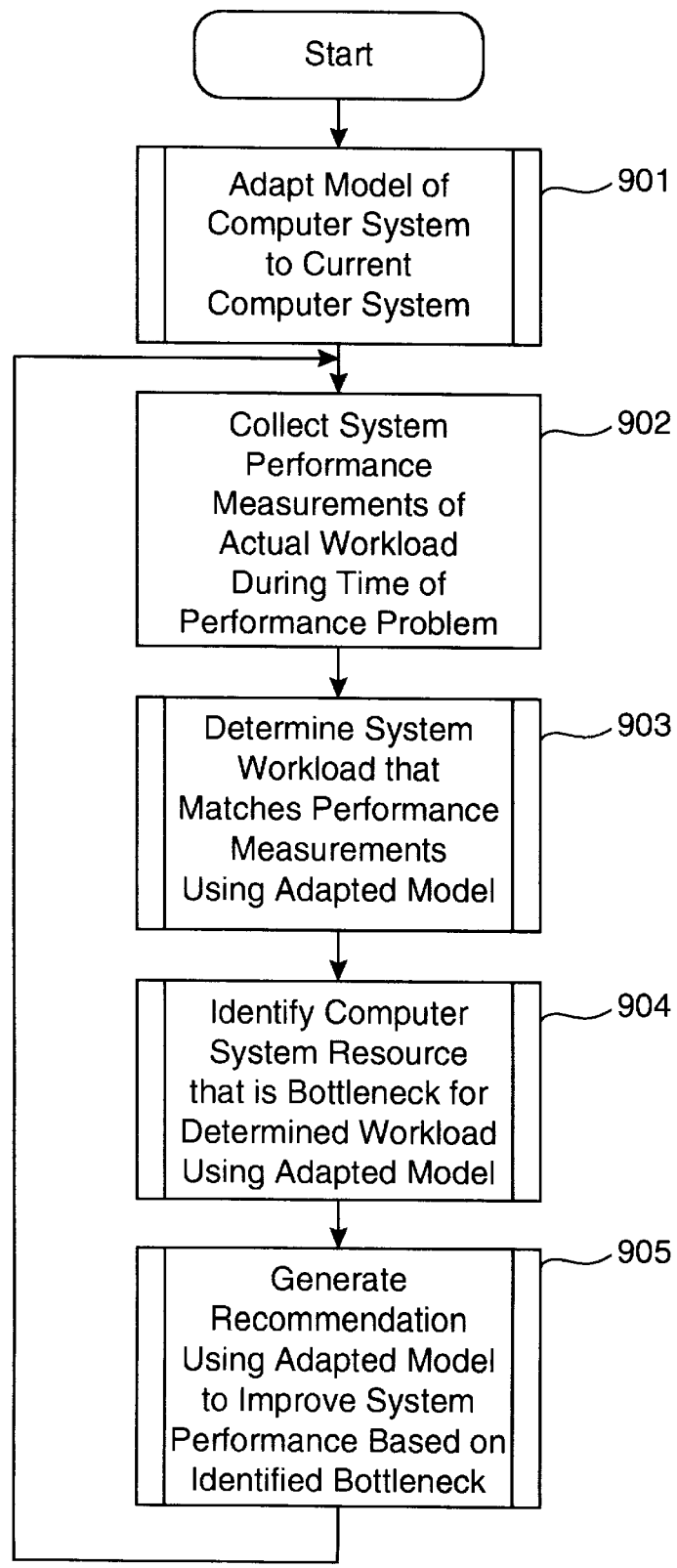

FIG. 9 is a flow diagram of a preferred implementation of the system. The system adapts the model to the target computer system and then collects actual performance measurements during execution of a target computer program, identifies a workload that when placed on the target computer system would generate the actual performance measurements, and generates an analysis of changes to the configuration of the target computer system. In step 901, the system adapts the model of the computer system to the target computer system. The model models a baseline computer system, such as, IBM compatible personal computer with an Intel 80486 DX/250 processor and 16M bytes of RAM and that executes the Microsoft Windows NT Operating System. The adaptation of the model typically occurs once for the target computer system. The adapting of the model involves determining the performance characteristics of the current computer system. The system also generates an error analysis between predicted performance measurements generated by the adapted model and actual performance measurements. In step 902, the system collects a set of actual performance measurements. The actual performance measurements represent performance measurements generated by the operating system on the target computer system during execution of the target computer program. In step 903, the system determines the workload that when placed on the target computer system generates performance measurements that most likely match the actual performance measurements. To determine the workload, the system selects various possible workloads and generates the predicted performance measurements for each workload using the adapted model. The workload whose predicted performance measurements most closely match the actual performance measurements is selected as the most probable workload. In step 904, the system selects the computer system resource that is the bottleneck. In step 905, the system generates an analysis of configuration changes directed to alleviating the bottleneck. The system uses this analysis to make a recommendation of the most cost-effective hardware improvement for the observed performance problem, and predicts the amount of performance improvement expected when that change to the configuration is implemented. The recommendation to improve the performance is not always as simple as replacing the resource that is the bottleneck with a faster resource. For example, the disk drive may be the bottleneck. In such a case, the bottleneck may be caused by a large workload of file activity. Conversely, the bottleneck may be caused by a large amount of virtual memory paging. If the bottleneck is caused by virtual memory paging, then the recommendation may be to add more RAM, rather than installing a faster disk drive. Also, the recommendation may also be to add more RAM even if the bottleneck is caused by file activity. In such a case, by increasing the RAM cache of the file system, the utilization of the disk drive may be reduced. Consequently, knowledge of the most probable workload is important for determining how to alleviate a bottleneck. The system is then ready to perform an analysis of the next actual workload.

Figure 10:
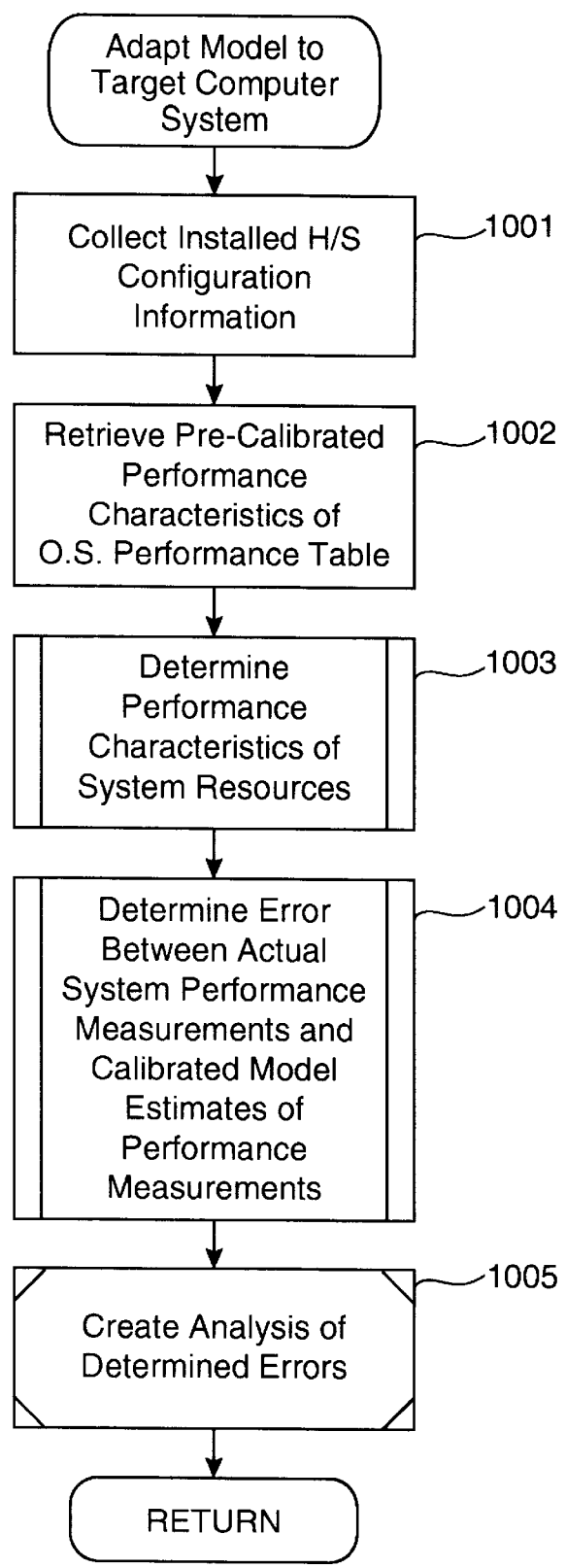

FIG. 10 is a flow diagram of the process of adapting of the model. The process collects the performance characteristics of the target computer system and performs an error analysis of the model that is adapted to use the collected performance characteristics. In step 1001, the process collects various hardware and software configuration information and stores the information in the H/S Installed Table. In step 1002, the process retrieves the pre-determined operating system performance characteristics from the O.S. Performance Table based on the configuration information. In step 1003, the process determines the performance characteristics of the system resources and stores the results in the Hardware Performance Table. The adapted model is the model that uses the information in the O.S. Performance Table, the H/S Installed Table, and the Hardware Performance Table to generate the predicted performance measurements. In step 1004, the process determines the error between predicted performance measurements for the calibrated model and actual performance measurements for various workloads. In step 1005, the process generates an analysis of the errors and returns.

In a preferred embodiment, the error analysis generates covariance matrix based on the actual and predicted performance measurements. Equation (1) represents the error between the actual performance measurements (c.act) and the predicted performance measurements (c.pre). The actual and predicted performance measurements are each represented by an m-by-n matrix, where each row represents the performance measurements for one workload and each column represents a performance characteristic that is measured (m (indexed by i) represents the number of workloads tested and n (indexed by i) represents the number of performance characteristics that are measured).

$$E_{i,j} = c.act_{i,j} - c.pre_{i,j} \quad (1)$$

The matrix E represents the difference between each predicted performance measurement and each actual performance measurement for each workload tested. The process then calculates the average error for each performance measurement as shown by equation (2).

$$E.avg_j = \frac{\sum_{i=1}^{m} E_{i,j}}{m} \quad (2)$$

The array E.avg represents the average error for each performance characteristic. The process then calculates an n-by-n covariance matrix Cov of the average error as shown by equation (3).

$$Cov_{k,l} = \sum_{i=1}^{m} (E_{i,k} - E.avg_k)(E_{i,l} - E.avg_l) \quad (3)$$

The resulting covariance matrix is later used to account for the influence of the various errors in performance measurements on each performance characteristic. Thus, the matrix $Cov_{k,l}$ represents the error in the performance measurements for performance characteristic k combined with the error in performance measurements for performance characteristic l. They are later taken together to scale the importance of observed differences between actual and predicted performance measurements.

Figure 11:
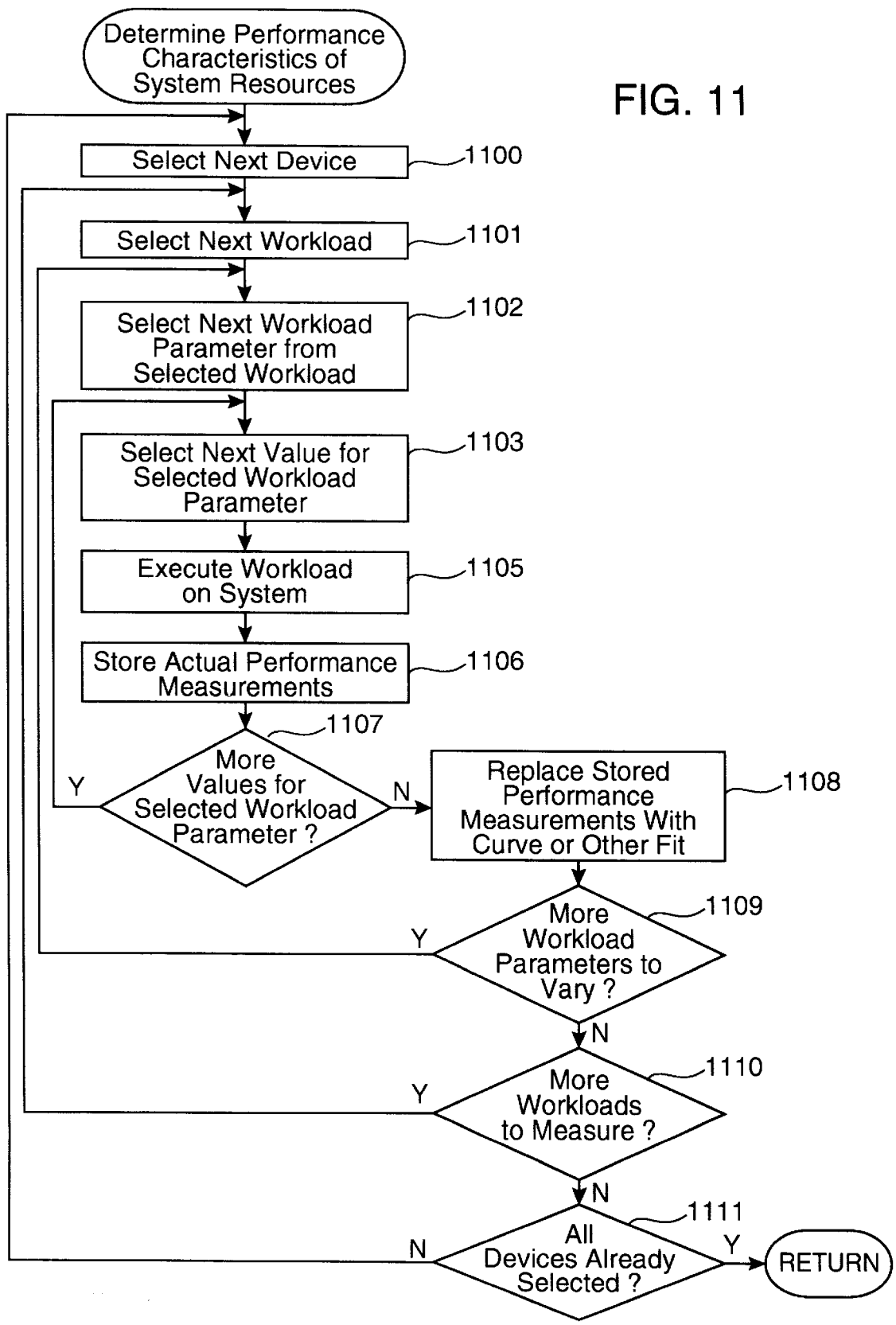

FIG. 11 is a flow diagram of the process of determining the prformance characteristics of the system resources. This process generates a variety of workloads that are used to determine the throughput of the various system resources. Each hardware device has a device-specific subset of the workload parameters that can be varied to alter the performance of the device. For example, the workload parameters that would alter the performance of a disk drive would include sequential and random read and write sizes, while the workload parameter that would alter the performance of a CD-ROM (Read Only Memory) include read but not write sizes. The synthetic workload generator is preferably designed so that the parameters for a particular device are independent. That is, the parameters can be varied independently and still produce an accurate measure of device performance. The process selects the workload parameters for determining the performance characteristics by first selecting a device to measure. The process then selects a base workload that includes a typical value for each parameter for this device. The process then selects the next parameter to vary from the subset of parameters that influence the performance of this device, and varies this parameter while holding all other parameters at their typical values. The process repeats this for each parameter value.

In step 1100, the process selects the next device to measure. In step 1101, the process selects the next workload. In step 1102, the process selects the next workload parameter for the selected workload. In step 1103 the process selects the next workload value for the selected workload parameter. In step 1105, the process places the selected workload with the selected value for the selected workload parameter on the target computer system. In step 1106, the process stores the actual performance measurements resulting from the selected workload. In step 1107, if there are more values for the selected workload parameter, then the process loops to step 1103 to select the next value, else the process continues at step 1108. In step 1108, the process optimally replaces the stored performance measurements for the selected workload for the selected workload parameter with a function (e.g., curve fitting) to more compactly represent the performance measurements. In step 1109, if more workload parameters are to be varied, then the process loops to step 1102 to select the next workload parameter, else the process continues at step 1110. In step 1110, if there is another workload for this device, the process loops to step 1101 to select the next workload, otherwise the process proceeds to step 1111. In step 1111, if all the devices have already been measured, then the process returns, else the process loops to step 1100 to select the next device.

Figure 12:
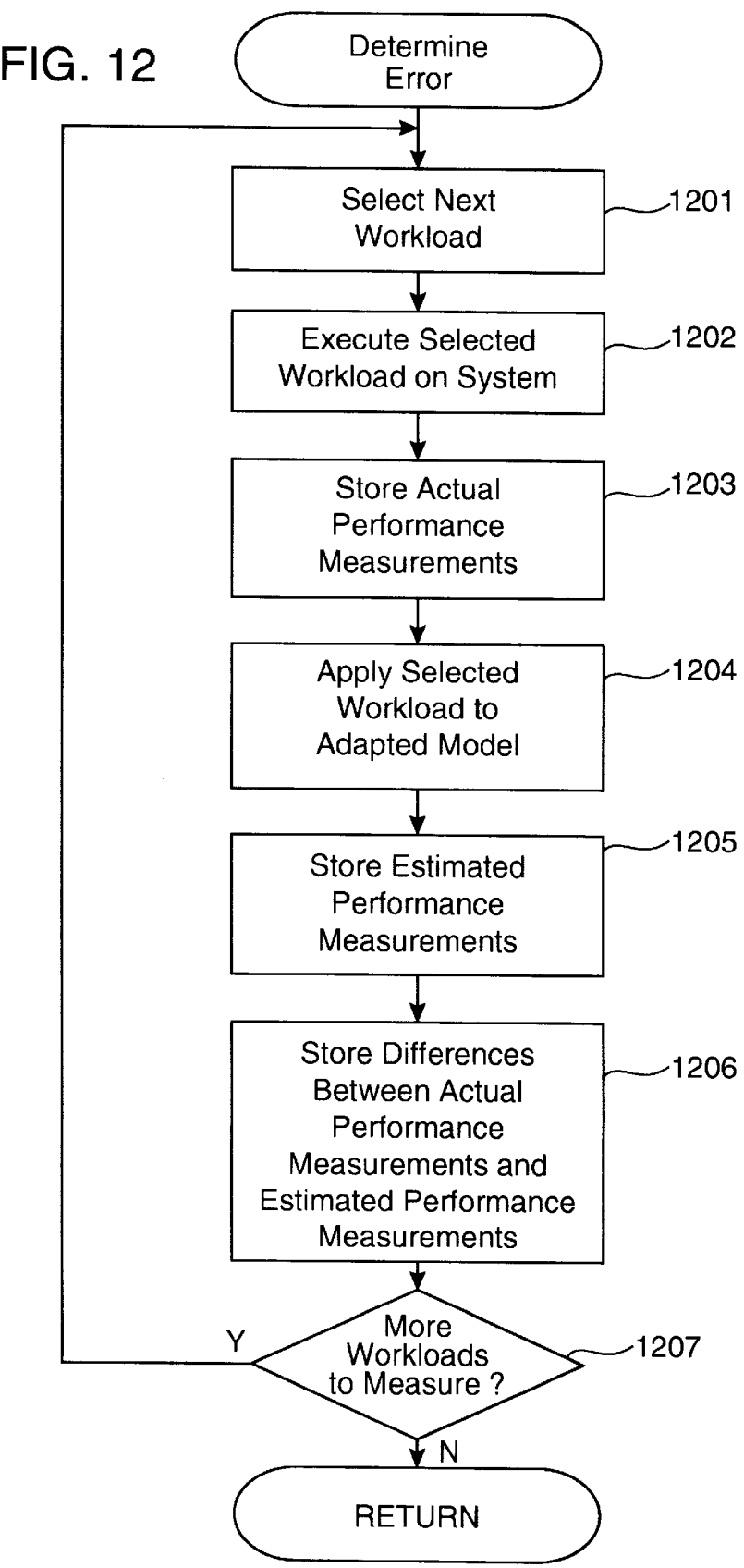

FIG. 12 is flow diagram of the process of determining the error in the adapted model. The process generates various error analysis workloads and then generates predicted performance measurements from the adapted model and generates actual performance measurements for the workloads. The differences between the predicted and actual performance measurements are stored as errors. (The result of this process is stored in the matrix $Cov_{k,i\ j}$ as discussed above.) In step 1201, the process selects the next workload to be analyzed. The process can select the workloads to be analyzed in various ways. For example, the process can select workloads that represent an even distribution of the workload parameter values, that represent a uniform distribution of the workload parameter values, or as in the preferred embodiment that represent a distribution based on typical workload parameters values. In step 1202, the process places the selected workload on the target computer system. In step 1203, the process saves the actual performance measurements for the selected workload. In step 1204, the process applies the selected workload to the adapted model. In step 1205, the process stores the predicted performance measurements for the selected workload. In step 1206, the process stores the differences between the actual performance measurements and the predicted performance measurements. In step 1207, if there are more workloads to analyze, then the process loops to step 1201 to select the next workload, else the process returns.

Figure 13:
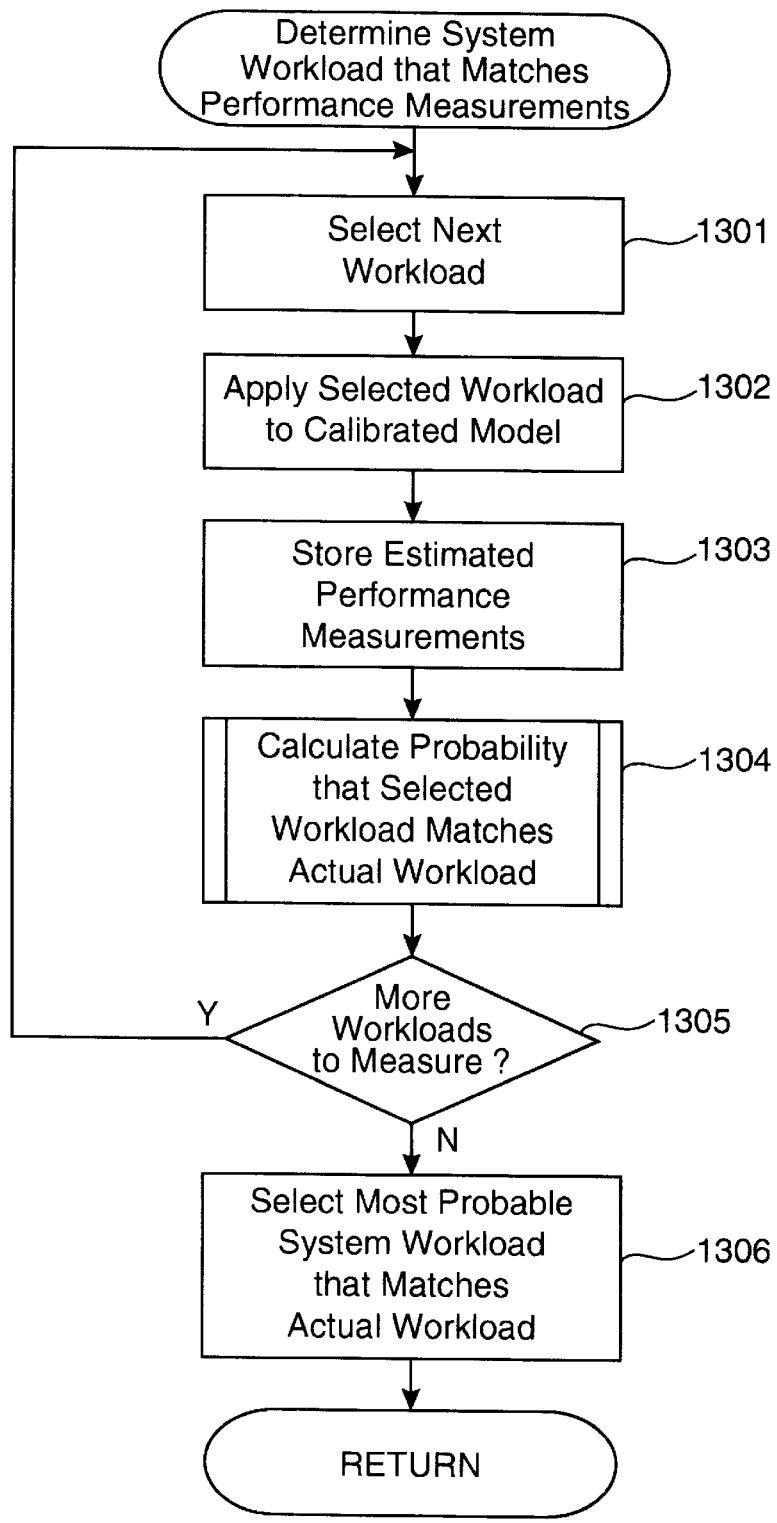

FIG. 13 is a flow diagram of the process for determining the most probable workload. In steps 1301–1305, the process loops selecting a test workload and generates the predicted performance measurements of each selected workload. In step 1301, the process selects the next workload. A variety of numerical methods can be used for searching the space of all possible workloads for the most probable workload. The book "Numerical Recipes in C-The Art of Scientific Computing," William Press et al., Cambridge University Press, 1988, contains a survey of these techniques in Chapter 10, Newton's method and the downhill simplex method are examples of such numerical search techniques that can be used to select the next workload. In the preferred embodiment, Newton's method is used because it is both rapid and accurate in this application. In step 1302, the process applies the selected workload to the adapted model to generate the predicted performance measurements. In step 1303, the process stores the predicted performance measurements. In step 1304, the process calculates the probability that the selected workload matches the actual workload placed on the target computer system by the target computer program. In step 1305, if all the workloads have already been selected, then the process continues at step 1306, else the process loops to step 1301 to select the next workload. In step 1306, the process selects the workload with highest probability as the most probable workload and returns.

The system preferably uses one of two methods for determining the probability that the generated workload matches the actual workload. The first method is the deterministic method. The deterministic method uses a numerical analysis, such as a least-squares method, based on the actual and predicted performance measurements. That is, the generated workload whose predicted performance measurements are closest to the actual performance measurements is selected as the most probable workload. The following formula is a preferred deterministic method.

$$m.p.w. = \min \sum_{j=1}^{n} \alpha_j (c.act_j - c.pre_j)^2$$

The factor $\alpha_j$ is an array of weighting factors to compensate for differences in the units of the performance measurements.

The second method is a probabilistic method. The probabilistic method uses an error analysis of the adapted model combined with the probability that a given workload will occur based on a historical distribution. (The deterministic method is simply a special instance of the probabilistic method in which it is assumed that in the adapted model has no correlated errors ($Cov_{ij}=0$, i not equal to j) and that the historical or prior probability for each value of a workload parameter is equal.) The probability (Pr) of a workload ($\omega$) given we know the actual workload is proportional to two other probabilities given by equation (4).

$$Pr(\omega|c.act) = k\, Pr(c.act|c.pre) * Pr(\omega) \quad (4)$$

The factor $Pr(c.act|c.pre)$ represents the probability that the actual performance measurements are observed, given generated predicted performance measurements. The factor $Pr(\omega)$ represents the probability that workload ($\omega$) will occur based on an historical distribution of workloads. The factor k is a proportionality constant. The probability of a given workload is assumed to be the combined probability that each of its parameters will occur. This is represented by equation (5).

$$Pr(\omega) = \prod_{i=1}^{n} Pr(\omega_i) \quad (5)$$

In a preferred embodiment, the workload parameters are assumed to be lognormally distributed so that the probability that a workload will occur historically is:

$$Pr(\omega_i) = \left(\sigma_i(\omega_i - a_i)\sqrt{2\pi}\right)^{-1} e^{-(\ln(\omega_i - a_i) - \mu_i)^2 / 2\sigma_i^2}$$

where $\mu_i$ is the logarithmic mean, $\sigma_i$ is the standard deviation, and $a_i$ is minimum value for the workload parameter. Sample values for the logarithmic mean, standard deviation, and minimum value are shown in Table 5.

TABLE 5

| | WORKLOAD | UNITS | MIN VALUE | MAX VALUE | MEAN VALUE | STANDARD DEVIATION |
|---|---|---|---|---|---|---|
| 1. | Application Idle | 0 | time fraction | 0 | 1 | 0 | |
| 2. | Application Code RAM Demand | 116 | 4096 byte pg | 0 | infinite | 116 | |
| 3. | Application Data RAM Demand | 193 | 4096 byte pg | 0 | infinite | 193 | |
| 4. | Application RAM Demand | 0.0999999999999999 | megabytes | 0.1 | infinite | 8.5 | 8 |
| 5. | Local Paging Affinity | 1 | fraction | 0 | 1 | 1 | 2 |
| 6. | Application Sequential Read Processing | 1507.91985929039 | seconds | 0.000001 | infinite | 0.01 | 2 |
| 7. | Application Sequential Write Processing | 0.199196553898435 | seconds | 0.000001 | infinite | 0.01 | 2 |
| 8. | Application Random Read Processing | 302.305788289707 | seconds | 0.000001 | infinite | 0.01 | 2 |
| 9. | Application Random Write Processing | 0.00401599595049622 | seconds | 0.000001 | infinite | 0.01 | 2 |
| 10. | Application Graphics | 100000 | seconds | 0.000001 | infinite | 100000 | |

TABLE 5-continued

| | WORKLOAD | UNITS | MIN VALUE | MAX VALUE | MEAN VALUE | STANDARD DEVIATION |
|---|---|---|---|---|---|---|
| 11. Processing Application Sequential Read Size | 2481.78807408851 | bytes | 1 | 65536 | 2048 | 2048/3 |
| 12. Application Sequential Write Size | 2639.67383123312 | bytes | 1 | 65536 | 2048 | 2048/3 |
| 13. Application Random Read Size | 1946.30476425393 | bytes | 1 | 65536 | 2048 | 2048/3 |
| 14. Application Random Write Size | 5286.89334218392 | bytes | 1 | 65536 | 2048 | 2048/3 |
| 15. Application Graphics Size | 250 | pixels | 1 | 1310720 | 250 | |
| 16. Local Sequential Read Affinity | 1 | fraction | 0 | 1 | 1 | |
| 17. Local Sequential Write Affinity | 1 | fraction | 0 | 1 | 1 | |
| 18. Local Random Read Affinity | 1 | fraction | 0 | 1 | 1 | |
| 19. Local Random Write Affinity | 1 | fraction | 0 | 1 | 1 | |
| 20. Random Read Extent | 2.1909522054493 | megabytes | 0.000001 | infinite | 1 | 2 |
| 21. Random Write Extent | 2.19095220534625 | megabytes | 0.000001 | infinite | 1 | 2 |

The system uses a multivariate Gaussian error model as described in DeGroot, M., "Optimal Statistical Decisions," McGraw-Hill, New York, 1970. The following equation describes the probability:

$$Pr(c.act \mid c.pre) = (2\pi)^{-\frac{m}{2}} \left| Cov \right|^{-\frac{1}{2}} e^{-\frac{1}{2}(c.act-c.pre-E.avg)^T Cov^{-1}(c.act-c.pre-E.avg)}$$

In a preferred embodiment, an equation solver such as "Solver" of Microsoft Excel is used to determine the workload that is the most probable. The inputs to the equation solver are (1) the model for calculating the predicted performance measurements, (2) the equations for calculating the probability of a workload, (3) an initial workload, (4) the actual performance measurements, and (5) the minimum, maximum mean and standard deviation values for each workload parameter. The solver determines the probability of the initial workload by using the model to generate the predicted performance measurements. The solver then calculates the probability of a workload. The solver then varies one of the workload parameters and then generates new predicted measurements and then the probability of the workload. Based on a comparison of the probability with the previous probability, the solver then again varies a workload parameter and the process is repeated. In one embodiment, only workload parameters corresponding to rows 4–9, 11–14, and 20–21 are varied. The other workload parameters are held constant.

Figure 14:
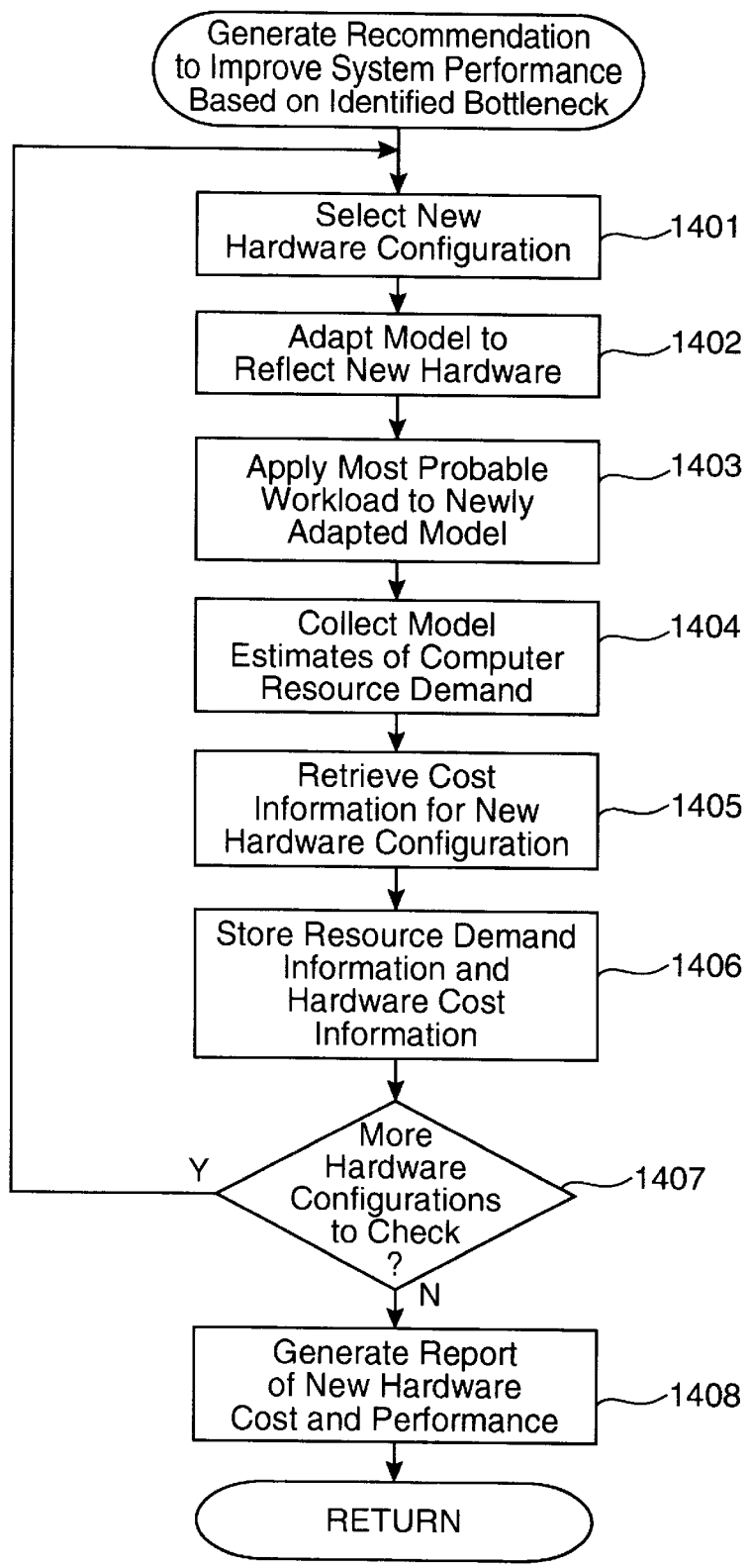

FIG. 14 is a flow diagram of the process for generates a recommendation to alleviate the bottleneck. The process selects various changes in hardware and software configuration and then applies the matching workload to the model with the selected configuration. The process then generates a report detailing performance and cost of each configuration. In step 1401, the process selects a new trial configuration. In step 1402, the process adapts the model to the selected trial configuration. In step 1403, the process applies the most probable workload to the model which has been modified to reflect the trial configuration. In step 1404, the models new estimates of computer system resource demand and device throughput are recorded. Resource demand is expressed in terms of device utilization, and throughput is expressed in terms of the frequency of accesses of particular types to the particular device. In step 1405, the price of the trial configuration is retrieved. In step 1406, the price and performance improvement are stored. In step 1407, if there are more configurations to check, then the process loops to step 1401 to the select the next configuration, else the process continues at step 1408. In step 1408, the process generates the price/performance report for the possible new configurations.

Appendix A describes a further description of the techniques of the present invention.

Although the present invention has been described in terms of preferred embodiments, it is not intended that the invention be limited to these embodiments. Modifications within the spirit of the invention will be apparent to those skilled in the art. The scope of the present invention is defined by the claims that follow.

We claim:

1. A method for generating an analysis of modifications to a system resource of a target computer system that would result in improved performance during execution of computer programs on the target computer system, the execution of the computer programs placing an actual workload on the target computer system, the method comprising the computer-implemented steps of:

collecting performance characteristics of system resources of the target computer system;

collecting a set of actual performance measurements of the target computer system during execution of the computer programs on the target computer system;

for each of the plurality of the test workloads, generating a set of predicted performance measurements that would result when the test workload is placed on the target computer system based on the collected performance characteristics of the target computer system;

determining the set of predicted performance measurements that most closely matches the set of actual performance measurements, wherein the test workload that when placed on the target computer system would result in the determined set of predicted performance measurements is the workload that most probably represents the actual workload;

identifying a system resource that is a bottleneck during execution of the computer programs based on the set of predicted performance measurements that most closely matches the set of actual performance measurements;

selecting a system resource that can be modified to reduce utilization of the bottleneck system resource; and generating a set of predicted performance measurements that would result when the test workload that most probably represents the actual workload is placed on the target computer system based on the collected performance characteristics of the target computer system with the selected system resource modified to reduce utilization of the bottleneck system resource.

2. The method of claim 1 including the steps of:

for each of a plurality of error analysis workloads, generating a set of predicted performance measurements that would result when the error analysis workload is placed on the target computer system based on the collected performance characteristics of the target computer system; and collecting a set of actual performance measurements by executing a computer program that places the error analysis workload on the target computer system; and wherein the step of determining the set of predicted performance measurements that most closely matches the set of actual performance measurements is based on the sets of predicted performance measurements that would result when the error analysis workloads are placed on the target computer system and the sets of actual performance measurements collected by executing a computer program that places the error analysis workloads on the target computer system.

3. The method of claim 1 wherein the steps of generating a set of predicted performance measurements including using a model of a computer system that is adapted to the target computer system.

4. A method for determining a workload placed on a target computer system during execution of a specified computer program, the workload representing resource utilization for the execution the method comprising the computer-implemented steps of:

receiving a set of performance measurements representing the performance of the target computer system during execution of the specified computer program;

identifying a plurality of workloads;

for each identified workload, predicting a set of performance measurements that would result if a computer program that places the identified workload on the target computer system is executed; and selecting the identified workload whose set of predicted performance measurements most closely matches the received set of performance measurements as the determined workload placed on the target computer system during execution of the specified computer program.

5. The method of claim 4 wherein the step of receiving a set of performance measurements includes collecting the set of performance measurements by executing the specified computer program on the target computer system.

6. The method of claim 4 including the step of collecting performance characteristics of resources of the target computer system, wherein the step of predicting uses the collected performance characteristics to predict the set of performance characteristics.

7. A method for determining a workload placed on a target computer system during execution of a specified computer program, the method comprising the computer-implemented steps of:

receiving a set of performance measurements representing the performance of the target computer system during execution of the specified computer program;

identifying a plurality of workloads;

for each identified workload, predicting a set of performance measurements that results when a computer program that places the identified workload on the target computer system is executed;

predicting a set of predicted performance measurements for each of a plurality of error analysis workloads;

collecting a set of actual performance measurements for each of the plurality of error analysis workloads by placing the error analysis workload on the target computer system, and selecting the identified workload whose set of predicted performance measurements most closely matches the received set of performance measurements as the determined workload placed on the target computer system during execution of the specified computer program; the selecting based on the sets of predicted and actual performance measurements generated and collected for the error analysis workloads.

8. The method of claim 7 wherein the step of selecting the identified workload includes for each set of predicted performance measurements that results when a computer program that places the identified workload on the target computer is executed, determining a probability that the set of predicted performance measurements results from the workload placed on the target computer system during execution of the specified computer program based on differences between the sets of predicted and actual performance measurements predicted and collected for the error analysis workloads.

9. The method of claim 8 wherein the probability P(c.act|c.pre) is $$Pr(c.act \mid c.pre) = (2\pi)^{-\frac{m}{2}} \left| Cov \right|^{-\frac{1}{2}} e^{-\frac{1}{2}(c.act-c.pre-E.avg)^T Cov^{-1} (c.act-c.pre-E.avg)}$$

where c.act is the set of received performance measurements, c.pre is the set of predicted performance measurements, m is the number of performance measurements in the set of performance measurements, E.avg is the average difference for each performance measurement between the sets of predicted and actual performance measurements predicted and collected for the error analysis workloads, and Cov is a covariance matrix representing the differences in the performance measurements between the sets of predicted and actual performance measurements predicted and collected for the error analysis workloads.

10. The method of claim 9 wherein the covariance matrix is defined by $$Cov_{k,l} = \sum_{i=1}^{m} (E_{i,k} - E.avg_k)(E_{i,l} - E.avg_l)$$

where $Cov_{k,l}$ is entry k,l in the covariance matrix and $E_{i,k}$ represents the difference between the performance measurements i of the sets k of predicted and actual performance measurements predicted and collected for the error analysis workloads.

11. The method of claim 4 wherein the step of selecting the identified workload is based on a probability that the identified workload would be placed on a computer system during execution of a computer program.

12. The method of claim 11 wherein the probability is based on an analysis of actual workloads placed on a computer system during execution of computer programs.

13. A method for determining a workload placed on a target computer system during execution of a specified computer program, the method comprising the computer-implemented steps of:

receiving a set of performance measurements representing the performance of the target computer system during execution of the specified computer program;

identifying a plurality of workloads;

for each identified workload, predicting a set of performance measurements that results when a computer program that places the identified workload on the target computer system is executed; and selecting the identified workload whose set of predicted performance measurements most closely matches the received set of performance measurements as the determined workload placed on the target computer system during execution of the specified computer program, the selecting based on a probability that the identified workload would be placed on a computer system during execution of a computer program, the probability based on an analysis of actual workloads placed on a computer system during execution of computer programs, wherein the probability $Pr(\omega_i)$ is $$Pr(\omega_i) = \left(\sigma_i(\omega_i - a_i)\sqrt{2\pi}\right)^{-1} e^{-(\ln(\omega_i - a_i) - \mu_i)^2 / 2\sigma_i^2}$$

where $\mu_i$ is the logarithmic mean, $\sigma_i$ is the standard deviation, and $a_i$ is minimum value for a workload parameter $w_i$.

14. The method of claim 4 wherein the step of predicting a set of performance measurements uses a model of a computer system.

15. The method of claim 14 including the step of collecting performance characteristics of resources of the target computer system to adapt the model to the target computer system.

16. The method of claim 14 wherein the model is an atomic model.

17. The method of claim 14 wherein the model is based on queueing theory.

18. The method of claim 14 wherein the model is based on simulation techniques.

19. The method of claim 4 including the step of collecting performance characteristics of resources of the target computer system and wherein the step of predicting predicts based on the collected performance characteristics.

20. The method of claim 4 wherein the step of identifying a plurality of workloads is based on a set of predicted performance measurements for a previously identified workload.

21. The method of claim 4 wherein a workload includes a plurality of workload parameters having a value and wherein the step of identifying a plurality of workload identifies a workload by varying a value of a workload parameter of a previously identified workload.

22. The method of claim 4 wherein the step of identifying a workload identifies a workload based on difference between sets of predicted performance measurements of previously identified workloads and the received set of performance measurements.

23. The method of claim 4 wherein the target computer system has a plurality of system resources and including the step of selecting a system resource with a highest utilization based on the set of predicted performance measurements of the selected identified workload as a bottleneck system resource.

24. A method for identifying a system resource of a target computer system that is a bottleneck during execution of a specified computer program on the target computer system, the method comprising the computer-implemented steps of:

receiving a set of performance measurements corresponding to execution of the specified computer program on the target computer system;

identifying a workload that when placed by a computer program on the target computer system would result in a set of performance measurements that is approximately equal to the received set of performance measurements, the workload representing resource utilization for the execution;

predicting a set of performance measurements that would result from execution of a computer program that places the identified workload on the target computer system using a model of the target computer system; and based on the set of predicted performance measurements, determining the system resource that would have a highest utilization during execution of a computer program that places the identified workload on the target computer system as the system resource that is the bottleneck during execution of the target computer system.

25. A method in a computer system for predicting performance of a specified computer program executed on a target computer system with a first configuration, the method comprising the computer-implemented steps of:

receiving a set of performance measurements corresponding to the execution of the specified computer program on the target computer system with a second configuration;

identifying a workload that if placed by a computer program on the target computer system with the second configuration would result in a set of performance measurements that is approximately equal to the received set of performance measurements the workload representing resource utilization for the execution; and predicting a set of performance measurements that would result from execution of a computer program that places the identified workload on the target computer system with the first configuration, wherein the predicted set of performance measurements represent the performance of the specified computer program the target computer system with the first configuration.

26. The method of claim 25 including the steps of:

predicting sets of performance measurements that would result from execution of a computer program that places the identified workload on the target computer system with each of a plurality of different configurations; and for each of the plurality of different configurations, estimating a price performance analysis for the configuration based on cost of the configuration and the predicted set of performance measurements for the configuration.

27. The method of claim 26 including the step of identifying the configuration with a lowest price performance ratio.

28. A method in a computer system for analyzing effects of changes to a workload placed by a specified computer program on a target computer system, the workload representing resource utilization by the specified computer program, the method comprising the steps of:

receiving a set of performance measurements corresponding to execution of the specified computer program on the target computer system;

identifying a workload that when placed by a computer program on the target computer system results in a set of performance measurements that is approximately equal to the received set of performance measurements;

modifying the identified workload;

predicting a set of performance measurements that would result from execution of a computer program that places the modified workload on the target computer system.

29. A computer-readable medium that contains computer instructions for determining a workload placed on a target computer system during execution of a specified computer program, the workload representing resource utilization for the execution by:

receiving a set of performance measurements representing the performance of the target computer system during execution of the specified computer program;

identifying a plurality of workloads;

for each identified workload, predicting a set of performance measurements that would result if a computer program that places the identified workload on the target computer system is executed; and selecting the identified workload whose set of predicted performance measurements most closely matches the received set of performance measurements as the determined workload placed on the target computer system during execution of the specified computer program.

30. The computer-readable medium of claim 29 wherein the step of receiving a set of performance measurements includes collecting the set of performance measurements by executing the specified computer program on the target computer system.

31. The computer-readable medium of claim 29 including the step of collecting performance characteristics of resources of the target computer system, wherein the step of predicting uses the collected performance characteristics to predict the set of performance characteristics.

32. The computer-readable medium of claim 29 including the steps of predicting a set of predicted performance measurements for each of a plurality of error analysis workloads and collecting a set of actual performance measurements for each of the plurality of error analysis workloads by placing the error analysis workload on the target computer system, and wherein the step of selecting the identified workload does so based on the sets of predicted and actual performance measurements generated and collected for the error analysis workloads.

33. The computer-readable medium of claim 32 wherein the step of selecting the identified workload includes for each set of predicted performance measurements that results when a computer program that places the identified workload on the target computer is executed, determining a probability that the set of predicted performance measurements results from the workload placed on the target computer system during execution of the specified computer program based on differences between the sets of predicted and actual performance measurements predicted and collected for the error analysis workloads.

34. The computer-readable medium of claim 33 wherein the probability P(c.act|c.pre) is $$Pr(c.act \mid c.pre) = (2\pi)^{-\frac{m}{2}} \left| Cov \right|^{-\frac{1}{2}} e^{-\frac{1}{2}(c.act-c.pre-E.avg)^T Cov^{-1}(c.act-c.pre-E.avg)}$$

where c.act is the set of received performance measurements, c.pre is the set of predicted performance measurements, m is the number of performance measurements in the set of performance measurements, E.avg is the average difference for each performance measurement between the sets of predicted and actual performance measurements predicted and collected for the error analysis workloads, and Cov is a covariance matrix representing the differences in the performance measurements between the sets of predicted and actual performance measurements predicted and collected for the error analysis workloads.

35. The computer-readable medium of claim 34 wherein the covariance matrix is defined by $$Cov_{k,l} = \sum_{i=1}^{m} (E_{i,k} - E.avg_k)(E_{i,l} - E.avg_l)$$

where $Cov_{k,l}$ is entry k,l in the covariance matrix and $E_{i,k}$ represents the difference between the performance measurements i of the sets k of predicted and actual performance measurements predicted and collected for the error analysis workloads.

36. The computer-readable medium of claim 29 wherein the step of selecting the identified workload is based on a probability that the identified workload would be placed on a computer system during execution of a computer program.

37. The computer-readable medium of claim 36 wherein the probability is based on an analysis of actual workloads placed on a computer system during execution of computer programs.

38. The computer-readable medium of claim 37 wherein the probability $Pr(\omega_i)$ is $$Pr(\omega_i) = \left(\sigma_i(\omega_i - a_i)\sqrt{2\pi}\right)^{-1} e^{-(\ln(\omega_i - a_i) - \mu_i)^2 / 2\sigma_i^2}$$

where $\mu_i$ is the logarithmic mean, $\sigma_i$ is the standard deviation, and $a_i$ is minimum value for a workload parameter $w_i$.

39. The computer-readable medium of claim 29 wherein the step of predicting a set of performance measurements uses a model of a computer system.

40. The computer-readable medium of claim 39 including the step of collecting performance characteristics of resources of the target computer system to adapt the model to the target computer system.

41. The computer-readable medium of claim 39 wherein the model is an atomic model.

42. The computer-readable medium of claim 39 wherein the model is based on queuing theory.

43. The computer-readable medium of claim 39 wherein the model is based on simulation techniques.

44. The computer-readable medium of claim 29 including the step of collecting performance characteristics of resources of the target computer system and wherein the step of predicting predicts based on the collected performance characteristics.

45. The computer-readable medium of claim 29 wherein the step of identifying a plurality of workloads is based on a set of predicted performance measurements for a previously identified workload.

46. The computer-readable medium of claim 29 wherein a workload includes a plurality of workload parameters having a value and wherein the step of identifying a plurality of workload identifies a workload by varying a value of a workload parameter of a previously identified workload.

47. The computer-readable medium of claim 29 wherein the step of identifying a workload identifies a workload based on difference between sets of predicted performance measurements of previously identified workloads and the received set of performance measurements.

48. The computer-readable medium of claim 29 wherein the target computer system has a plurality of system resources and including the step of selecting a system resource with a highest utilization based on the set of predicted performance measurements of the selected identified workload as a bottleneck system resource.

* * * * *